(12) United States Patent
Taniguchi et al.

(10) Patent No.: US 6,803,977 B2
(45) Date of Patent: Oct. 12, 2004

(54) LIQUID CRYSTAL DISPLAY APPARATUS

(75) Inventors: Hitoshi Taniguchi, Yokohama (JP); Yasuo Hira, Yokohama (JP); Yuji Mori, Urizura-machi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/705,969

(22) Filed: Nov. 13, 2003

(65) Prior Publication Data

US 2004/0070701 A1 Apr. 15, 2004

Related U.S. Application Data

(63) Continuation of application No. 09/463,776, filed on Jan. 28, 2000, now Pat. No. 6,727,963.

(30) Foreign Application Priority Data

Jul. 31, 1997 (JP) .......................................... P09-205767
Jul. 31, 1998 (JP) .................................. PCT/JP98/03430

(51) Int. Cl.$^7$ .......................................... G02F 1/1335
(52) U.S. Cl. .......................................... 349/65; 362/31
(58) Field of Search .............................. 349/65, 62, 64, 349/67; 362/31

(56) References Cited

U.S. PATENT DOCUMENTS

| | | | |
|---|---|---|---|
| 5,349,503 A | 9/1994 | Blonder et al. | |
| 5,461,547 A | 10/1995 | Ciupke et al. | |
| 5,575,549 A | 11/1996 | Ishikawa et al. | |
| 5,584,556 A | 12/1996 | Yokoyama et al. | |
| 5,668,913 A | 9/1997 | Tai et al. | |
| 5,883,163 A | 3/1999 | Hosonuma | |
| 5,926,601 A | 7/1999 | Tai et al. | |
| 5,956,107 A | 9/1999 | Hashimoto et al. | |
| 5,961,198 A | 10/1999 | Hira et al. | |
| 5,999,238 A | 12/1999 | Ihara | |
| 6,123,431 A | 9/2000 | Teragaki et al. | |
| 6,147,725 A | * 11/2000 | Yuuki et al. | ................... 349/65 |
| 6,231,200 B1 | 5/2001 | Shinohara et al. | |
| 6,313,891 B1 | * 11/2001 | Nagakubo et al. | ............ 349/65 |
| 6,504,589 B1 | 1/2003 | Kashima et al. | |
| 6,530,671 B2 | 3/2003 | Taniguchi et al. | |

FOREIGN PATENT DOCUMENTS

| | | |
|---|---|---|
| JP | 2-000017 | 1/1990 |
| JP | 4-162002 | 6/1992 |

(List continued on next page.)

*Primary Examiner*—Kenneth Parker
*Assistant Examiner*—David Chung
(74) *Attorney, Agent, or Firm*—Antonelli, Terry, Stout & Kraus, LLP

(57) ABSTRACT

A liquid crystal display apparatus having a light conductor plate, a light source arranged on a side surface of the light conductor plate so as to light a liquid crystal cell arranged on a front surface side of the light conductor plate from a back surface side thereof. The light conductor plate having an incident surface for a light from the light source, a light emitting surface for emitting the input light to the liquid crystal cell, and a plurality of dots constituted by small projecting portions or small recess portions for changing a moving direction of the light from the incidence surface toward a direction of the light emitting surface, the dots being formed in the light emitting surface and a surface of the light conductor plate opposite to the light emitting surface with each of the dots having a height or depth within a range of 2 to 100 μm.

7 Claims, 55 Drawing Sheets

FOREIGN PATENT DOCUMENTS

| | | |
|---|---|---|
| JP | 4-294383 | 10/1992 |
| JP | 5-60908 | 3/1993 |
| JP | 5-210014 | 8/1993 |
| JP | 5-79537 | 10/1993 |
| JP | 5-289393 | 10/1993 |
| JP | 6-18879 | 1/1994 |
| JP | 6-67004 | 3/1994 |
| JP | 6-25802 | 4/1994 |
| JP | 6-123885 | 5/1994 |
| JP | 6-208113 | 7/1994 |
| JP | 6-230380 | 8/1994 |
| JP | 6-289393 | 10/1994 |
| JP | 7-294745 | 11/1995 |
| JP | 7-333443 | 12/1995 |
| JP | 8-43635 | 2/1996 |
| JP | 8-106656 | 4/1996 |
| JP | 8-237807 | 9/1996 |
| JP | 8-254616 | 10/1996 |
| JP | 8-286186 | 11/1996 |
| JP | 8-327807 | 12/1996 |
| JP | 9-131770 | 5/1997 |
| JP | 9-292531 | 11/1997 |

\* cited by examiner

FIG.5

| KIND OF DOT | SMALL PROJECTING PORTION OR SMALL RECESS PORTION | | |
|---|---|---|---|
| REFLECTING FILM | NO | | YES |
| ANGLE OF INCLINE OF INCLINED SURFACE OF DOT | 7~43° | 50~85° | 30±10° |
| DISTRIBUTION OF ANGLES OF INCLINE OF INCLINED SURFACES OF DOTS | ANGLE OF INCLINE IS SMALLER AS CLOSER TO LIGHT SOURCE | | |
| HEIGHT AND DEPTH OF DOT | 2-100 μm | | |
| DISTRIBUTION OF HEIGHTS AND DEPTHS OF DOTS | HEIGHT AND DEPTH ARE LOWER AS CLOSER TO LIGHT SOURCE | | |
| SHAPE OF FLAT SURFACE OF DOT | CIRCLE OR SUBSTANTIALLY RECTANGULAR SHAPE | | |
| DISTRIBUTION OF DENSITIES OF DOTS | DENSITY OF DOT IS SMALLER AS CLOSER TO LIGHT SOURCE | | |
| DISTRIBUTION OF SHAPES OF DOTS | AREA OF DOT IS SMALLER AS CLOSER TO LIGHT SOURCE AREA OF DOT IS SMALLER AS PORTION REQUIRES CONFUSION | | |
| SIZE | ≦ 0.2 SQUARE mm | | |
| ARRANGEMENT OF DOT | RANDOM OR NON RANDOM IN CASE SHAPE OF FLAT SURFACE IS RECTANGULAR, ARRANGEMENT IS MADE SO THAT LONGER LINE IS SUBSTANTIALLY IN PARALLEL TO LIGHT SOURCE | | |
| SUB MATERIAL | REFLECTING PLATE LIGHT CONDENSING PLATE (DIFFUSION PLATE) | REFLECTING PLATE (LIGHT CONDENSING PLATE) (DIFFUSION PLATE) | (LIGHT CONDENSING PLATE) (DIFFUSION PLATE) |

FIRST EMBODIMENT OF CROSS SECTIONAL
SHAPE OF SMALL RECESS PORTION

FIRST EMBODIMENT OF CROSS SECTIONAL
SHAPE OF SMALL PROJECTING PORTION

SECOND EMBODIMENT OF CROSS SECTIONAL
SHAPE OF SMALL RECESS PORTION

SECOND EMBODIMENT OF CROSS SECTIONAL
SHAPE OF SMALL PROJECTING PORTION

THIRD EMBODIMENT OF CROSS SECTIONAL
SHAPE OF SMALL RECESS PORTION

APPROXIMATE LINE OF THIRD EMBODIMENT OF CROSS
SECTIONAL SHAPE OF SMALL RECESS PORTION

THIRD EMBODIMENT OF CROSS SECTIONAL
SHAPE OF SMALL PROJECTING PORTION

APPROXIMATE LINE OF THIRD EMBODIMENT OF CROSS
SECTIONAL SHAPE OF SMALL PROJECTING PORTION

FOURTH EMBODIMENT OF CROSS SECTIONAL
SHAPE OF SMALL PROJECTING PORTION

APPROXIMATE LINE OF FOURTH EMBODIMENT OF CROSS
SECTIONAL SHAPE OF SMALL PROJECTING PORTION

FOURTH EMBODIMENT OF CROSS SECTIONAL
SHAPE OF SMALL RECESS PORTION

APPROXIMATE LINE OF FOURTH EMBODIMENT OF CROSS
SECTIONAL SHAPE OF SMALL RECESS PORTION

FIFTH EMBODIMENT OF CROSS SECTIONAL
SHAPE OF SMALL RECESS PORTION

APPROXIMATE LINE OF FIFTH EMBODIMENT OF CROSS
SECTIONAL SHAPE OF SMALL RECESS PORTION

FIFTH EMBODIMENT OF CROSS SECTIONAL
SHAPE OF SMALL PROJECTING PORTION

APPROXIMATE LINE OF FIFTH EMBODIMENT OF CROSS
SECTIONAL SHAPE OF SMALL PROJECTING PORTION

EXPLANATORY VIEW NO.5 OF ANGLE OF INCLINE

SIXTH EMBODIMENT OF CROSS SECTIONAL
SHAPE OF SMALL PROJECTING PORTION

APPROXIMATE LINE OF SIXTH EMBODIMENT OF CROSS
SECTIONAL SHAPE OF SMALL PROJECTING PORTION

SIXTH EMBODIMENT OF CROSS SECTIONAL
SHAPE OF SMALL RECESS PORTION

APPROXIMATE LINE OF SIXTH EMBODIMENT OF CROSS
SECTIONAL SHAPE OF SMALL RECESS PORTION

SEVENTH EMBODIMENT OF CROSS SECTIONAL
SHAPE OF SMALL RECESS PORTION

APPROXIMATE LINE OF SEVENTH EMBODIMENT OF CROSS
SECTIONAL SHAPE OF SMALL RECESS PORTION

SEVENTH EMBODIMENT OF CROSS SECTIONAL
SHAPE OF SMALL PROJECTING PORTION

APPROXIMATE LINE OF SEVENTH EMBODIMENT OF CROSS
SECTIONAL SHAPE OF SMALL PROJECTING PORTION

EIGHTH EMBODIMENT OF CROSS SECTIONAL
SHAPE OF SMALL PROJECTING PORTION

APPROXIMATE LINE OF EIGHTH EMBODIMENT OF CROSS
SECTIONAL SHAPE OF SMALL PROJECTING PORTION

EIGHTH EMBODIMENT OF CROSS SECTIONAL
SHAPE OF SMALL RECESS PORTION

APPROXIMATE LINE OF EIGHTH EMBODIMENT OF CROSS
SECTIONAL SHAPE OF SMALL RECESS PORTION

NINTH EMBODIMENT OF CROSS SECTIONAL
SHAPE OF SMALL RECESS PORTION

APPROXIMATE LINE OF NINTH EMBODIMENT OF CROSS
SECTIONAL SHAPE OF SMALL RECESS PORTION

NINTH EMBODIMENT OF CROSS SECTIONAL
SHAPE OF SMALL PROJECTING PORTION

APPROXIMATE LINE OF NINTH EMBODIMENT OF CROSS
SECTIONAL SHAPE OF SMALL PROJECTING PORTION

TENTH EMBODIMENT OF CROSS SECTIONAL
SHAPE OF SMALL PROJECTING PORTION

APPROXIMATE LINE OF TENTH EMBODIMENT OF CROSS
SECTIONAL SHAPE OF SMALL PROJECTING PORTION

TENTH EMBODIMENT OF CROSS SECTIONAL
SHAPE OF SMALL RECESS PORTION

APPROXIMATE LINE OF THIRD EMBODIMENT OF CROSS
SECTIONAL SHAPE OF SMALL RECESS PORTION

FIG.16A

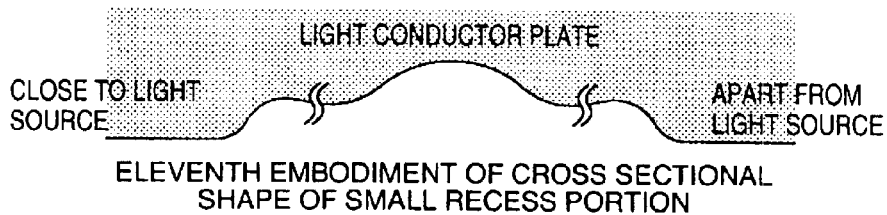

ELEVENTH EMBODIMENT OF CROSS SECTIONAL
SHAPE OF SMALL RECESS PORTION

FIG.16B

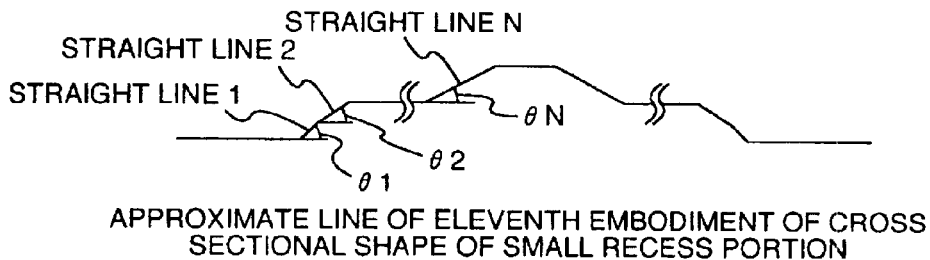

APPROXIMATE LINE OF ELEVENTH EMBODIMENT OF CROSS
SECTIONAL SHAPE OF SMALL RECESS PORTION

ANGLE OF INCLINE IN CROSS-SECTION $= \dfrac{\sum_{n=1}^{N} \theta_n \times L_n \times \sin(\theta_n + \theta)}{\sum_{n=1}^{N} L_n \times \sin(\theta_n + \theta)}$ $L_n$ = LENGTH OF STRAIGHT LINE n
$\theta$ = VALUE DETERMINED IN ACCORDANCE WITH REFRACTIVE INDEX OF LIGHT CONDUCTOR PLATE
ABOUT 18 DEGREES IS SUITABLE IN CASE OF REFRACTIVE INDEX OF LIGHT CONDUCTOR PLATE = $1.47 \pm 0.1$ ANGLE OF INCLINE IN CROSS-SECTION $= \dfrac{\theta_1 \times L_1 \times \sin(\theta_1 + \theta) + \theta_2 \times L_2 \times \sin(\theta_2 + \theta)}{L_1 \times \sin(\theta_1 + \theta) + L_2 \times \sin(\theta_2 + \theta)}$ $L_1$ = LENGTH OF STRAIGHT LINE 1
$L_2$ = LENGTH OF STRAIGHT LINE 2
$\theta$ = VALUE DETERMINED IN ACCORDANCE WITH REFRACTIVE INDEX OF LIGHT CONDUCTOR PLATE
ABOUT 18 DEGREES IS SUITABLE IN CASE OF REFRACTIVE INDEX OF LIGHT CONDUCTOR PLATE = $1.47 \pm 0.1$ FIG.17A
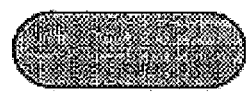
FIG.17B
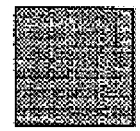
FIG.17C
FIG.17D
FIG.17E
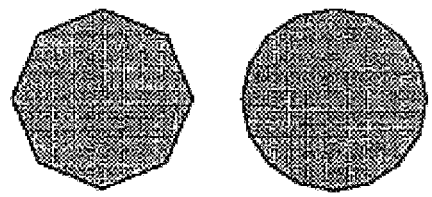
FIG.17F
FIG.17G
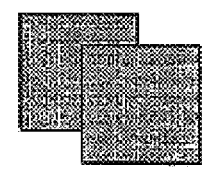 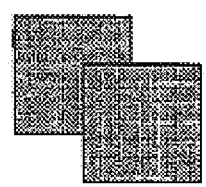
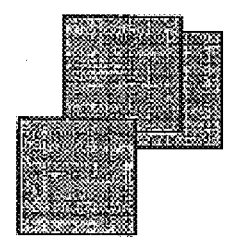 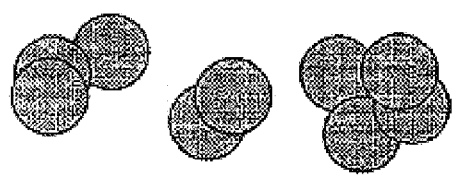

EMBODIMENT 1-1
CROSS SECTIONAL SHAPE OF
LIGHT CONDUCTOR PLATE

EMBODIMENT 1-2
CROSS SECTIONAL SHAPE OF
LIGHT CONDUCTOR PLATE

EMBODIMENT 1-3
CROSS SECTIONAL SHAPE OF
LIGHT CONDUCTOR PLATE

FIG.28A
FIG.28B
FIG.28C
FIG.28D
FIG.28E
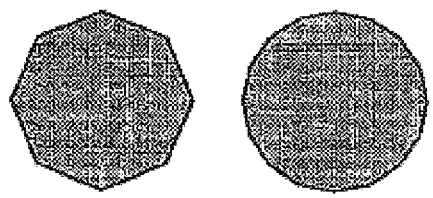
FIG.28F
FIG.28G
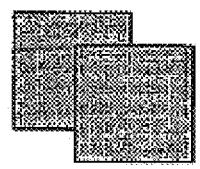 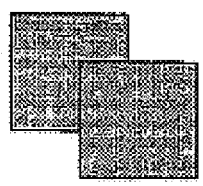
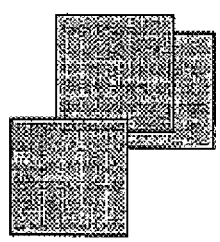 

FIG.31

| SHAPE | MEMBER | SIZE(X DIRECTION μm) | | | | | | |
|---|---|---|---|---|---|---|---|---|
| | | 10 | 20 | 50 | 100 | 200 | 400 | 800 |
| CIRCULAR SHAPE, SQUARE | NONE | ○ | ○ | ○ | △ | × | × | × |
| | DIFFUSION PLATE | ○ | ○ | ○ | ○ | △ | × | × |
| | DIFFUSION PLATE + ONE LIGHT CONDUCTOR PLATE | ○ | ○ | ○ | ○ | ○ | △ | × |
| | DIFFUSION PLATE + TWO LIGHT CONDUCTOR PLATES | ○ | ○ | ○ | ○ | ○ | ○ | △ |
| SUBSTANTIALLY RECTANGULAY SHAPE (20 μm IN Y DIRECTION) | NONE | — | ○ | ○ | ○ | △ | × | × |
| | DIFFUSION PLATE | — | ○ | ○ | ○ | ○ | △ | × |
| | DIFFUSION PLATE + ONE LIGHT CONDUCTOR PLATE | — | ○ | ○ | ○ | ○ | ○ | △ |
| | DIFFUSION PLATE + TWO LIGHT CONDUCTOR PLATES | — | ○ | ○ | ○ | ○ | ○ | △ |
| SUBSTANTIALLY RECTANGULAY SHAPE (50 μm IN Y DIRECTION) | NONE | — | ○ | ○ | ○ | △ | × | × |
| | DIFFUSION PLATE | — | ○ | ○ | ○ | △ | △ | × |
| | DIFFUSION PLATE + ONE LIGHT CONDUCTOR PLATE | — | ○ | ○ | ○ | ○ | △ | × |
| | DIFFUSION PLATE + TWO LIGHT CONDUCTOR PLATES | — | ○ | ○ | ○ | ○ | ○ | △ |
| SUBSTANTIALLY RECTANGULAY SHAPE (100 μm IN Y DIRECTION) | NONE | — | ○ | ○ | △ | × | × | × |
| | DIFFUSION PLATE | — | ○ | ○ | ○ | △ | × | × |
| | DIFFUSION PLATE + ONE LIGHT CONDUCTOR PLATE | — | ○ | ○ | ○ | ○ | △ | × |
| | DIFFUSION PLATE + TWO LIGHT CONDUCTOR PLATES | — | ○ | ○ | ○ | ○ | ○ | △ |
| SUBSTANTIALLY RECTANGULAY SHAPE (200 μm IN Y DIRECTION) | NONE | — | ○ | △ | × | × | × | × |
| | DIFFUSION PLATE | — | ○ | ○ | ○ | △ | × | × |
| | DIFFUSION PLATE + ONE LIGHT CONDUCTOR PLATE | — | ○ | ○ | ○ | ○ | △ | × |
| | DIFFUSION PLATE + TWO LIGHT CONDUCTOR PLATES | — | ○ | ○ | ○ | ○ | ○ | △ |
| SUBSTANTIALLY RECTANGULAY SHAPE (400 μm IN Y DIRECTION) | NONE | — | ○ | △ | × | × | × | × |
| | DIFFUSION PLATE | — | ○ | ○ | ○ | △ | × | × |
| | DIFFUSION PLATE + ONE LIGHT CONDUCTOR PLATE | — | ○ | ○ | ○ | ○ | △ | × |
| | DIFFUSION PLATE + TWO LIGHT CONDUCTOR PLATES | — | ○ | ○ | ○ | ○ | ○ | △ |

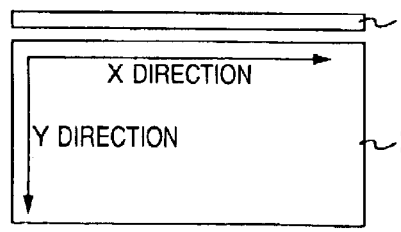

○ DOT VISIBILITY NONE
△ SOMETIME DOT VIBIBILITY EXISTS
× DOT VISIBILITY EXISTS

FIG.50
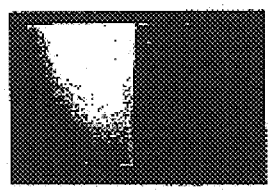
PHOTOGRAPHED
FROM ABOVE
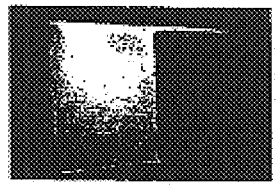 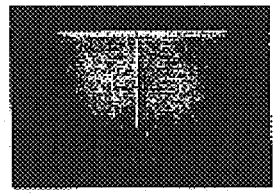 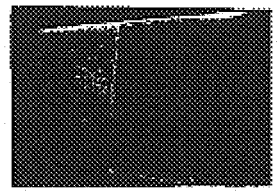
PHOTOGRAPHED          PHOTOGRAPHED          PHOTOGRAPHED
FROM LEFT             FROM FRONT            FROM RIGHT
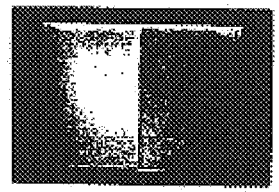
PHOTOGRAPHED
FROM BELOW

FIG.52
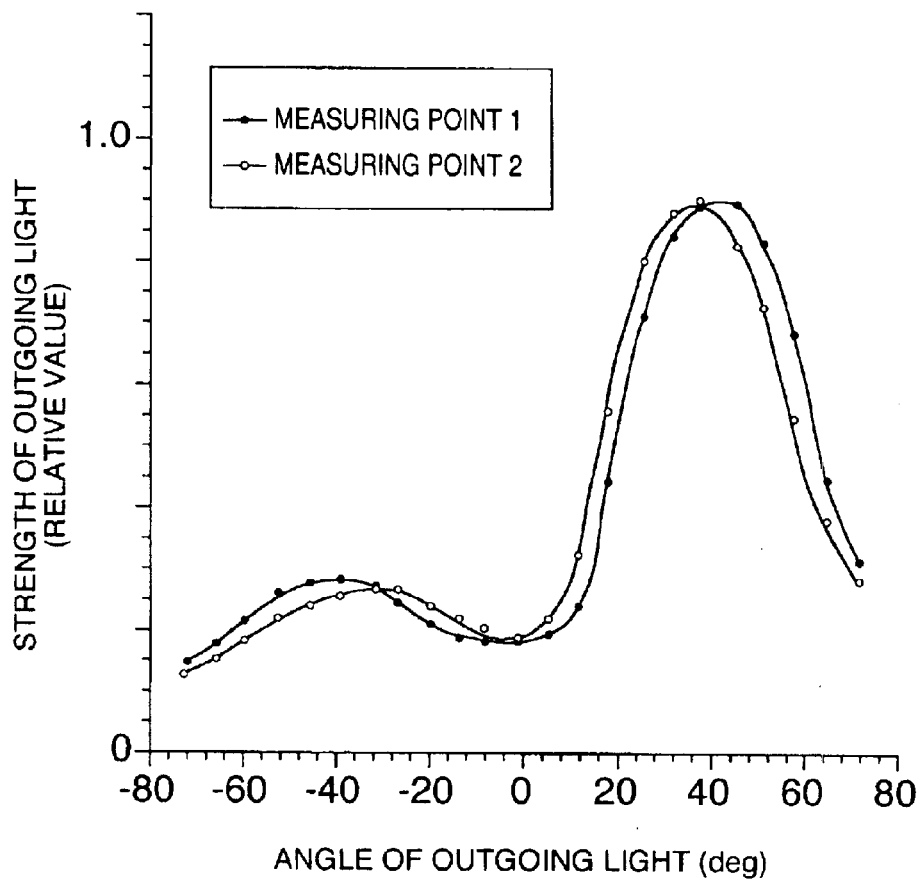
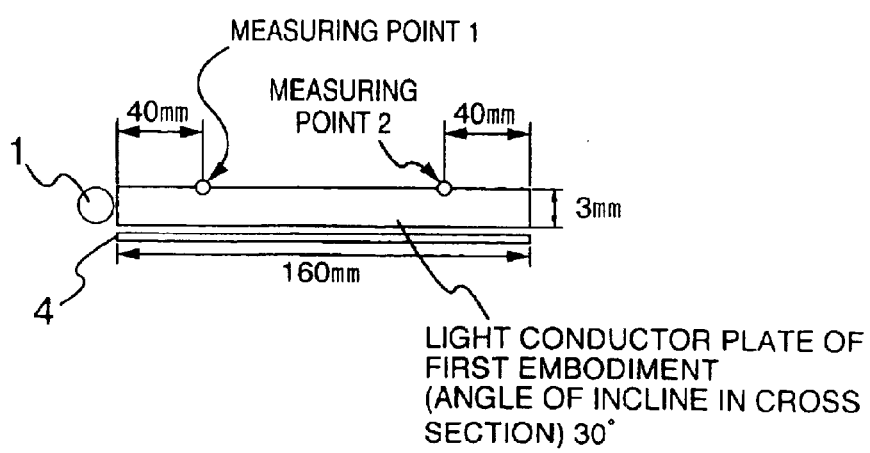

FIG.53
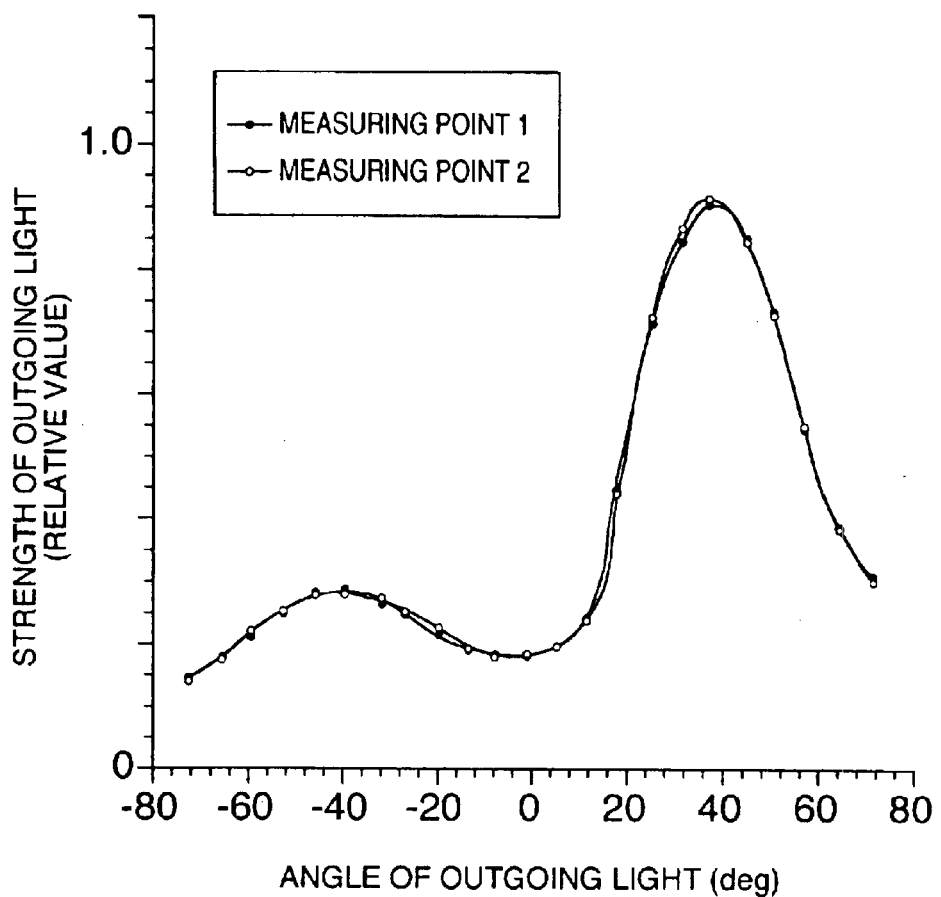
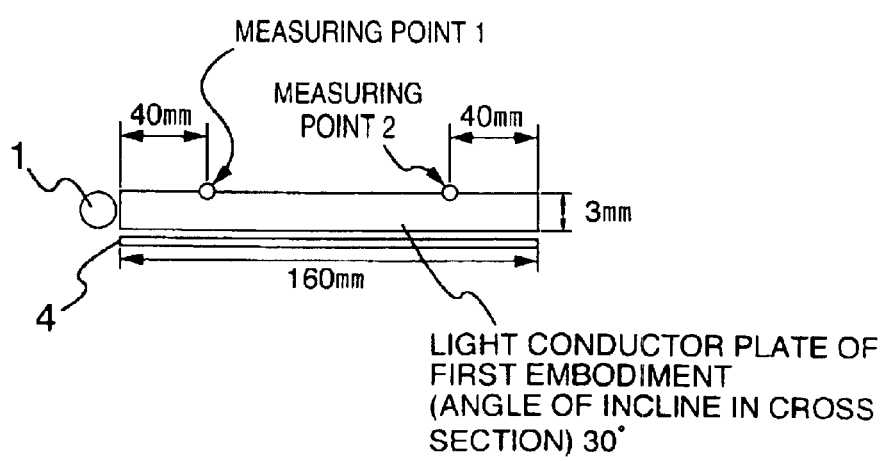

FIG.60
BEFORE ANNEALING
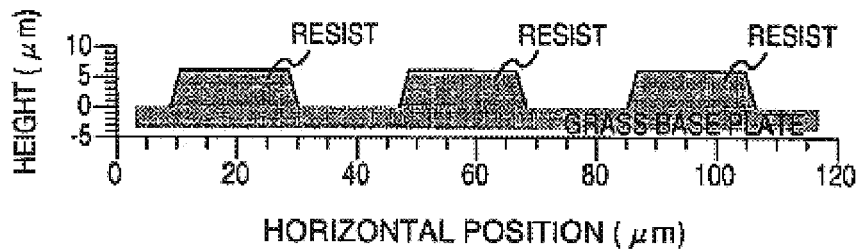
ANNEALING AT 165°
AFTER ANNEALING
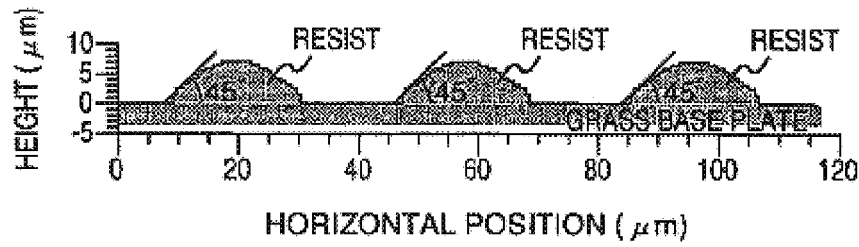
IN CASE THAT AVERAGE DISTANCE BETWEEN DOTS IS SMALL
BEFORE ANNEALING
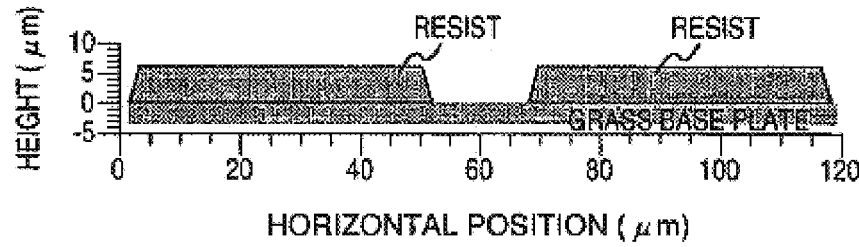
ANNEALING AT 165°
AFTER ANNEALING
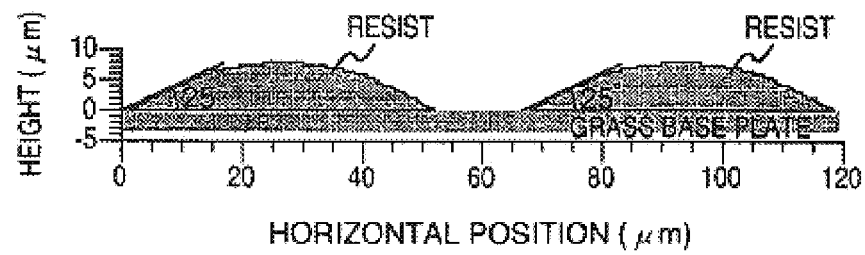
IN CASE THAT AVERAGE DISTANCE BETWEEN DOTS IS LARGE

LIQUID CRYSTAL DISPLAY APPARATUS

CROSS REFERENCE TO RELATED APPLICATION

This is a continuation of U.S. application Ser. No. 09/463,776, filed Jan. 28, 2000 now U.S. Pat. No. 6,727,963 and copending with U.S. application Ser. No. 10/020,975, filed Dec. 19, 2001 which is a continuation of U.S. application Ser. No. 09/463,776, filed Jan. 28, 2000, the subject matter of which is incorporated by reference herein.

TECHNICAL FIELD

The present invention relates to a back light type liquid crystal apparatus.

BACKGROUND ART

In recent years, it is promoted to make a personal computer compact, and a portable device so called as a lap-top type widely spread. In this lap top type, a liquid crystal apparatus is generally employed for a display apparatus thereof, however, in accordance with a development to a color display in recent years, a back light type display apparatus in which a light source is arranged at the back of a liquid crystal display plate and a whole of a display surface is lighted up from a back side spread. It is necessary to make a brightness of the light source as the back light apparatus for this kind of display apparatus high, and light up the whole of the flat surface without unevenness of the brightness. In order to improve the brightness, an improved brightness can be easily achieved by increasing the brightness of the light source, however, an increase of the brightness of the light source is limited because a battery or the like is employed as a drive source in the lap-top type personal computer and the like, so that there has been conventionally no effective method.

As an edge light type light apparatus for a conventional liquid crystal display apparatus, there are apparatuses described in Japanese Patent Unexamined Publication Nos. 4-162002 and 6-67004. In these apparatuses, as shown in FIG. 2, a lamp such as a cold-cathode tube, a hot-cathode tube or the like is employed for a light source 1, this is arranged on an end surface of a light conductor plate 2 made of a permeable material, a light scattering layer 3 for scattering a light and a reflecting plate 4 for reflecting a light is provided on a lower surface of the light conductor plate 2, and a diffusion plate 5 made of a milk white synthetic resin having an optical confusion effect for making a brightness of the light surface uniform all around the whole surface is provided on an upper surface of the light conductor plate 2. Further, on an upper surface thereof, there are arranged a first light condensing plate 6 and a second light condensing plate 7 which converge a diffused light at a certain degree so as to improve a brightness of a front surface of the display apparatus.

Further, a structure of the light confusion layer for confusing the light guided by the light conductor plate 2 in a direction of the diffusion plate and a method of manufacturing the same are as follows. FIG. 3 shows a structure of the light confusion layer. The light confusion layer is structured such that a plurality of light confusion materials 8 using a titanium oxide or the like is formed on the surface of the light conductor plate 2 in accordance with a method such as a printing or the like. An optical strength from the light source becomes lowered as being apart from the light source 1. Accordingly, an area of the light confusion materials is set to become larger as they are apart from the light source.

On the contrary, as described in Japanese Patent Unexamined Publication No. 7-294745, there is proposed a light conductor plate of a type in which a grating groove is formed on a bottom surface of the light conductor plate so as to reflect an incident light to the light conductor plate.

As mentioned above, in the conventional light apparatus, it is structured such that an emitting light from the light source is introduced to the light conductor plate, confused by the light confusion materials contained in the light confusion layer and thereafter irradiated to a liquid crystal element after passing through the diffusion plate, so that the structure is complex and there is a problem that the brightness is lowered due to a loss such as the light confusion and the like. Further, there is a problem that in the method of forming the grating groove, it is hard to manufacture a metal mold.

In the conventional apparatus mentioned above, since a number of the elements is large and the diffusion plate and the light condensing plate are arranged on an upper surface of the light conductor plate, unevenness of the brightness can be reduced, however, there is a disadvantage that the whole brightness is reduced. In the case of this structure, since a uniformity of the brightness and an improvement of the brightness are always opposing objects, it is hard to solve them. On the contrary, in the case of the light conductor plate of the type in which the grating groove is formed, the improvement of the brightness can be achieved, however, it is significantly hard to manufacture the metal mold and make the brightness uniform.

The present invention is made for solving the current status mentioned above, and an object of the present invention is to provide a liquid crystal apparatus which improves the conventional disadvantages and can improve a brightness without increasing a brightness of the light source.

DISCLOSURE OF THE INVENTION

In order to achieve the object mentioned above, in accordance with the present invention, a light conductor plate having a plurality of small projecting portions or small recess portions (hereinafter, refer to as dots) with a suitably controlled angle of incline of a cross section is employed for converting a direction of a forward movement of a waveguide light within a light conductor plate into a predetermined direction. Further, a reflection film is formed along the dots or the reflection film is arranged as occasion demands. Further, a prism sheet having a suitable prism top angle is arranged as occasion demands, thereby irradiating a light beam having a suitable angle distribution toward a display element from a light outputting surface. Further, in order to prevent Moire from generating, a member in which an arrangement of the dots satisfies a fixed restricting condition and the dots are arranged and formed at random, is employed. Further, by changing a number of the dots and/or a shape thereof and/or a size thereof as occasion demands, an angle distribution of the emitting light is made uniform and an unevenness of the brightness is prevented from being generated.

BRIEF DESCRIPTION OF THE DRAWINGS

FIG. 5 is a view which totally shows an embodiment in accordance with the present invention;

FIG. 16 is a tenth schematic view of the angle of incline of a cross section in accordance with the present invention;

FIG. 17 is a view which totally shows a shape of a flat surface of the dot in accordance with the present invention;

FIG. 28 is a view which totally shows a shape of a flat surface of the dot in accordance with the present invention;

FIG. 31 is a view of a relation between a size of the small recess portion and a visibility of the dot in accordance with the present invention;

FIG. 50 is an angle dependence of the emitting light of the fourth embodiment in accordance with the present invention;

FIG. 52 is a view of an angle dependence of the emitting light at a time when an angle of incline of a cross section in accordance with the present invention is uniform;

FIG. 53 is a view of an angle dependence of the emitting light in the case of changing an angle of incline of a cross section in accordance with the present invention;

FIG. 60 is a schematic view of a relation between an average distance between dots and an angle of incline of a cross section in accordance with the present invention;

BEST MODE FOR CARRYING OUT THE INVENTION

Figure 4:
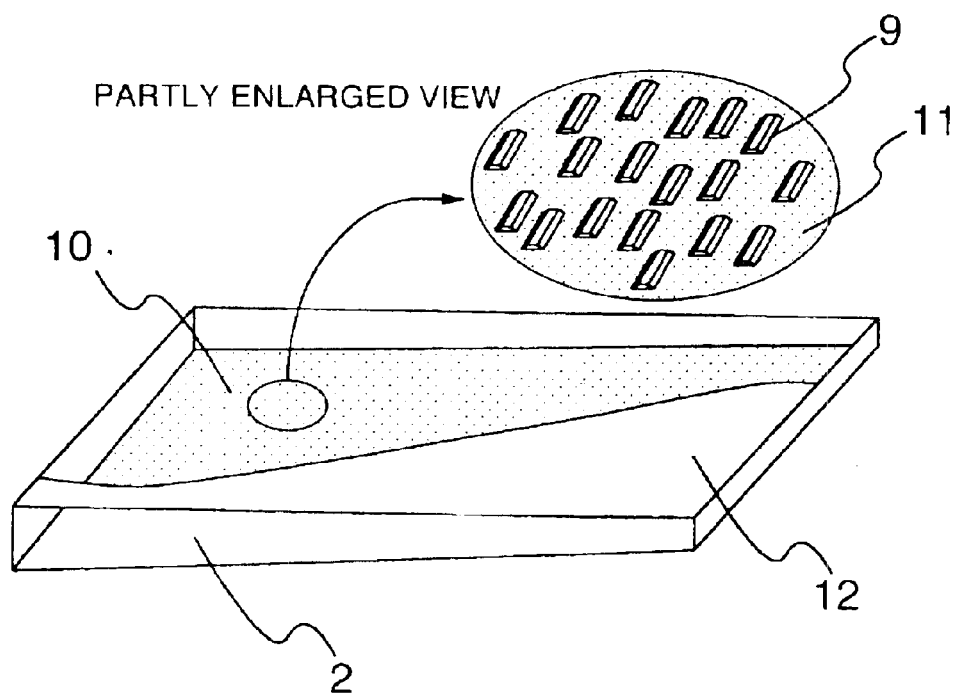
FIG. 4 is a schematic view of a size of the dot in accordance with the present invention.

In accordance with the present invention, in order to convert a forward moving direction of a waveguide light within a light conductor plate into a predetermined direction, a dot 9 constituted by a plurality of small projecting portions or small recess portions is formed on a surface of the light conductor plate. The dot corresponds, as shown in FIG. 4 (in the case of forming the small recess portions on a lower surface of the light conductor plate), to a small projecting portion or a small recess portion surrounded by a flat portion 11 (Ra<1.0 μm and angle with respect to a light conductor plate light emitting surface 12 is 10 degrees or less) of a light conductor plate dot forming surface as viewing a dot forming surface 10 on the surface of the light conductor plate.

FIG. 5 totally shows an embodiment in accordance with the present invention, and shows an angle of an inclined surface of the small projecting portion or the small recess portion with respect to the flat portion of the surface of the light conductor plate (hereinafter, refer to as an angle of incline of a cross section), a distribution of angles of incline in a cross section, a depth or a height, a distribution thereof, a shape of a flat surface, a distribution of a shape, a size, an arrangement of dots, a distribution of density of dots, a distribution of shapes of the dots, and a sub material of the light conductor plate in accordance with the present invention.

An angle of incline of a cross section of the light conductor plate of the liquid crystal display apparatus in accordance with the present invention suitably has an angle of 7 to 85 degrees (preferably 7 to 43 degrees and 50 to 85 degrees). Particularly, in the case of forming a reflecting film, it is suitably set to 20 to 40 degrees, in the case of employing a light condensing plate and not forming the reflecting film, it is suitably set to 7 to 43 degrees, and in the case of not employing the light condensing plate and not forming the reflecting plate, it is suitably set to 50 to 85 degrees.

Here, a description will be given of the angle of incline of the cross section with reference to FIGS. 6 to 16.

Figure 6:
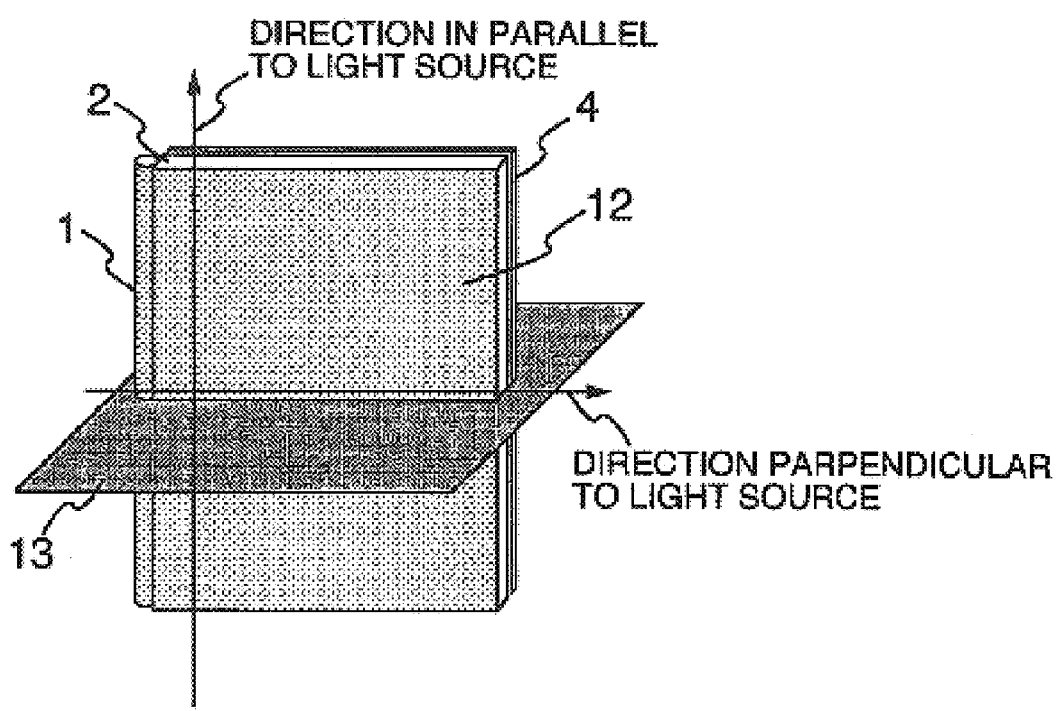
FIG. 6 is a schematic view of a direction of cutting an angle of incline of a cross section in accordance with the present invention.
Figure 7A:
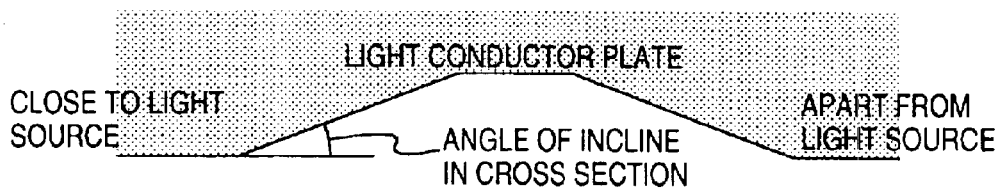
FIG. 7 is a first schematic view of the angle of incline of a cross section in accordance with the present invention.
Figure 7B:
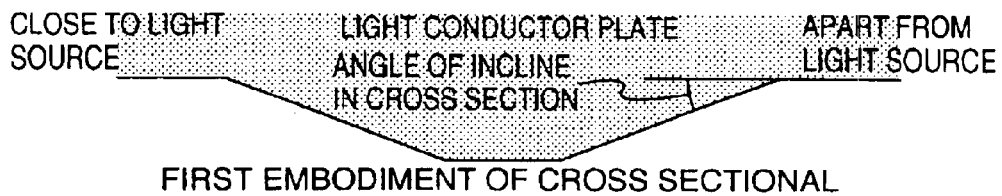
Figure 7C:
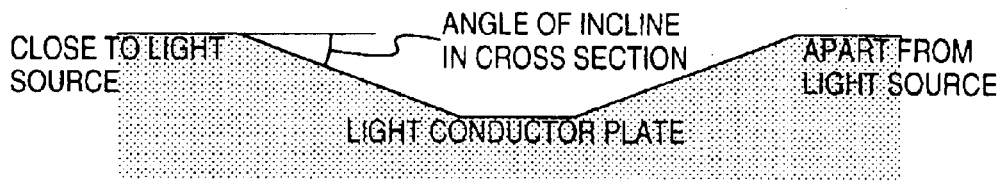
Figure 7D:
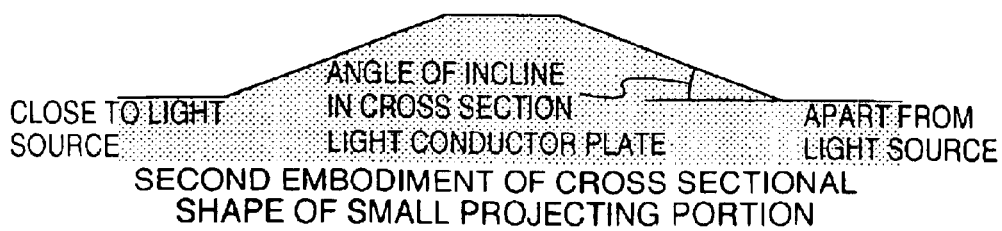
Figure 8A:
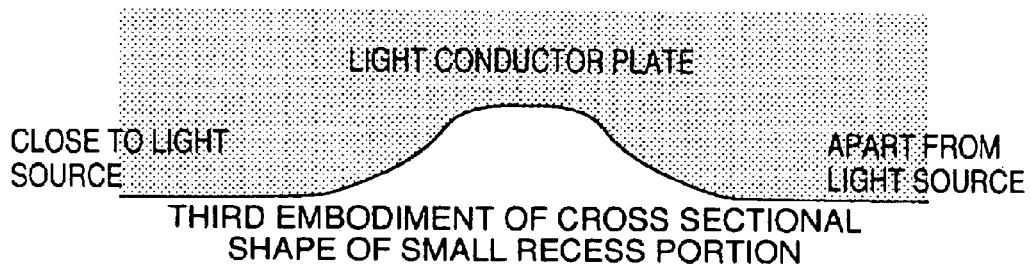
FIG. 8 is a second schematic view of the angle of incline of a cross section in accordance with the present invention.
Figure 8B:
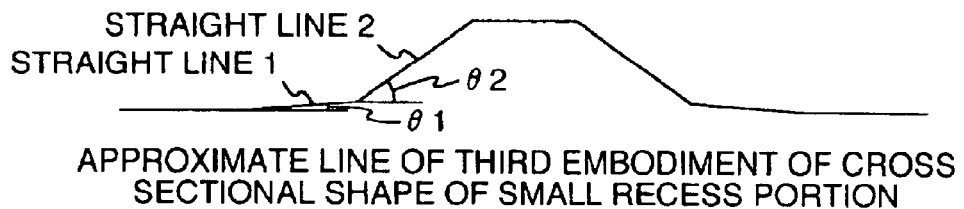
Figure 8C:
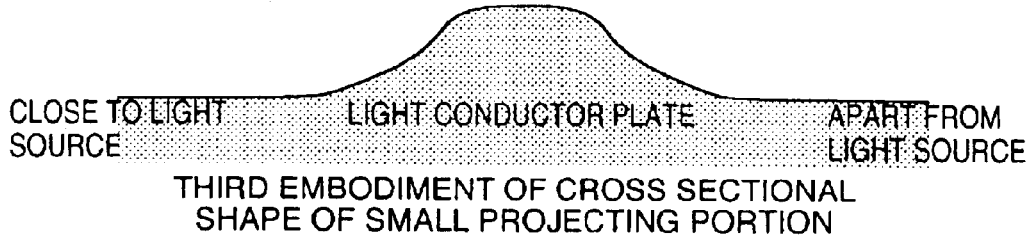
Figure 8D:
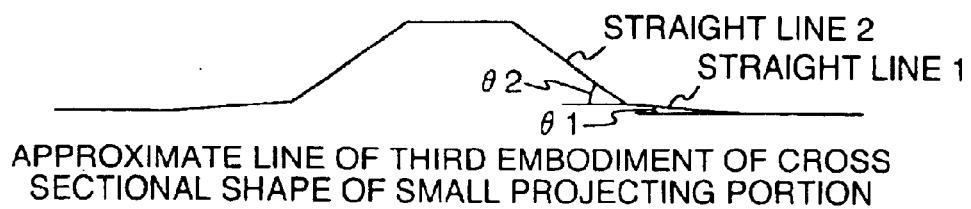
Figure 9A:
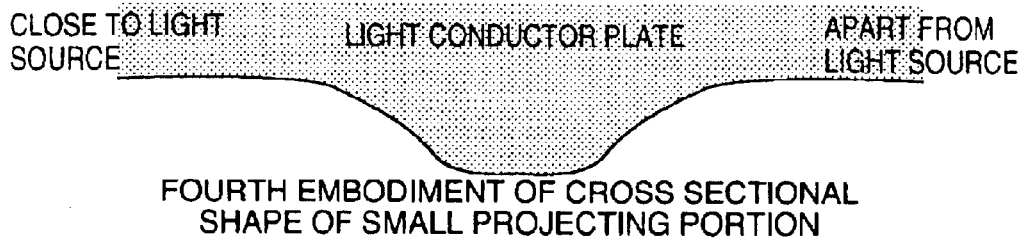
FIG. 9 is a third schematic view of the angle of incline of a cross section in accordance with the present invention.
Figure 9B:
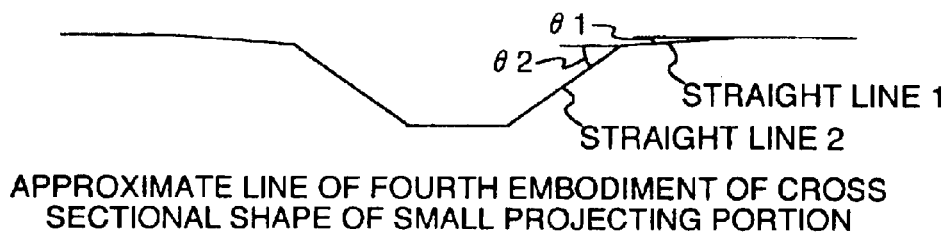
Figure 9C:
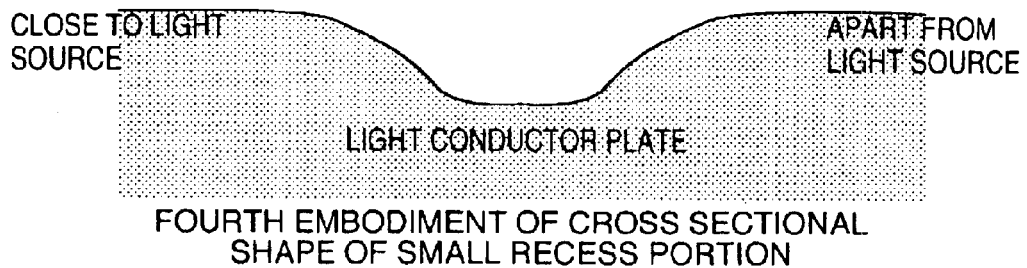
Figure 9D:
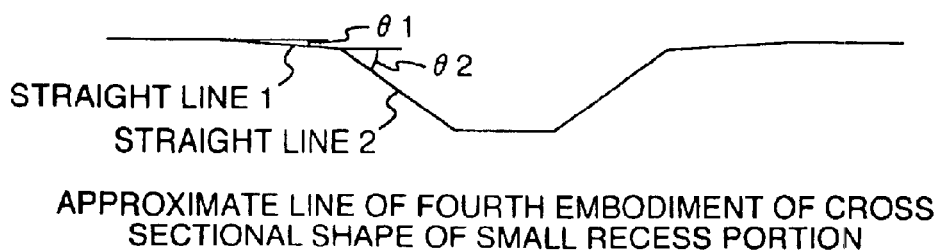
Figure 10A:
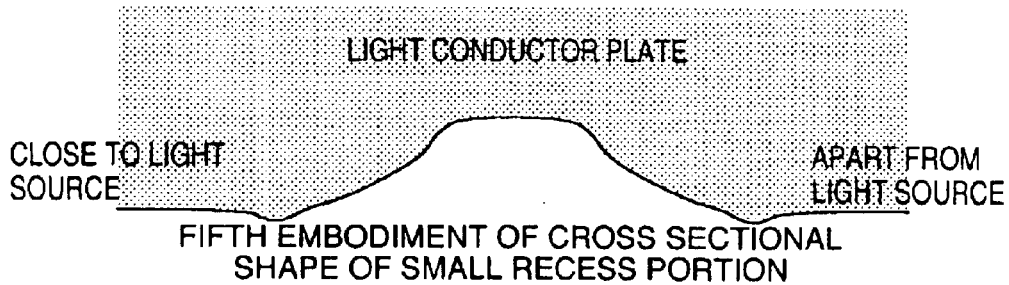
FIG. 10 is a fourth schematic view of the angle of incline of a cross section in accordance with the present invention.
Figure 10B:
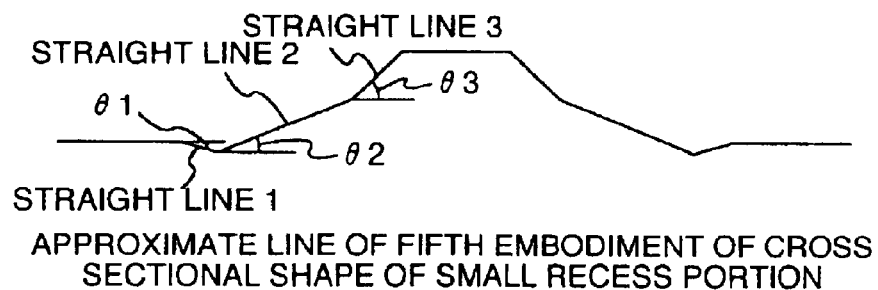
Figure 10C:
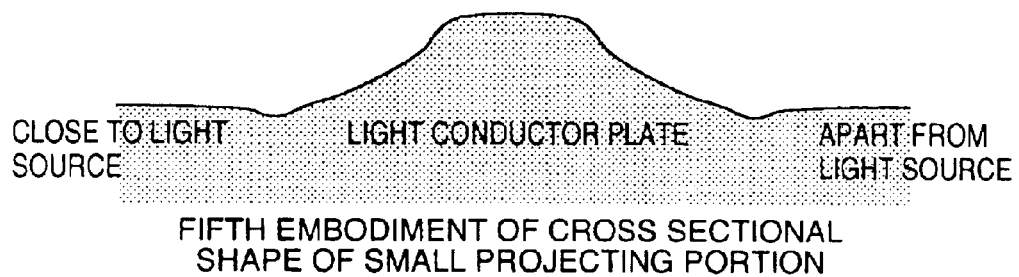
Figure 10D:
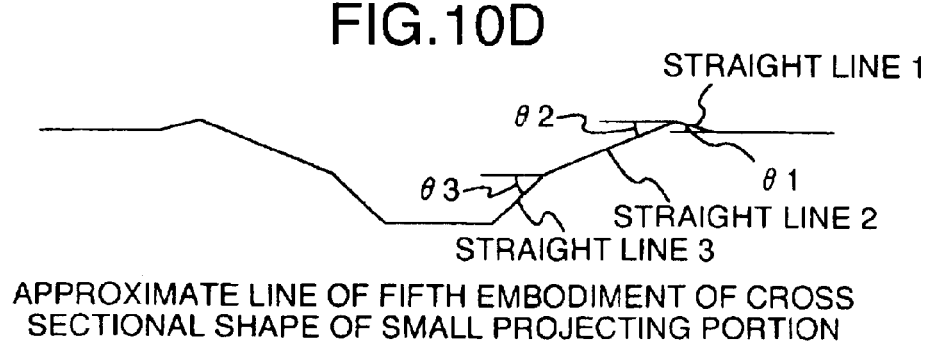
Figure 11A:
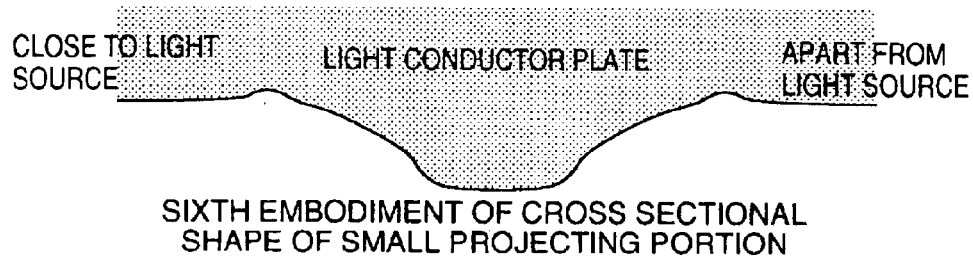
FIG. 11 is a fifth schematic view of the angle of incline of a cross section in accordance with the present invention.
Figure 11B:
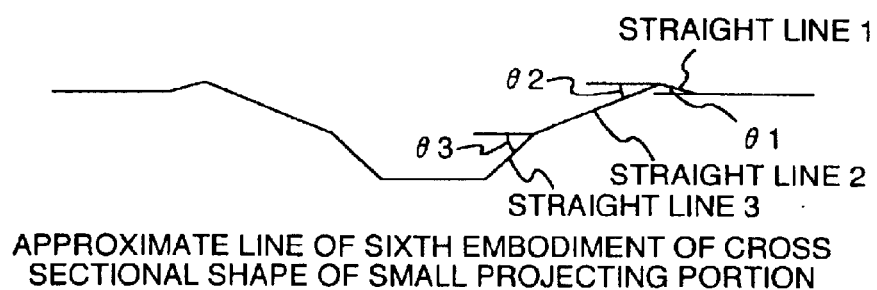
Figure 11C:
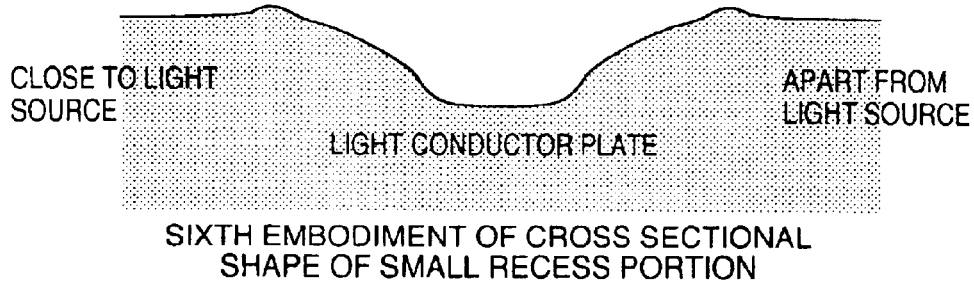
Figure 11D:
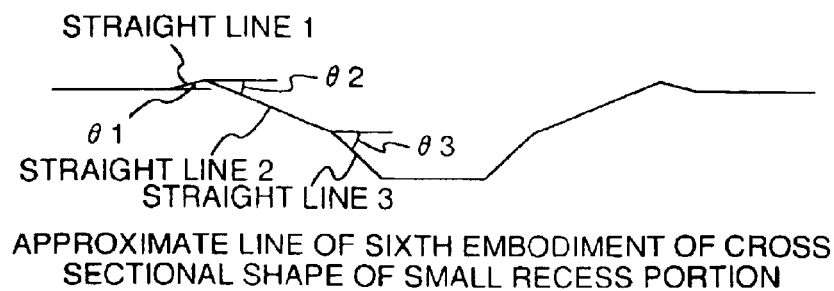
Figure 12A:
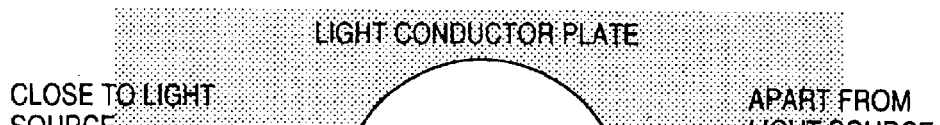
FIG. 12 is a sixth schematic view of the angle of incline of a cross section in accordance with the present invention.
Figure 12B:
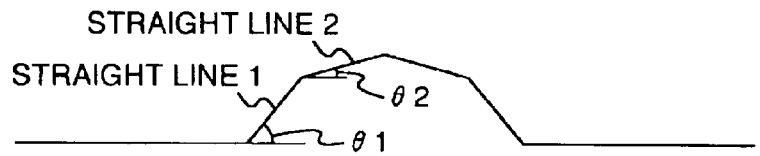
Figure 12C:
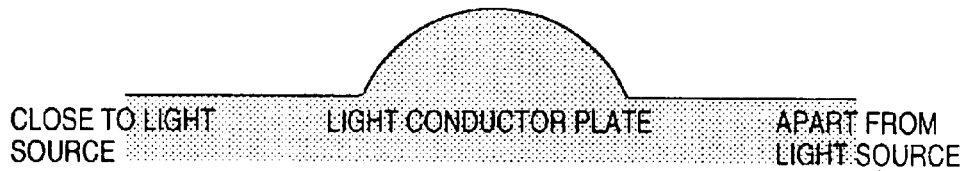
Figure 12D:
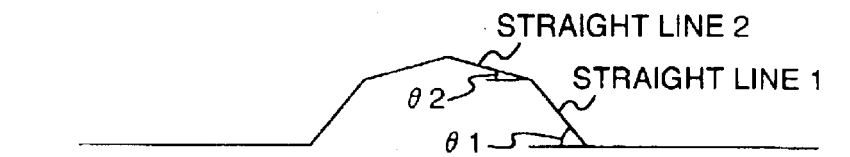
Figure 13A:
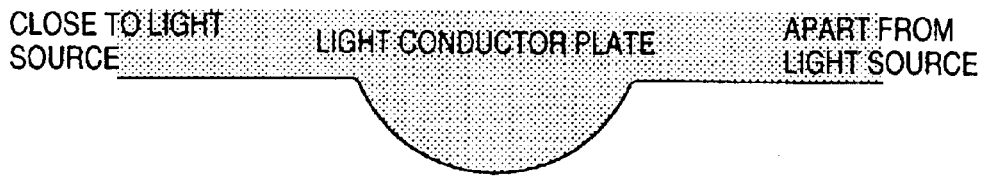
FIG. 13 is a seventh schematic view of the angle of incline of a cross section in accordance with the present invention.
Figure 13B:
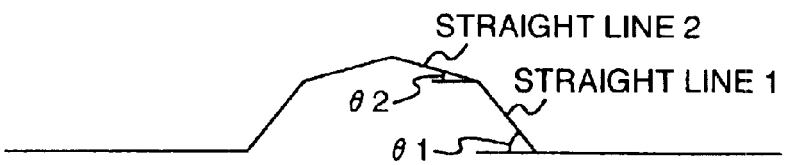
Figure 13C:
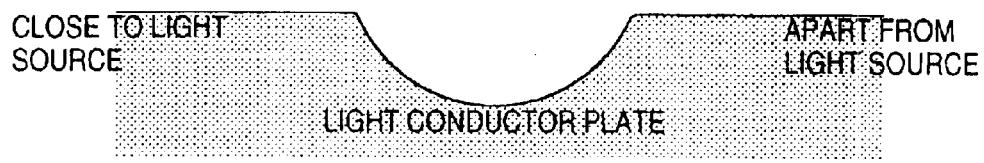
Figure 13D:
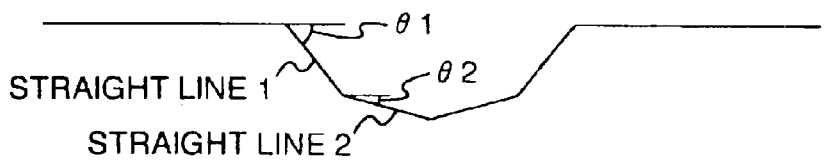
Figure 14A:
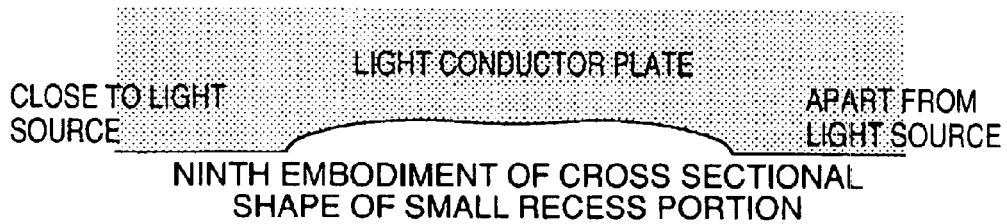
FIG. 14 is a eighth schematic view of the angle of incline of a cross section in accordance with the present invention.
Figure 14B:
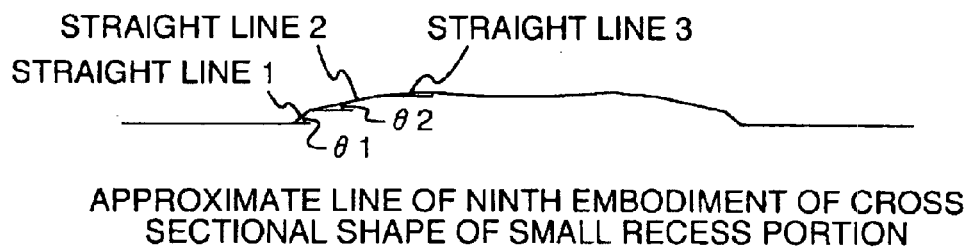
Figure 14C:
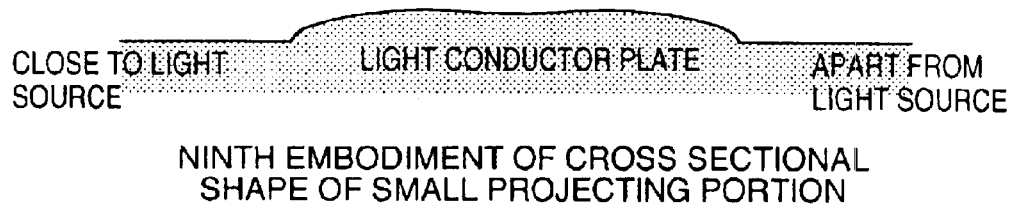
Figure 14D:
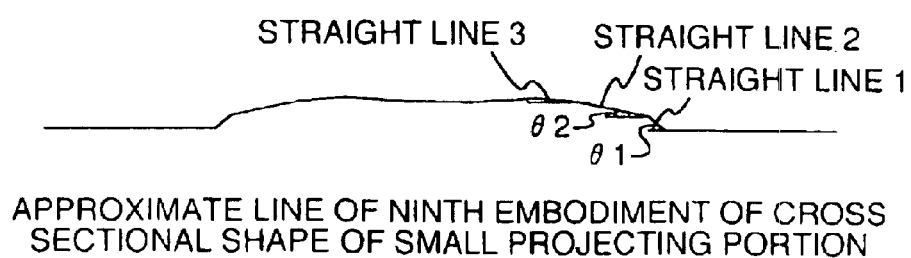
Figure 15A:
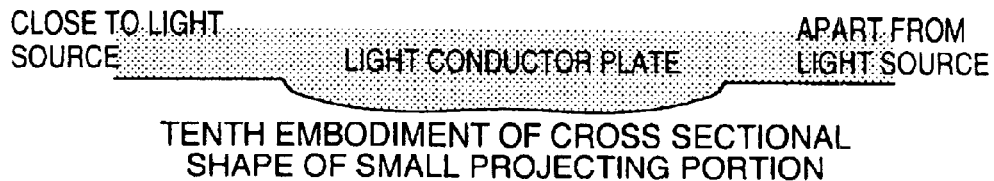
FIG. 15 is a ninth schematic view of the angle of incline of a cross section in accordance with the present invention.
Figure 15B:
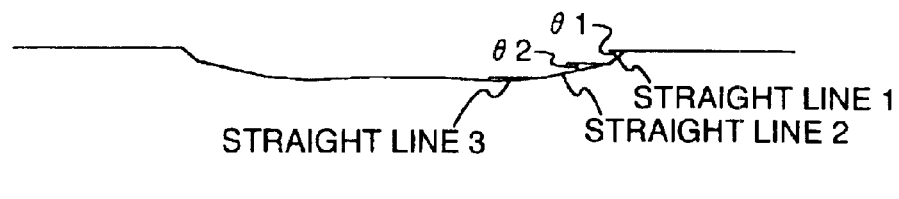
Figure 15C:
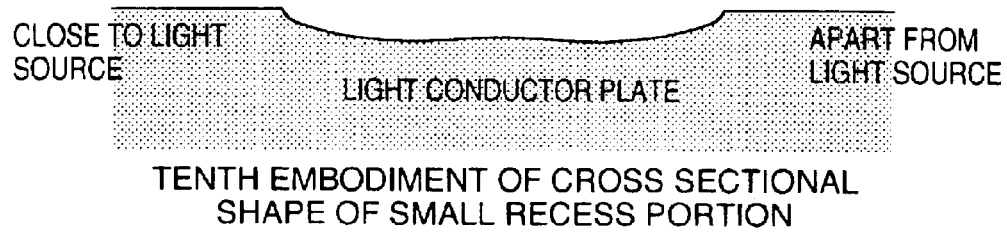
Figure 15D:
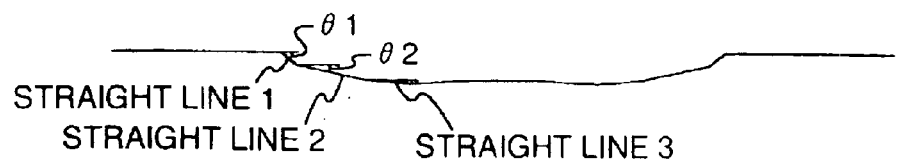

FIG. 6 is a view which explains a cutting surface 13 of the light conductor plate at a time of determining the angle of incline of the cross section. When determining the angle of incline of the cross section, as shown in FIG. 6, it is desirable to cut the dot in a perpendicular direction to a light source 1 and in a perpendicular direction to the light conductor plate light emitting surface 12. This is because an inclined surface of the dot in a horizontal direction acts on the light source due to a reflection, a refraction and the like in a more effective manner than that at a time of changing a course of the light.

When determining the angle of incline of the cross section, a calculation is performed in accordance with the following way.

In the case that the cross sectional shape of the dot can be substantially similar to a trapezoidal shape as shown in FIG. 7, the angle of incline of the cross section is determined as shown in FIG. 7. In the case that it is hard to be approximated to the trapezoidal shape, the cross sectional shape is at first approximated to a straight line. As a result, when it is possible to substantially approximate as shown in FIGS. 8 and 9, θ2 is set to be as the angle of incline of the cross section. Further, when it is possible to substantially approximate as shown in FIGS. 10 and 11, an average value between θ1 and θ2 is set to be the angle of incline of the cross section. Further, when it is possible to substantially approximate as shown in FIGS. 12 and 13, an average value between θ1 and θ2 is set to be the angle of incline of the cross section. In this case, in the case that a relation θ2<10 degrees is established, a value θ1−θ2 is set to be the angle of incline of the cross section. Further, when it is possible to substantially approximate as shown in FIGS. 14 and 15, an average value between θ1 and θ2 is set to be the angle of incline of the cross section. In this case, in the case that a relation θ2<10 degrees is established, a value θ1−θ2 is set to be the angle of incline of the cross section. In this case, in FIGS. 8 to 15, the angle of incline of the cross section may be calculated in accordance with the following formula (formula 1). Further, it is desirable to approximate so that an approximate error (a difference between a true value and an approximate value) becomes 5% or less of a dot depth (a dot height) of the dot for calculating the angle of incline of the cross section. Further, a value of θ corresponds to a value determined in accordance with a refractive index of the light conductor plate, and in the case that the refractive index is 1.47±0.1, about 18 degrees is suitable.

Angle of Incline in Cross Section

L1=LENGTH OF STRAIGHT LINE 1

L2=LENGTH OF STRAIGHT LINE 2

θ=VALUE DETERMINED IN ACCORDANCE WITH REFRACTIVE INDEX OF LIGHT CONDUCTOR PLATE

REFRACTIVE INDEX OF LIGHT CONDUCTOR PLATE= ABOUT 18 DEGREES WHICH IS SUITABLE IN CASE OF 1.47±0.1     (FORMULA 1)

Further, in the case that it is impossible to approximate as shown in FIGS. 8 to 15, a cross sectional 15, shape is approximated by the straight lines as little, as possible so that the approximate error (the difference between the true value and the approximate value) becomes 5% or less of the dot depth (the dot height) of the dot for calculating the angle of incline of the cross section as shown in FIG. 16, and the angle of incline of the cross section is calculated by applying to the following formula (the formula 2) with respect to the straight line having an angle equal to or more than 5 degrees formed with respect to the flat portion 11 of the surface of the light conductor plate which functions as the effective reflection and refraction surface among the straight lines. In this case, in the case that the dot shape is not symmetrical in right and left, it is desirable to set an angle of an inclined surface in which the waveguide light within the light conductor plate is more reflected to the angle of incline of the cross section.

Angle of Incline in Cross Section

Ln=LENGTH OF STRAIGHT LINE n

θ=VALUE DETERMINED IN ACCORDANCE WITH REFRACTIVE INDEX OF LIGHT CONDUCTOR PLATE

REFRACTIVE INDEX OF LIGHT CONDUCTOR PLATE= ABOUT 18 DEGREES WHICH IS SUITABLE IN CASE OF 1.47±0.1  (FORMULA 2)

The angle of incline of the cross section calculated in the manner mentioned above is defined within the range mentioned above, because an amount of the light emitted from the oblique direction is restricted at an amount equal to or more than necessary so as to improve the brightness of the front surface as well as the distribution of the emitting angle of the light from the emitting surface of the light conductor plate is made suitable. Further, it is desirable that the angle of incline of the cross section of the dot is made smaller as it is near the cold-cathode tube in order to intend to make the distribution of the angle of the brightness uniform.

The depth or the height of the dot is suitably set to 2 to 100 $\mu$m (preferably 5 to 40 $\mu$m). Because the brightness of the portion near the light source becomes too high and as a result the distribution of the brightness becomes uneven in the case that the depth or the height of the dot is more than 100 $\mu$m, it is hard to charge the plastic material to the small projecting portion or the small recess portion of the dot and the desired dot shape can not be formed when forming the light conductor plate, and the size of the dot is increased so as to make the dot visible when setting the depth or the height of the dot to be greater. On the contrary, when the depth or the height of the dot is smaller than 2 $\mu$m, a reflection efficiency of the light is lowered and it is impossible to obtain the desired brightness, and the waveguide light is easily confused and diffracted and it becomes the same in the case of simply setting the light conductor plate to the rough surface. Further, it is desirable to make the depth and the height of the dot smaller as it becomes near the cold-cathode tube in order to intend the uniformity of the distribution of the brightness.

With respect to the shape of the flat surface of the dot, that is, the shape in the case of viewing the dot from the front surface of the dot forming surface, various shapes are effective and the shape is not particularly limited. As an aim, there can be used a substantially rectangular shape (A), a regular square (B), a circular shape (C), a substantially circular shape (D) (a shape obtained by partly deforming a circle), a regular polygonal shape (E), a trapezoidal shape (F) and a combination thereof (G), which are shown in FIG. 17. The substantially rectangular shape has less confusion and is suitable for improving the brightness of the front surface, and since the others are effective for preventing a shadow from generating from the light inputting surface since a component of the confusion is great. In this case, the substantially rectangular shape includes a rectangular shape and means a shape obtained by providing a round at corners of the rectangle and a shape similar to the trapezoidal shape obtained by deforming a length of a line with respect to the rectangle.

It is desirable that the distribution of the flat surface shape of the dot is structured such as to make the dot area smaller as it becomes near the cold-cathode tube in order to intend to make the distribution of the brightness uniform. Further, in the case that the confusion is particularly necessary, it is desirable to make the dot area partly small, or in the case that the dot shape is the substantially rectangular shape, it is desirable to set the shape to the substantially regular square or the circular shape.

The size of the dot is desirably set such that the area thereof is 0.2 square mm or less (preferably 0.05 square mm or less). Further, in the case that the flat surface shape of the dot is the substantially rectangular shape, it is desirable that the length of the short line is 200 $\mu$m or less (preferably 100 $\mu$m or less). Because when the size of the dot becomes greater than this, the shape of the dot formed on the light conductor plate is visible (dot visible) in some characters or patterns in the case that the user for the personal computer or the like sees the liquid crystal display apparatus, thereby preventing a judgement of the characters and the patterns. On the contrary, the area of the dot is desirably greater than 0.000025 square mm (preferably 0.0001 square mm). When the area of the dot is smaller than this, the efficiency of reflection of the light is lowered and the desired brightness can not be obtained, and the waveguide light is easily confused and diffracted, so that it becomes the same in the case of simply setting the light conductor plate to the rough surface.

An arrangement of the flat surface of the dot is desirably random. Because the dot in accordance with the present invention is fine, thereby preventing Moire generated by an interference with a regular pattern of the other members constituting the liquid crystal display apparatus, for example, a liquid crystal cell, a collar filter, a TFT pattern, a black stripe and the like. In the case that the shape of the flat surface of the dot is the substantially rectangular shape, it is better to arrange the pattern so that a longer line of the rectangle is substantially in parallel to the emitting surface of the light source. Because it is easy to intend to make the distribution of the emitting angle proper.

The density of the dot is desirably set smaller as the dot is closer to the light source in order to make the distribution of the brightness uniform.

Further, in the liquid crystal display apparatus in accordance with the present invention, it is effective for improving the brightness, making the distribution of the brightness proper and making the emitting angle proper to commonly employ the conventionally used sub materials such as the reflection plate, the diffusion plate, the light condensing plate and the like.

A description will be given below of a first embodiment in accordance with the present invention with reference to the accompanying drawings.

Figure 1:
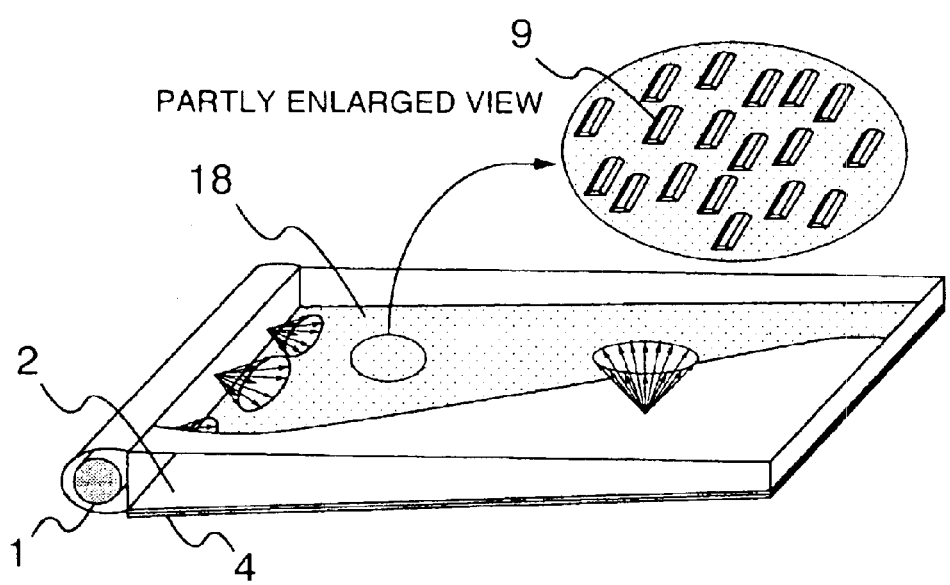
FIG. 1 is a perspective view of a back light apparatus portion of a liquid crystal display apparatus in accordance with the present invention.
Figure 2:
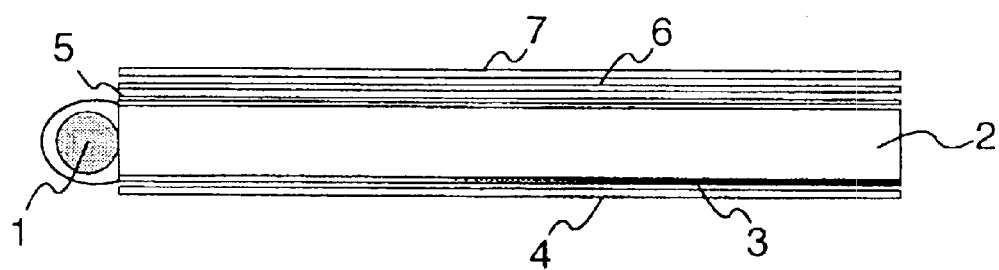
FIG. 2 is a cross sectional view of a conventional dot printing type light conductor plate.
Figure 3:
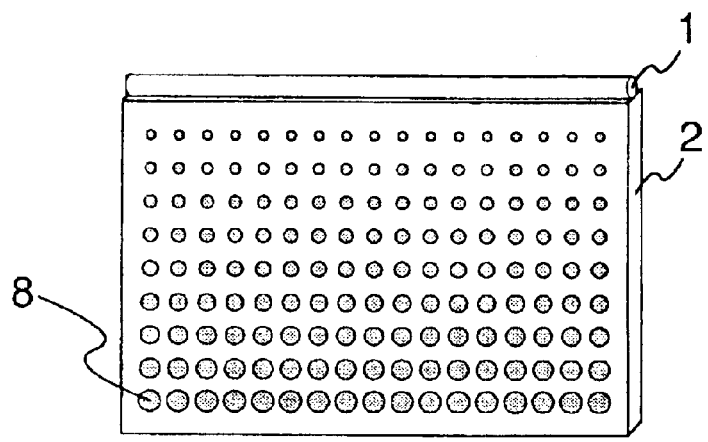
FIG. 3 is a schematic view of a dot printing in FIG. 2.
Figure 18:
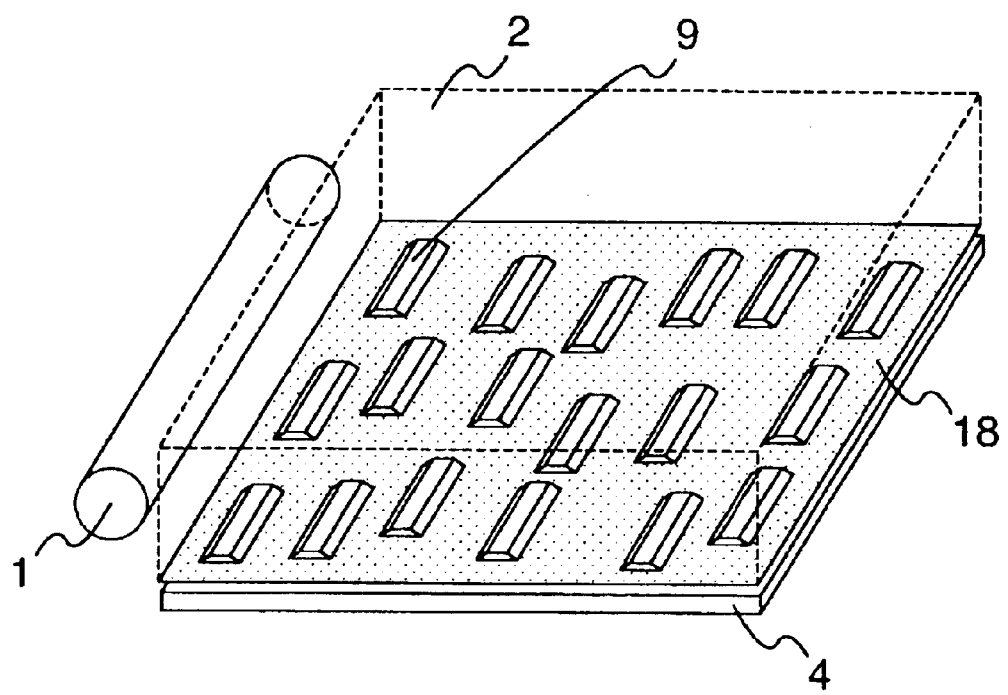
FIG. 18 is a perspective view which shows a small recess portion of a light conductor plate in accordance with the present invention.
Figure 19:
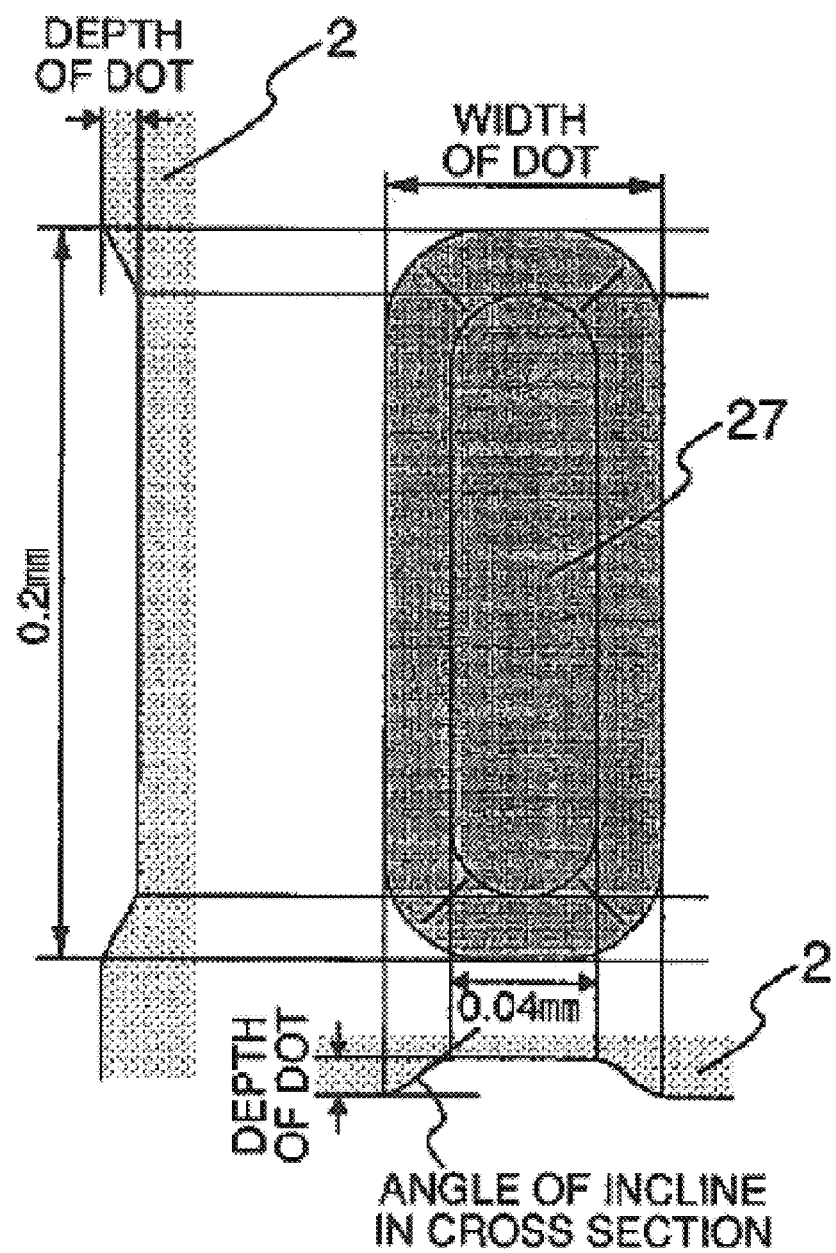
FIG. 19 is a schematic view of a shape of the small recess portion of the light conductor plate in accordance with the present invention.

FIG. 1 is a perspective view of a back light apparatus employed for the liquid crystal display apparatus in accordance with the present invention, FIG. 18 is a perspective view which shows a dot (a small recess portion) of the present embodiment, and FIG. 19 is a schematic view which explains a shape of the dot (the small recess portion) of the present embodiment.

The back light apparatus has a light source 1, a light conductor plate 2 and a reflection plate 4 as minimum constituting elements, and a dot 9 (a small recess portion) is formed on a light conductor plate lower surface 18 in the light conductor plate. Further, the dot is basically arranged at random.

Figure 20:
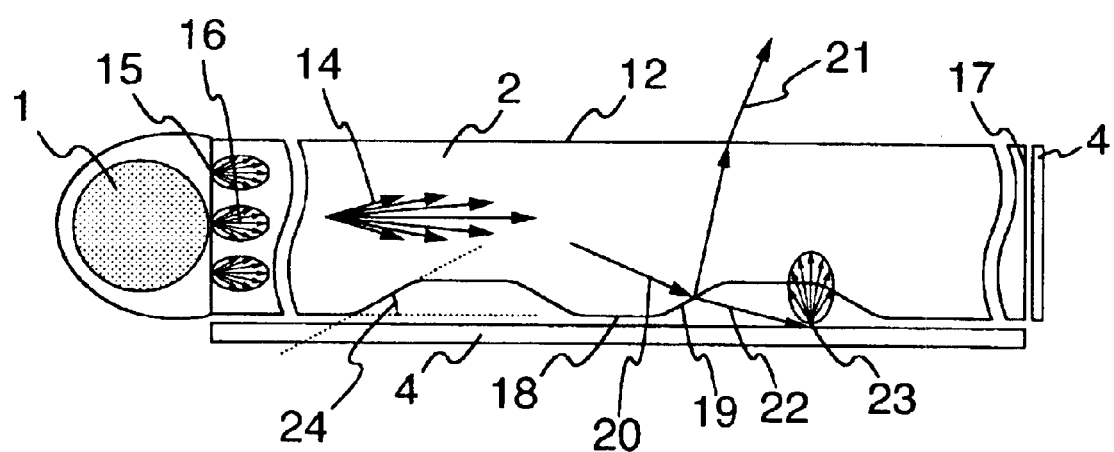
FIG. 20 is a view for explaining a locus of a light beam within the light conductor plate in accordance with a first embodiment of the present invention.

FIG. 20 shows a locus of a light beam of a light conductor plate waveguide light 14 which moves forward within the light conductor plate in accordance with the present invention. In FIG. 20, the emitting light from the light source is input to the light conductor plate at an end surface 15 of the light conductor plate in the side of the light source, as a light conductor plate incident light 16', becomes the light conductor plate waveguide light, and moves forward toward the other end surface 17 while repeating a total reflection on the light conductor plate lower surface 18 and a light conductor plate light emitting surface 12. A light beam 20 input to a inclined surface 19 of the small recess portion among the waveguide lights is reflected and brought into contact with a light emitting surface, is refracted there so as to be emitted from the light emitting surface, and is emitted as an emitting light beam 21. Then, the light beams which are not reflected become a dot inclined surface transmitting light beam 22 so as to be reflected 23 on the reflecting plate, and is again input to the light conductor plate 2, and a part thereof is emitted from the light emitting surface and the remainder become again the light conductor plate waveguide light. Accordingly, by suitably arranging the dots, it is possible to gradually emit the waveguide light from the light conductor plate so as to light the liquid crystal display element. Further, by properly controlling an angle of incline of a cross section 24, it is impossible to control the distribution of the angle of the emitting light from the light conductor plate. Further, a proper angle of the angle of incline of the cross section is influenced by a shape of the light conductor plate.

Figure 21A:
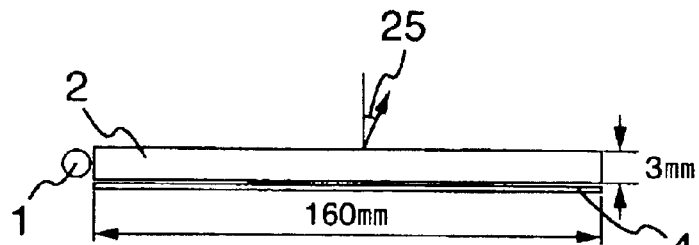
FIG. 21 is a schematic view of a shape of the light conductor plate in accordance with the present invention.
Figure 22:
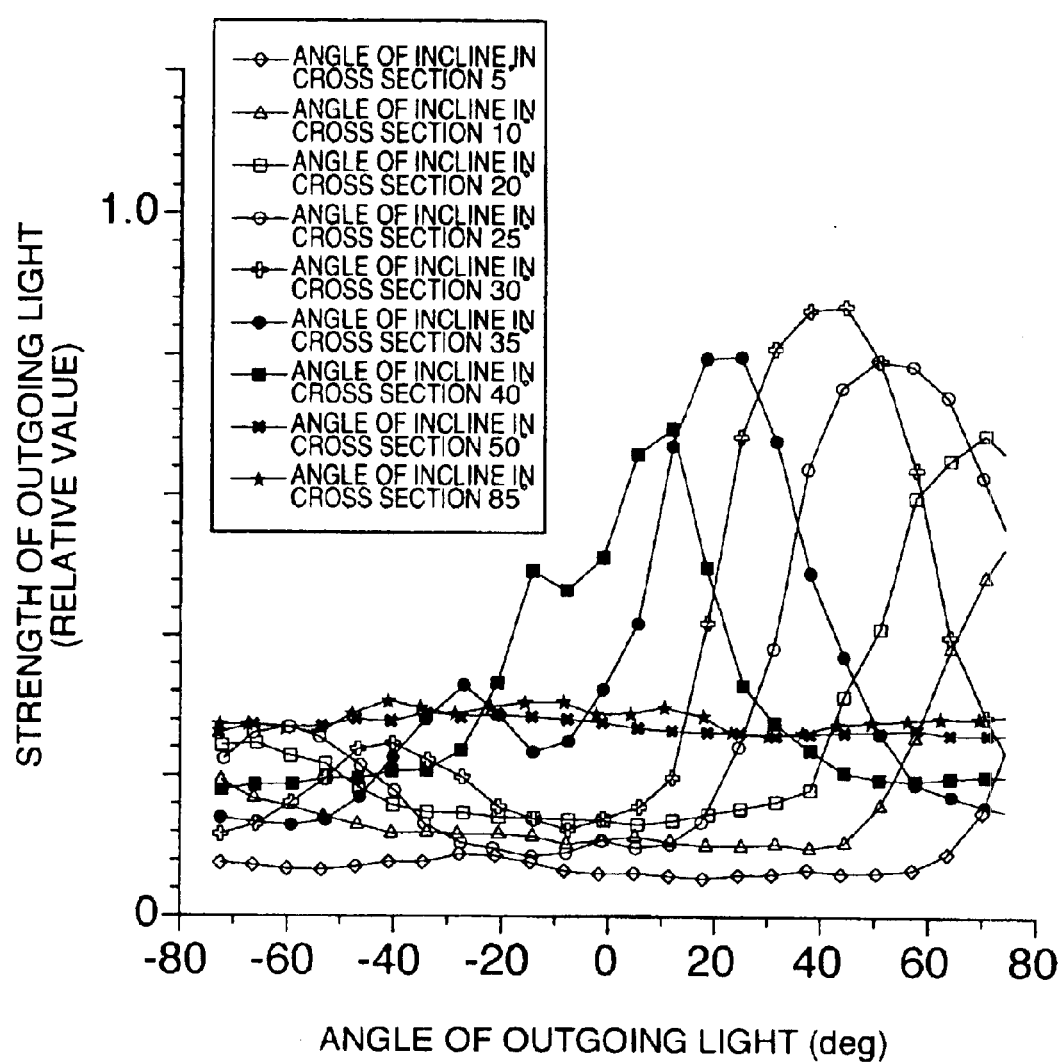
FIG. 22 is a first view of a relation between an angle of incline of a cross section of the small recess portion and an angle distribution of the emitting light in accordance with the first embodiment of the present invention.
Figure 23:
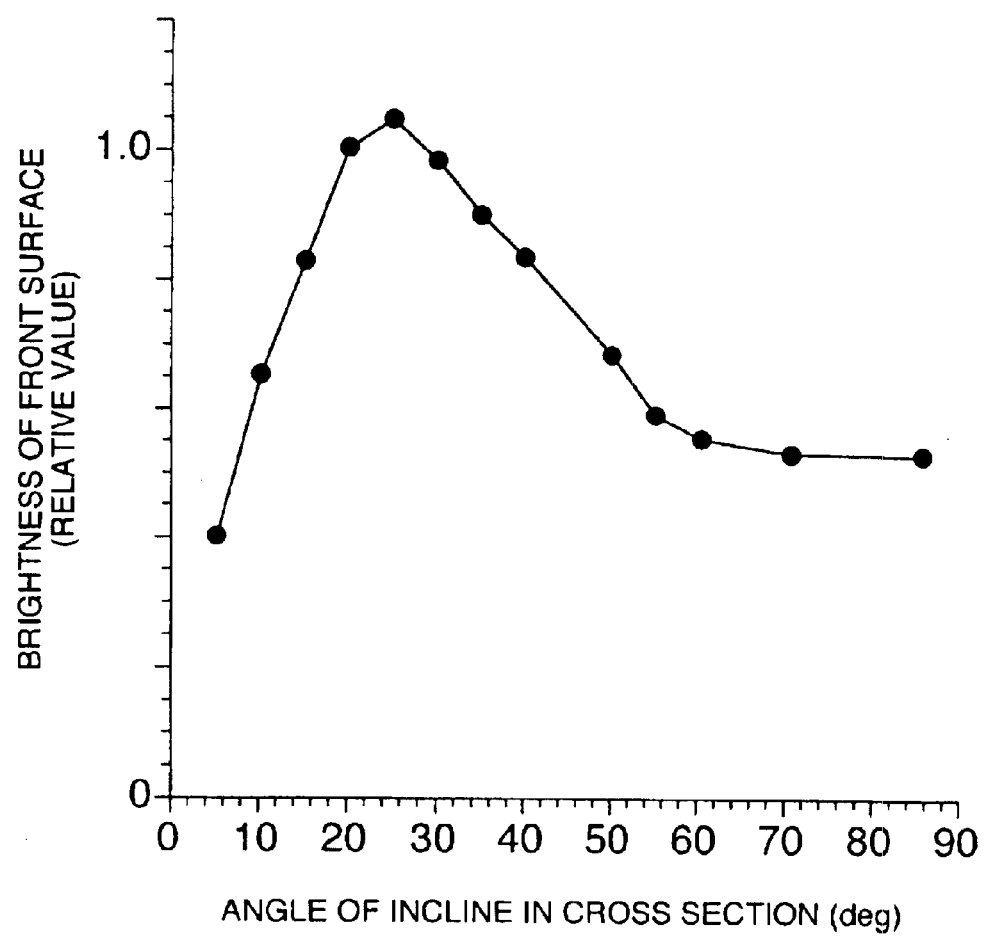
FIG. 23 is a first view of a relation between an angle of incline of a cross section of the small recess portion and a strength of the emitting light in accordance with the first embodiment of the present invention.

FIG. 21 is a view-which shows shapes of three types of light conductor plates manufactured in the first embodiment. FIG. 22 is a view which shows a relation between the angle of incline of the dot of the small recess portion in the light conductor plate in FIG. 21(A) and the distribution of the angles of the emitting lights from the light conductor plate. In this case, the emitting angle in a graph of FIG. 22 corresponds to an emitting angle 25 illustrated in FIG. 21. FIG. 23 is a view which shows a relation between the angle of incline of the cross section and the brightness of the front surface in the case of placing the diffusion plate, the first light condensing plate and the second light condensing plate on the light conductor plate in FIG. 21(A). In measurement, a depth of the small recess portion is set to 3 $\mu$m in the case that the angle of incline of the cross section is 10 degrees or less, and 8 $\mu$m in the case that it is 20 degrees or more. Further, the dot density is optimized and measured so that the whole of the light conductor plate is uniformly lightened. Further, as shown in FIG. 20, the reflecting plate 4 may be provided on the lower surface and the side surface of the light conductor plate.

FIG. 22 will be in detail described below. In the angle of incline of the cross section of 5 to 30 degrees, the emitting angle for the maximum strength of the emitting light is increased together with an increase of the angle of incline of the cross section, and the strength of the emitting light at that time is increased. When setting the angle of incline of the cross section to 30 to 50 degrees, the emitting angle is further increased together with an increase of the angle of incline of the cross section, however, the strength of the emitting light is reduced. Then, in the angle of incline of the cross section of 50 degrees or more, there is no apparent peak in the distribution of the angle of the emitting light.

This is because in the case that the angle of incline of the cross section is equal to or less than 30 degrees, the light conductor plate waveguide light is reflected under a condition similar to the total reflection due to the great incident angle and the reflective index is high when it is reflected on the small recess portion inclined surface 19, so that the emitting angle at which the strength of the emitting light becomes maximum is increased together with an increase of the angle of incline of the cross section, and the strength of the emitting light from the light emitting surface is increased. On the contrary, in the case that the angle of incline of the cross section is equal to or more than 30 degrees, when the light conductor plate waveguide light is reflected on the small recess portion inclined surface, the incident angle is reduced together with an increase of the angle of incline of the cross section, and the reflective index on the inclined surface of the small recess portion is reduced. Accordingly, the emitting angle at which the strength of the emitting light becomes maximum is increased together with the increase of the angle of incline of the cross section, however, the strength of the emitting light at that time is reduced. Further, in the angle of incline of the cross section of 50 degrees or more, the reflective index is greatly lowered, the dot inclined surface transmitting light 22 is mainly contained and the light 23 reflected on the reflecting plate becomes great, so that there is no apparent peak in the distribution of the angle. Further, the brightness of the front surface becomes peak when the angle of incline of the cross section is 25 degrees. This is because the light is smoothly emitted since in the case that the angle of incline of the cross section is close to 25 degrees, the reflection on the inclined surface of the small recess portion is close to a critical angle and has a high reflective index and the incident angle on the light conductor plate light emitting surface 12 is relatively small and has a high transmittance. On the contrary, when the angle of incline of the cross section is greater than the value close to 25 degrees, the dot inclined surface transmitting light becomes great and the loss at a time of reflecting on the reflecting plate and the like are increased. Further, since the reflective index when refracting and emitting on the light conductor plate light emitting surface 12 is increased when setting it equal to or less than this value, the number of the reflections within the light conductor plate is increased and the loss is increased, and it is impossible to secure a sufficient inclined surface of the small recess portion even when increasing the dot density to a maximum level.

In the embodiment mentioned above (FIG. 21(A)), an optimum angle of incline of the cross section is 15 to 40 degrees and 50 to 85 degrees. Particularly speaking, since the distribution of the angle of the emitting light from the light conductor plate is not important in the case of employing the light condensing plate and the diffusion plate, the optimum angle of incline of the cross section is 15 to 40 degrees (preferably 18 to 35 degrees) at which the brightness of the front surface becomes great. Further, in the case of not employing the light condensing plate, the optimum angle of incline of the cross section is equal to or more than 50 degrees at which the distribution of the angle of the emitting light becomes small. Further, when setting it to be equal to or more than 85 degrees, a formation becomes hard and it is not preferable.

Figure 21B:
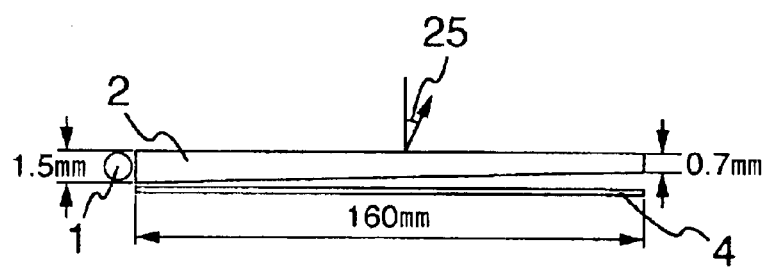
Figure 24:
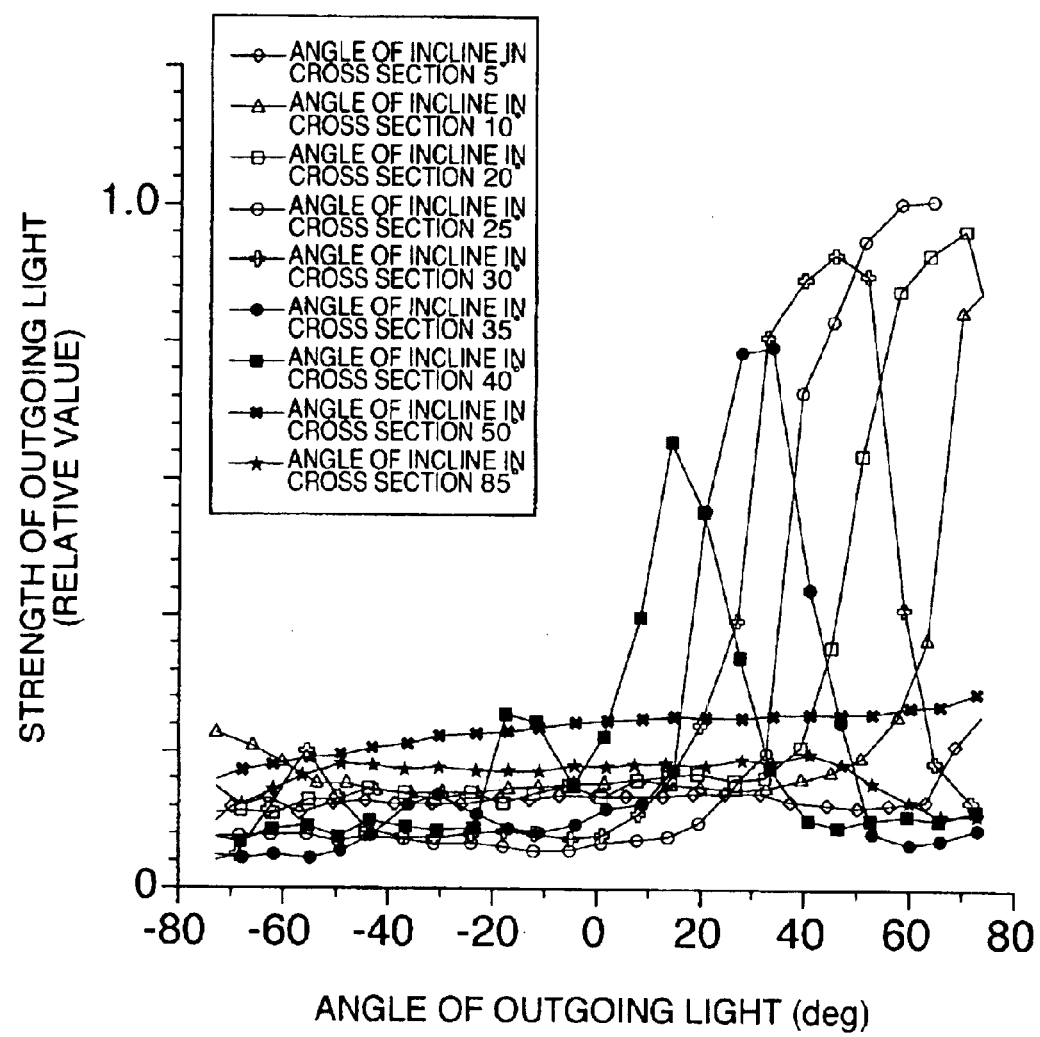
FIG. 24 is a second view of a relation between an angle of incline of a cross section of the small recess portion and an angle distribution of the emitting light in accordance with the first embodiment of the present invention.
Figure 25:
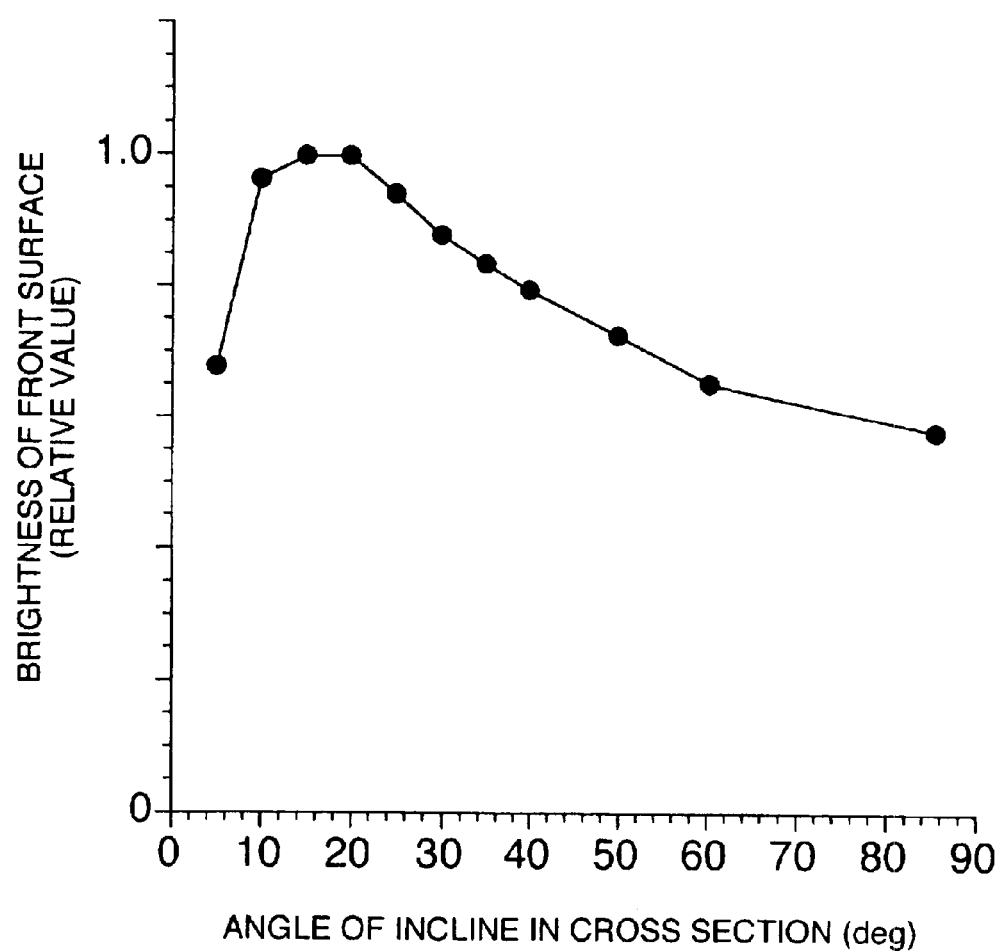
FIG. 25 is a second view of a relation between an angle of incline of a cross section of the small recess portion and a strength of the emitting light in accordance with the first embodiment of the present invention.

FIG. 24 is a view which shows a relation between the angle of incline of the dot of the small recess portion in the light conductor plate in FIG. 21(B) and the distribution of the angles of the emitting lights from the light conductor plate. FIG. 25 is a view which shows a relation between the angle of incline of the cross section and the brightness of the front surface in the case of placing the diffusion plate, the first light condensing plate and the second light condensing plate on the light conductor plate in FIG. 21(B). In measurement, a depth of the small recess portion is set to 3 μm in the case that the angle of incline of the cross section is 10 degrees or less, and 8 μm in the case that it is 20 degrees or more. Further, the dot density is optimized and measured so that the whole of the light conductor plate is uniformly lightened. Further, as shown in FIG. 20, the reflecting plate 4 is provided on the lower surface and the side surface of the light conductor plate.

FIG. 24 will be in detail described below. In the angle of incline of the cross section of 5 to 25 degrees, the emitting angle for the maximum strength of the emitting light is increased together with an increase of the angle of incline of the cross section, and the strength of the emitting light at that time is increased. When setting the angle of incline of the cross section to 25 to 50 degrees, the emitting angle is further increased together with an increase of the angle of incline of the cross section, however, the strength of the emitting light is reduced. Then, in the angle of incline of the cross section of 50 degrees or more, there is no apparent peak in the distribution of the angle of the emitting light.

This is because in the case that the angle of incline of the cross section is equal to or less than 25 degrees, the light conductor plate waveguide light is reflected under a condition similar to the total reflection due to the great incident angle and the reflective index is high when it is reflected on the small recess portion inclined surface, so that the emitting angle at which the strength of the emitting light becomes maximum is increased together with an increase of the angle of incline of the cross section, and the strength of the emitting light from the light emitting surface is increased. On the contrary, in the case that the angle of incline of the cross section is equal to or more than 25 degrees, when the light conductor plate waveguide light is reflected on the small recess portion inclined surface, the incident angle is reduced together with an increase of the angle of incline of the cross section, and the reflective index on the inclined surface of the small recess portion is reduced. Accordingly, the emitting angle at which the strength of the emitting light becomes maximum is increased together with the increase of the angle of incline of the cross section, however, the strength of the emitting light at that time is reduced. Further, in the angle of incline of the cross section of 50 degrees or more, the reflective index is greatly lowered, the dot inclined surface transmitting light is mainly contained and the confused light on the reflecting plate becomes great, so that there is no apparent peak in the distribution of the angle. The position of the peak in this case is different from 30 degrees in FIG. 21(A) because the angle of incline of the cross section becomes substantially great and the waveguide light within the light conductor plate repeats the total reflection, whereby the angle formed between the light conductor plate and the waveguide light within the light conductor plate is increased since the light conductor plate is not flat and a thickness in the side of the light source is formed in a thick wedge shape.

Further, the brightness of the front surface becomes peak when the angle of incline of the cross section is 15 to 20 degrees. Here, the position of the peak is different from 25 degrees in FIG. 21(A) because the angle of incline of the cross section becomes substantially great and the waveguide light within the light conductor plate repeats the total reflection, whereby the angle formed between the light conductor plate and the waveguide light within the light conductor plate is increased since the light conductor plate is not flat and a thickness in the side of the light source is formed in a thick wedge shape.

In the embodiment mentioned above (FIG. 21(B)), an optimum angle of incline of the cross section is 10 to 25 degrees and 50 to 85 degrees. Particularly speaking, since the distribution of the angle of the emitting light from the light conductor plate is not important in the case of employing the light condensing plate and the diffusion plate, the optimum angle of incline of the cross section is 10 to 25 degrees at which the brightness of the front surface becomes great. Further, in the case of not employing the light condensing plate, the optimum angle of incline of the cross section is equal to or more than 50 degrees at which the distribution of the angle of the emitting light becomes small. Further, when setting it to be equal to or more than 85 degrees, a formation becomes hard and it is not preferable.

Figure 21C:
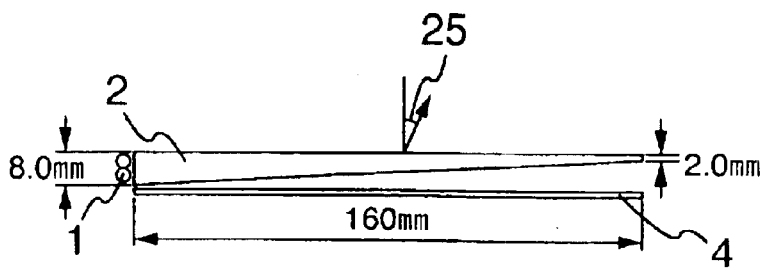
Figure 26:
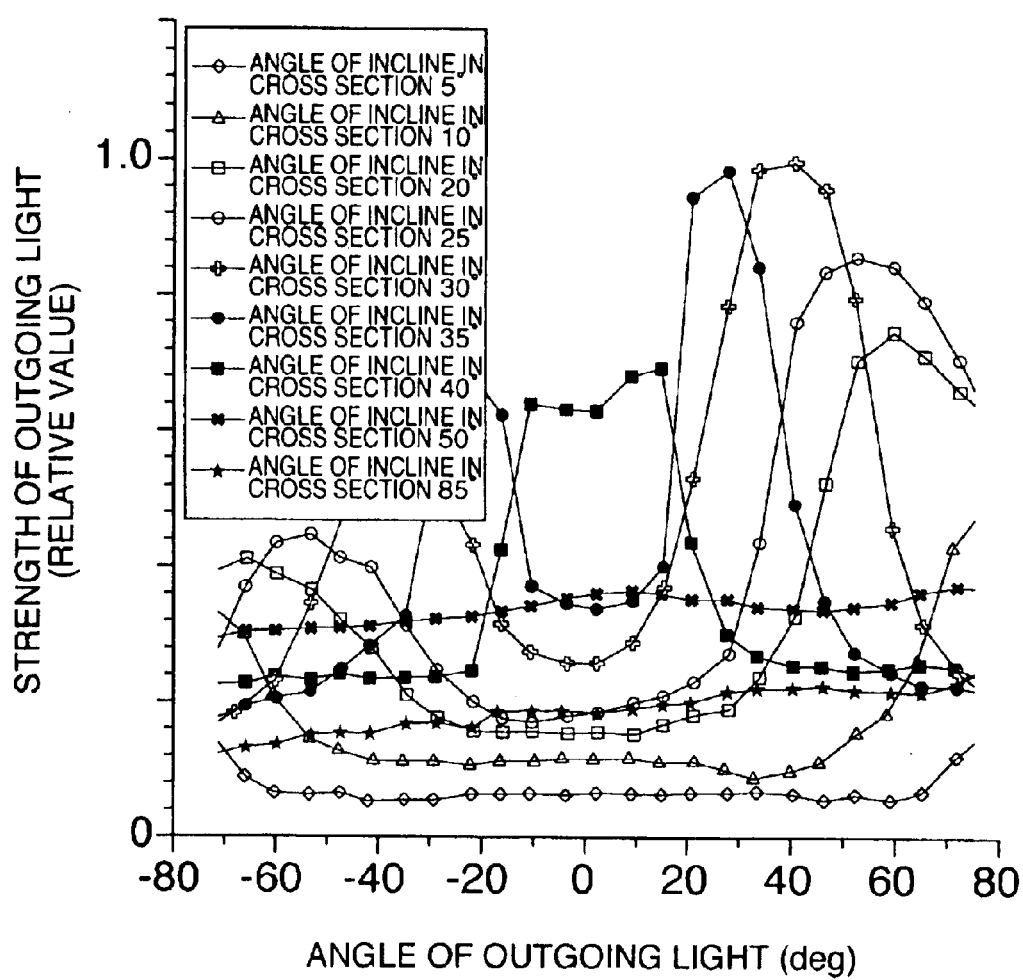
FIG. 26 is a third view of a relation between an angle of incline of a cross section of the small recess portion and an angle distribution of the emitting light in accordance with the first embodiment of the present invention.
Figure 27:
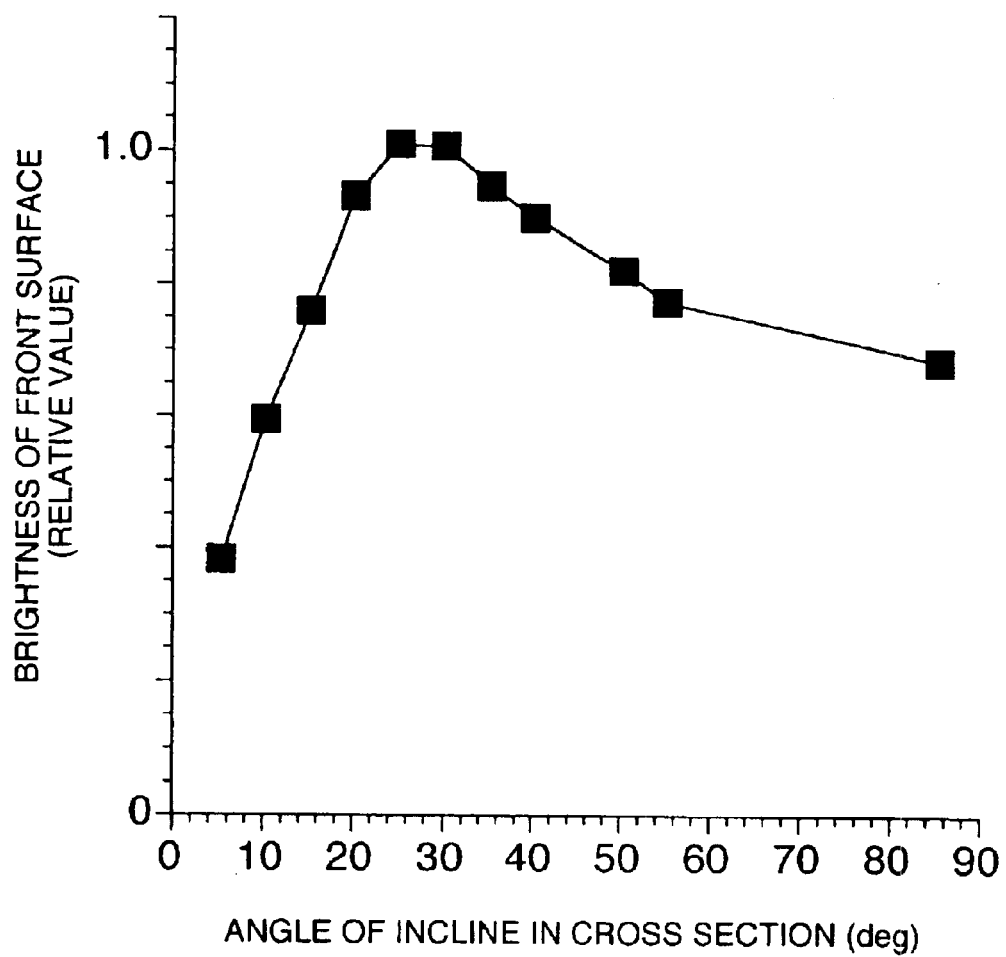
FIG. 27 is a third view of a relation between an angle of incline of a cross section of the small recess portion and a strength of the emitting light in accordance with the first embodiment of the present invention.

FIG. 26 is a view which shows a relation between the angle of incline of the dot of the small recess portion in the light conductor plate in FIG. 21(C) and the distribution of the angles of the emitting lights from the light conductor plate. FIG. 27 is a view which shows a relation between the angle of incline of the cross section and the brightness of the front surface in the case of placing the diffusion plate, the first light condensing plate and the second light condensing plate on the light conductor plate in FIG. 21(C). In measurement, a depth of the small recess portion is set to 3 μm in the case that the angle of incline of the cross section is 10 degrees or less, and 8 μm in the case that it is 20 degrees or more. Further, the dot density is optimized and measured so that the whole of the light conductor plate is uniformly lightened. Further, as shown in FIG. 20, the reflecting plate 4 is provided on the lower surface and the side surface of the light conductor plate.

FIG. 26 will be in detail described below. In the angle of incline of the cross section of 5 to 30 degrees, the emitting angle for the maximum strength of the emitting light is increased together with an increase of the angle of incline of the cross section, and the strength of the emitting light at that time is increased. When setting the angle of incline of the cross section to 30 to 50 degrees, the emitting angle is further increased together with an increase of the angle of incline of the cross section, however, the strength of the emitting light is reduced. Then, in the angle of incline of the cross section of 50 degrees or more, there is no apparent peak in the distribution of the angle of the emitting light.

This is because in the case that the angle of incline of the cross section is equal to or less than 30 degrees, the light conductor plate waveguide light is reflected under a condition similar to the total reflection due to the great incident angle and the reflective index is high when it is reflected on the small recess portion inclined surface, so that the emitting angle at which the strength of the emitting light becomes maximum is increased together with an increase of the angle of incline of the cross section, and the strength of the emitting light from the light emitting surface is increased. On the contrary, in the case that the angle of incline of the cross section is equal to or more than 30 degrees, when the light conductor plate waveguide light is reflected on the small recess portion inclined surface, the incident angle is reduced together with an increase of the angle of incline of the cross section, and the reflective index on the inclined surface of the small recess portion is reduced. Accordingly, the emitting angle at which the strength of the emitting light becomes maximum is increased together with the increase of the angle of incline of the cross section, however, the strength of the emitting light at that time is reduced. Further, in the angle of incline of the cross section of 50 degrees or more, the reflective index is greatly lowered, the dot inclined surface transmitting light is mainly contained and the light 23 reflected on the reflecting plate becomes great, so that there is no apparent peak in the distribution of the angle. Further, the brightness of the front surface becomes peak when the angle of incline of the cross section is 25 to 30 degrees.

In the embodiment mentioned above (FIG. 21(C)), an optimum angle of incline of the cross section is 18 to 43 degrees and 50 to 85 degrees. Particularly speaking, since the distribution of the angle of the emitting light from the light conductor plate is not important in the case of employing the light condensing plate and the diffusion plate, the optimum angle of incline of the cross section is 18 to 43 degrees (preferably 25 to 35 degrees) at which the brightness of the front surface becomes great. Further, in the case of not employing the light condensing plate, the optimum angle of incline of the cross section is equal to or more than 50 degrees at which the distribution of the angle of the emitting light becomes small. Further, when setting it to be equal to or more than 85 degrees, a formation becomes hard and it is not preferable.

As mentioned above, the optimum angle of incline of the cross section varies in accordance with the thickness and the shape of the light conductor plate, however, as a result of various consideration, the optimum angle of incline of the cross section is 7 to 85 degrees. Particularly speaking, in the case of employing the diffusion plate and/or the light condensing plate, since the distribution of the angles of the emitting lights from the light conductor plate is not important, the optimum angle of incline of the cross section is 7 to 43 degrees (preferably 10 to 40 degrees) at which the brightness of the front surface becomes great. Further, in the case of not employing the light condensing plate, the optimum angle of incline of the cross section is equal to or more than 50 degrees at which the distribution of the angles of the emitting lights becomes small. Further, since the formation becomes hard when setting it to 85 degrees or more, it is not preferable.

Next, a description will be given of various kinds of shapes of the small recess portion of the light conductor plate in accordance with the present invention more particularly.

FIG. 19 is a view which shows a shape of a dot (a small recess portion) in accordance with a first embodiment. In this embodiment, a shape of a flat surface of the dot is formed in a substantially rectangular shape. In this case, in the present embodiment, in addition to the substantially rectangular shape, a regular square (B), a circular shape (C), a substantially circular shape (D) (a shape obtained by partly deforming a circle), a regular polygonal shape (E), a trapezoidal shape (F) and a shape obtained by combining them (G) shown in FIG. 28 can be used. The substantially rectangular shape has a little confusion and is suitable for improving the brightness of the front surface, and since in the others, the confusion component is great, they are effective in preventing the shadow from generating from the light inputting surface. That is, it is possible to make the size of the dot in the shadow generating portion from the light inputting surface of the light conductor plate small and achieve the confusion effect so as to delete the shadow.

Figure 29A:
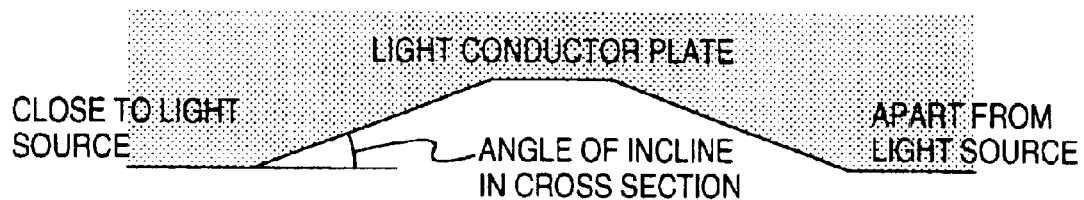
FIG. 29 is a view of a cross sectional shape of the small recess portion in accordance with the present invention.
Figure 29B:
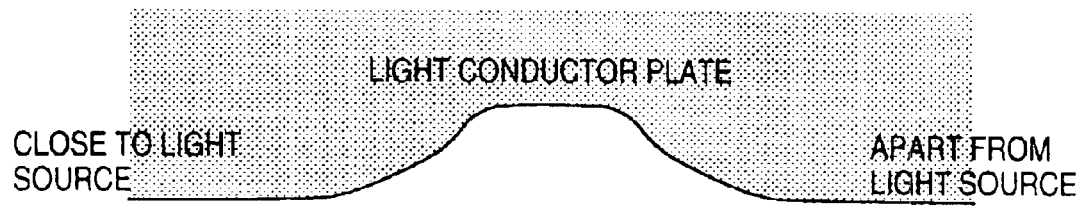
Figure 29C:
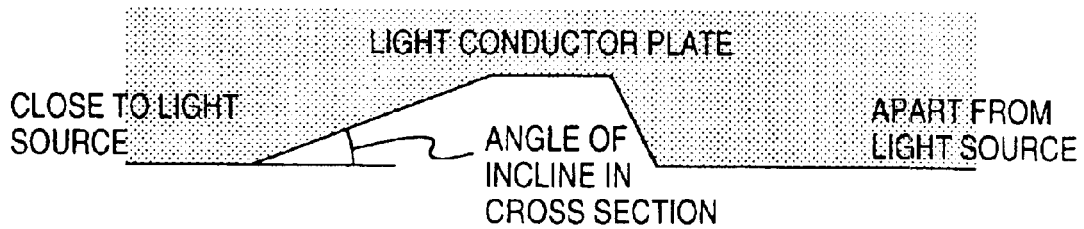

FIG. 29(C) explains a cross sectional shape of the small recess portion in accordance with the present invention except FIGS. 7 to 16. FIG. 29(A) shows an example in which the cross sectional shape of the small recess portion is trapezoidal. FIG. 29(B) shows one in which the cross sectional shape of the small recess portion is substantially trapezoidal and an edge thereof is formed in a smooth R shape. This shape is effective in the case of taking into consideration dispersion of a manufacturing condition for actually forming the light conductor plate. Further, since the edge is formed in the smooth R shape, the confusion is hard to be generated and the effect can be obtained for improving the brightness. FIG. 29(C) shows an example in which the cross sectional shape of the small recess portion is asymmetrical, and it has an advantage of increasing a density of the dot. In this case, the edge formed in the smooth R shape shown in FIG. 29(B) is not limited to be applied to the cross sectional shape of the trapezoidal shape, but can be applied to the other shapes.

Next, a description will be given of a depth of the small recess portion of the light conductor plate in accordance with the present invention more particularly.

Figure 30:
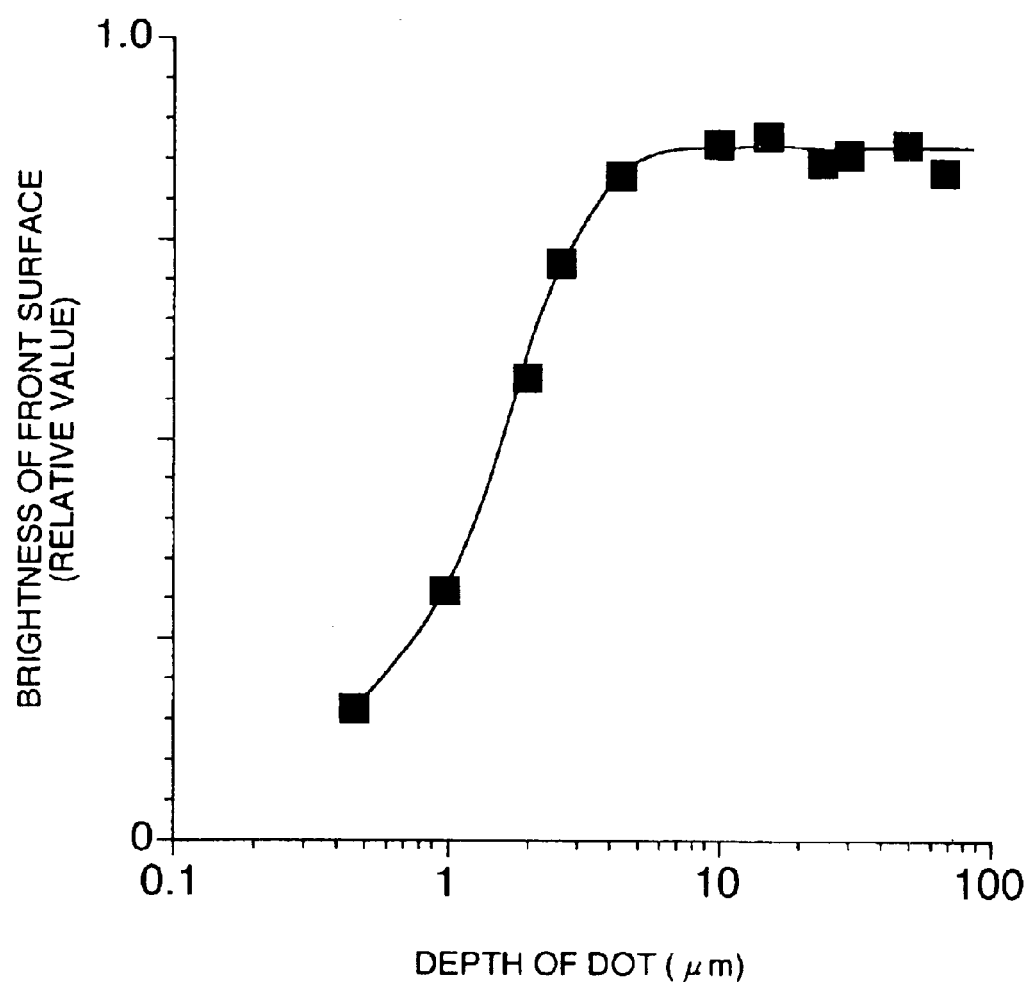
FIG. 30 is a view of a relation between a depth of the small recess portion and a strength of the emitting light in accordance with the present invention.

FIG. 30 is a view which shows a relation between a dot depth and a brightness of the front surface in the case of placing the diffusion plate, the first light condensing plate and the second light condensing plate on the light conductor plate in FIG. 21(A). In the measurement, as shown in FIG. 19, a measurement is performed by fixing the size of the dot bottom surface 26 to about 0.2×0.04 mm and the angle of incline of the cross section to 30 degrees and optimizing the dot density so that the whole of the light conductor plate is uniformly lighted up. Further, as shown in FIG. 20, the reflecting plate 4 is placed on the lower surface of the light conductor plate and the side surface of the light conductor plate.

In accordance with FIG. 30, it is desirable that the depth of the small recess portion is set to be equal to or more than 2 $\mu$m (preferably 5 $\mu$m or more) in order to efficiently perform a reflection of the waveguide light within the light conductor plate. The reason is that in the case that the dot depth is equal to or less than 2 $\mu$m, it is hard to sufficiently secure the area of the inclined surface 19 of the small recess portion even when increasing the dot density to a maximum value. Further, because when the height of the small recess portion is low, the waveguide light is easily confused and diffracted, and the same phenomenon occurs in the case of simply forming the light conductor plate in a rough surface.

Further, an upper limit of the depth of the small recess portion is desirable to be equal to or less than 100 $\mu$m (preferably 40 $\mu$m or less). Because in the case that the depth of the small recess portion is greater than this, the brightness of the front surface does not appear, but the size of the dot is increased so as to cause a dot visibility.

Next, a description will be given of a size of the small recess portion of the light conductor plate in accordance with the present invention more particularly. The size of the small recess portion is desirably set such that the area thereof is equal to or more than 0.000025 square mm (preferably 0.0001 square mm or more). The reason is that in the case that the dot area is equal to or less than 0.000025 square mm, the waveguide light is easily confused and diffracted and the same phenomenon occurs in the case of simply forming the light conductor plate in a rough surface.

Further, in the case that the shape of the flat surface of the dot is formed in a substantially rectangular shape, a short line thereof is desirable to be equal to or more than 30 $\mu$m. This is because in the case of forming the shape of the flat surface of the dot in the substantially rectangular shape, it is necessary to increase the size of the dot at a certain degree in order to reduce the confusion. This is because a confusion is generated in an edge portion of the dot, that is, a joint portion between the inclined surface of the dot and the other portions, so that a rate of the portion where the confusion is generated occupied in the dot is increased in comparison with the inclined surface of the dot when the short line of the dot is small, whereby the confusion becomes large. That is, in the case that the shape of the flat surface of the dot is formed in the substantially rectangular shape, it is preferable that the dot is greater within the range where the dot visibility is not generated. Further, in a manufacturing method mentioned below, in order to employ an inexpensive film mask for a mask and a large-sized sealed type full exposing machine when exposing a resist, the short line is desirable to be equal to or more than 30 $\mu$m.

Further, when the dot is too large, the dot visibility is caused. FIG. 31 is a view which shows a result of searching a relation between the size of the dot and the dot visibility. As a result of considering various kinds of conditions, in the case that the dot shape is formed in a circular shape, a regular square and the like, with taking into consideration setting the light condensing plate to one sheet, the area thereof is desirable to be equal to or less than 0.2 square mm (preferably 0.05 square mm or less). In the case that the shape of the dot is formed in the substantially rectangular shape, the short line thereof is desirable to be equal to or less than 200 $\mu$m (preferably 100 $\mu$m or less). Further, a ratio between the short line and the long line is desired to be equal to or less than 80 (preferably 20 or less). In the case of being equal to or more than these values, there is a possibility of generating the dot visibility.

Since the light strength from the light source is generally lowered as it is apart from the light source within the light conductor plate, the density, the height or the size of the small recess portion is changed in accordance therewith, and the structure is made such that the distribution of the strengths of the small projecting portion reflecting light, that is, the brightness becomes uniform all around the whole surface of the light conductor plate. In the present invention, in the case of the simple light source, it is preferable to form so that that the density of the small projecting portion increase in a manner of an exponential function or a power series from the end surface in the side of the light source toward the opposing end surface of the light conductor plate. However, taking the reflection of the light on the end surface of the light conductor plate opposing to the light source-side, there are many cases that the uniformity of the brightness can be achieved by reducing the density as moving near the end surface, in the adjacent of the opposing end surfaces of the light conductor plate mentioned above.

Next, a description will be given of a structure of a back light apparatus in accordance with the present invention with reference to FIG. 32.

Figure 32A:
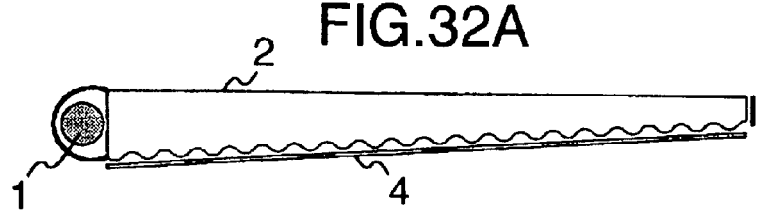
FIG. 32 is a schematic view of a structure in accordance with the present invention.

FIG. 32(A) is an embodiment of a simple light source and a wedge-shaped light conductor plate. It is characterized by employing a light conductor plate in which a thickness of the light conductor plate is reduced in inverse proportion to a distance from the light source, and is effective in making the distribution of the strengths of the light conductor plate emitting light, reducing the thickness of the light conductor plate and lightening.

Figure 32B:
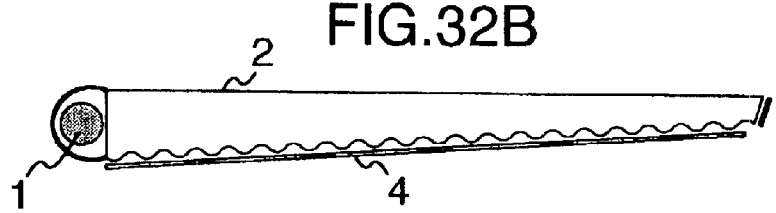

FIG. 32(B) is an embodiment which employs a single light source and gives an incline to the end surface of the light conductor plate opposite to the light source, and is characterized by changing an angle of the waveguide light which is not emitted from the light emitting surface and reaches the end surface of the light conductor plate opposite to the light source among the waveguide lights so as to make it easy to emit the waveguide light. Accordingly, it is easy to uniform the distribution of the strengths of the light conductor plate emitting light, and it is possible to reduce a light loss.

Figure 32C:
Figure 32D:
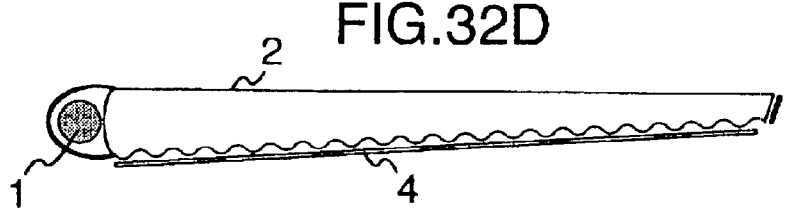

FIGS. 32(C) and (D) show an embodiment in which the end surface of the light conductor plate in the side of the light source is formed in a recess shape and a convex shape so as to adjust an expanding angle of the light conductor plate incident light. It is effective for controlling the distribution of the angles of the light emitted from the light emitting surface.

Figure 32E:
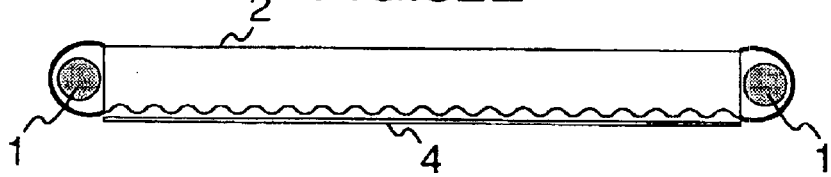

FIG. 32(E) shows an embodiment which is of a type having two light sources and employs a flat plate for the light conductor plate.

Figure 32F:
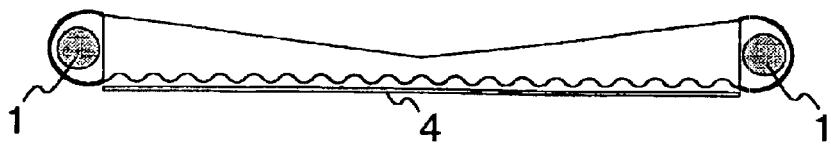

FIG. 32(F) shows an embodiment which is of a type having two light sources and changes a thickness of a light conductor plate for compensating unevenness of the brightness due to the distance from the light source. The structure of the back light apparatus mentioned above is not limited to the illustrated one, and can be made by combining them.

Next, a description will be given of a second embodiment in accordance with the present invention with reference to the accompanying drawings.

Figure 33:
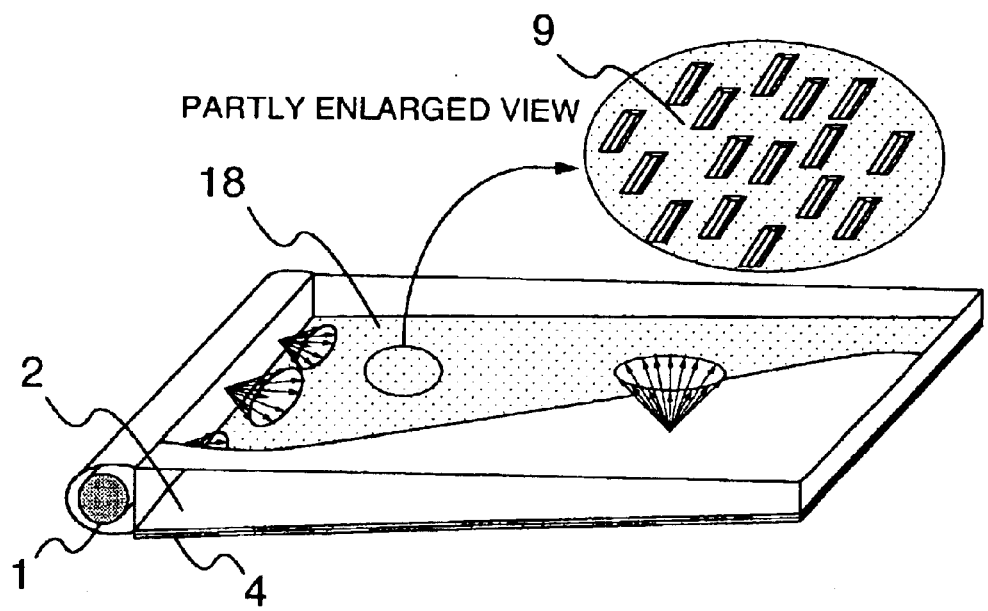
FIG. 33 is a perspective view of a back light apparatus portion in accordance with a second embodiment of a liquid crystal display apparatus of the present invention.
Figure 34:
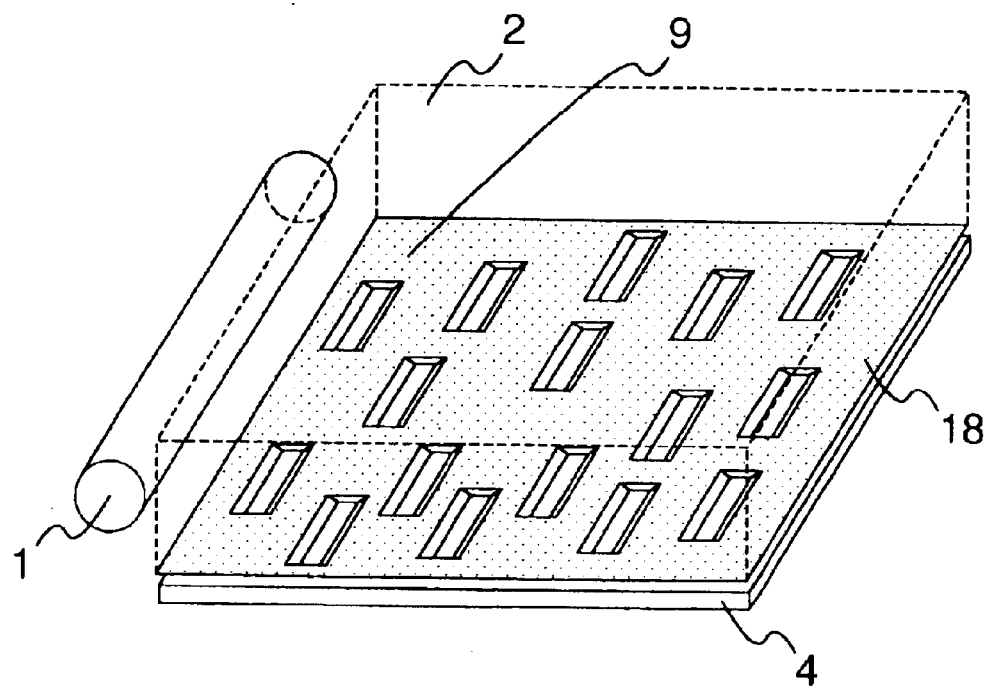
FIG. 34 is a perspective view which shows a small projecting portion of the light conductor plate in accordance with the present invention.
Figure 35:
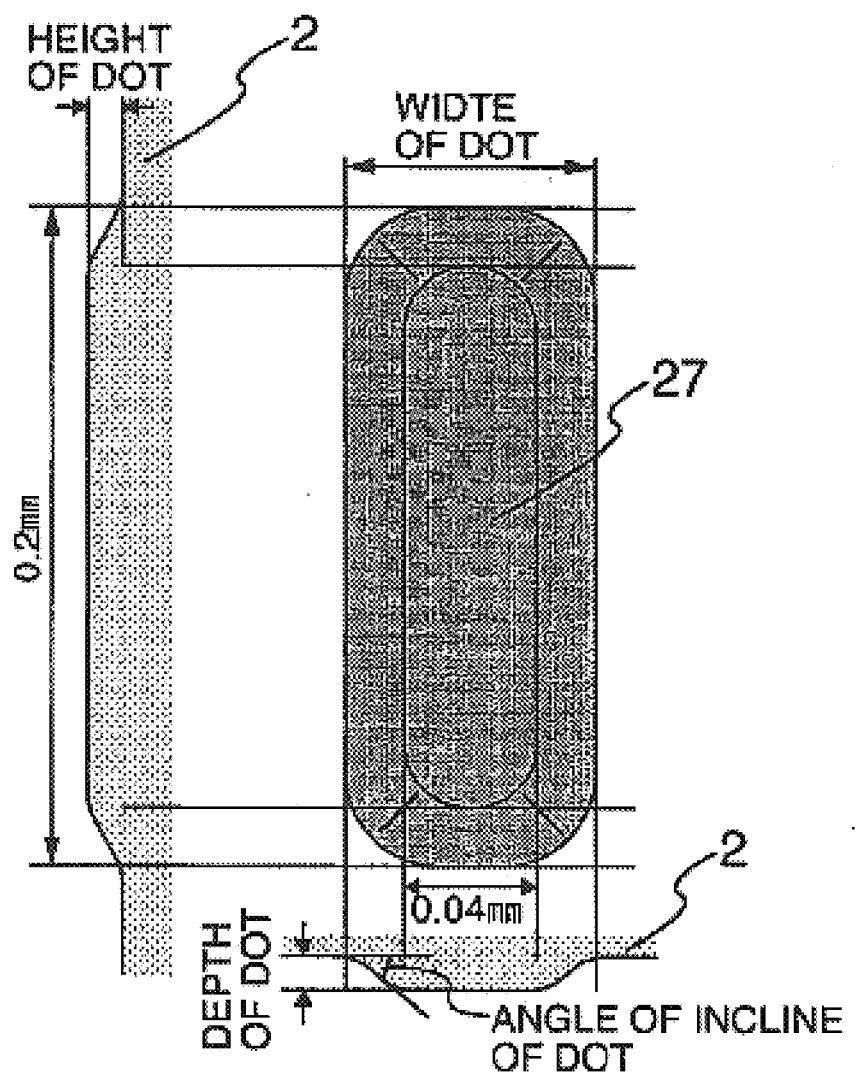
FIG. 35 is a schematic view of a shape of a small projecting portion of the light conductor plate in accordance with the present invention.

FIG. 33 is a perspective view of a back light apparatus in accordance with the present invention, FIG. 34 is a perspective view which shows a dot (a small projecting portion) in accordance with the present embodiment, and FIG. 35 is a view which explains a shape of a dot (a small projecting portion) in accordance with the present embodiment.

The back light apparatus has a light source 1, a light conductor plate 2 and a reflection plate 4 as minimum constituting elements, and a dot 9 (a small projecting portion) is formed on a light conductor plate lower surface 18 in the light conductor plate. Further, the dot is basically arranged at random.

Figure 36:
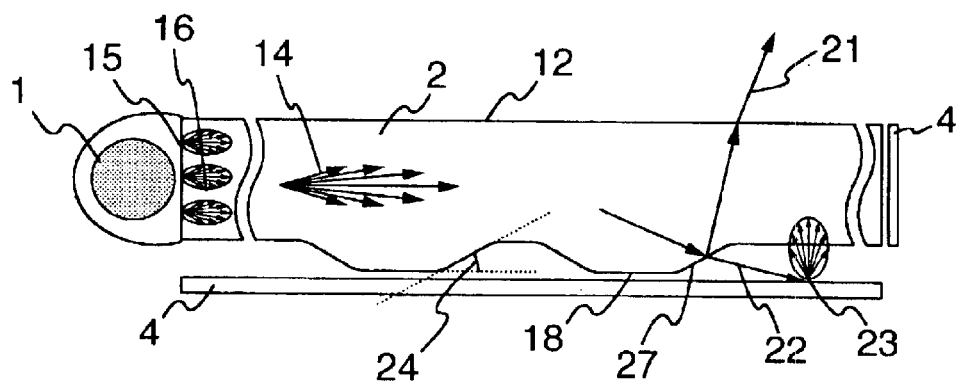
FIG. 36 is a view for explaining a locus of a light beam within the light conductor plate in accordance with the present invention.

FIG. 36 shows a locus of a light beam of a light conductor plate waveguide light 14 which moves forward within the light conductor plate in accordance with the present invention. In FIG. 36, the emitting light from the light source 1 is input to the light conductor plate 2 at an end surface 15 of the light conductor plate in the side of the light source, as a light conductor plate incident light 16, becomes the light conductor plate waveguide light 14, and moves forward toward the other end surface while repeating a total reflection on the light conductor plate lower surface 18 and a light conductor plate light emitting surface 12. Apart of the light beam input to a inclined surface 27 of the small projecting portion among the waveguide lights is reflected and brought into contact with a light emitting surface 12 of the light conductor plate, is refracted there so as to be emitted from the light emitting surface, and is emitted as an emitting light beam 21. Then, the light beams which are not reflected become a dot inclined surface transmitting light beam 22 so as to be reflected 23 on the reflecting plate, and is again input to the light conductor plate 2, and a part thereof is emitted from the light emitting surface and the remainder become again the light conductor plate waveguide light. Accordingly, by suitably arranging the small projecting portions, it is possible to gradually emit the waveguide light from the light conductor plate so as to light the liquid crystal display element. Further, by properly controlling an angle of incline of a cross section, it is possible to control the distribution of the angle of the emitting light from the light conductor plate.

Figure 37:
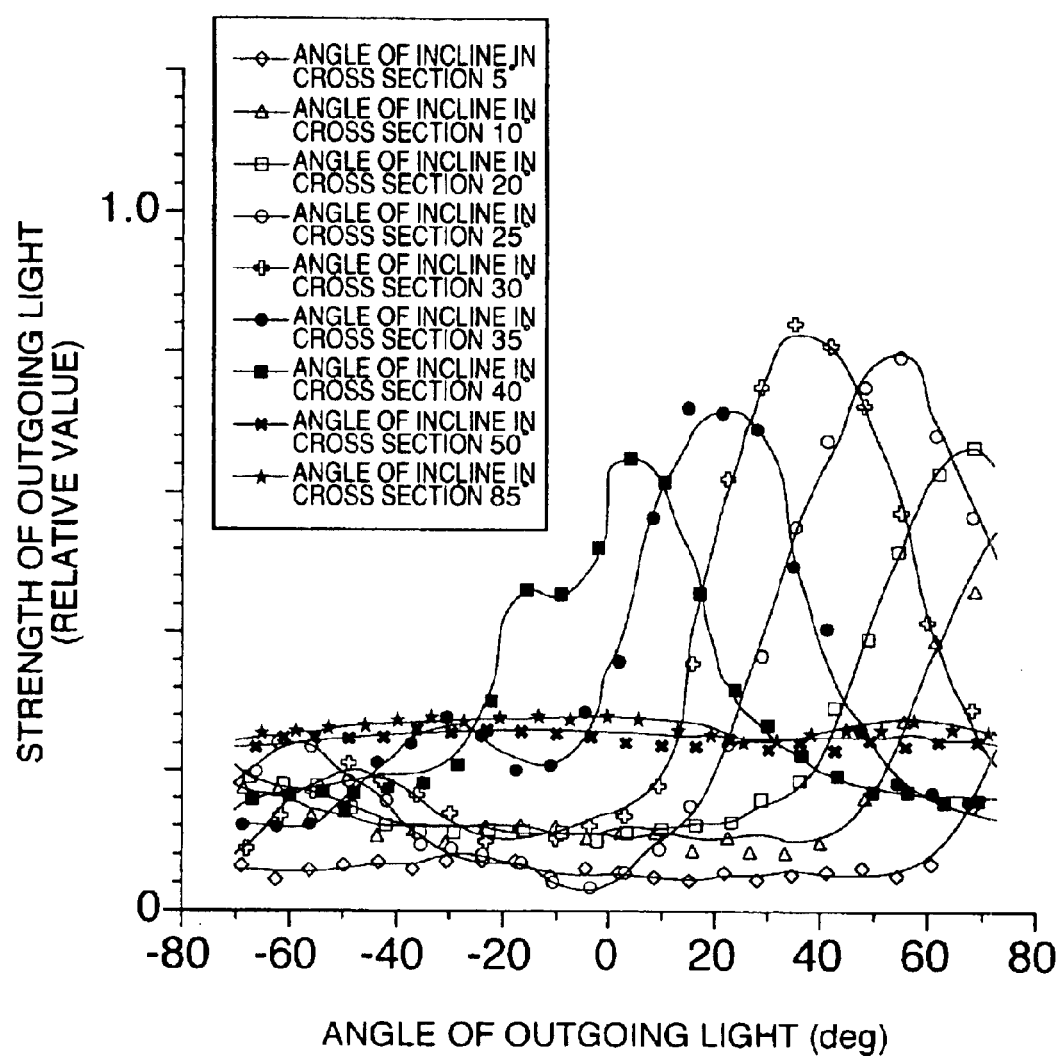
FIG. 37 is a view of a relation between an angle of incline of a cross section of the small projecting portion and an angle distribution of the emitting light in accordance with the second embodiment of the present invention.
Figure 38:
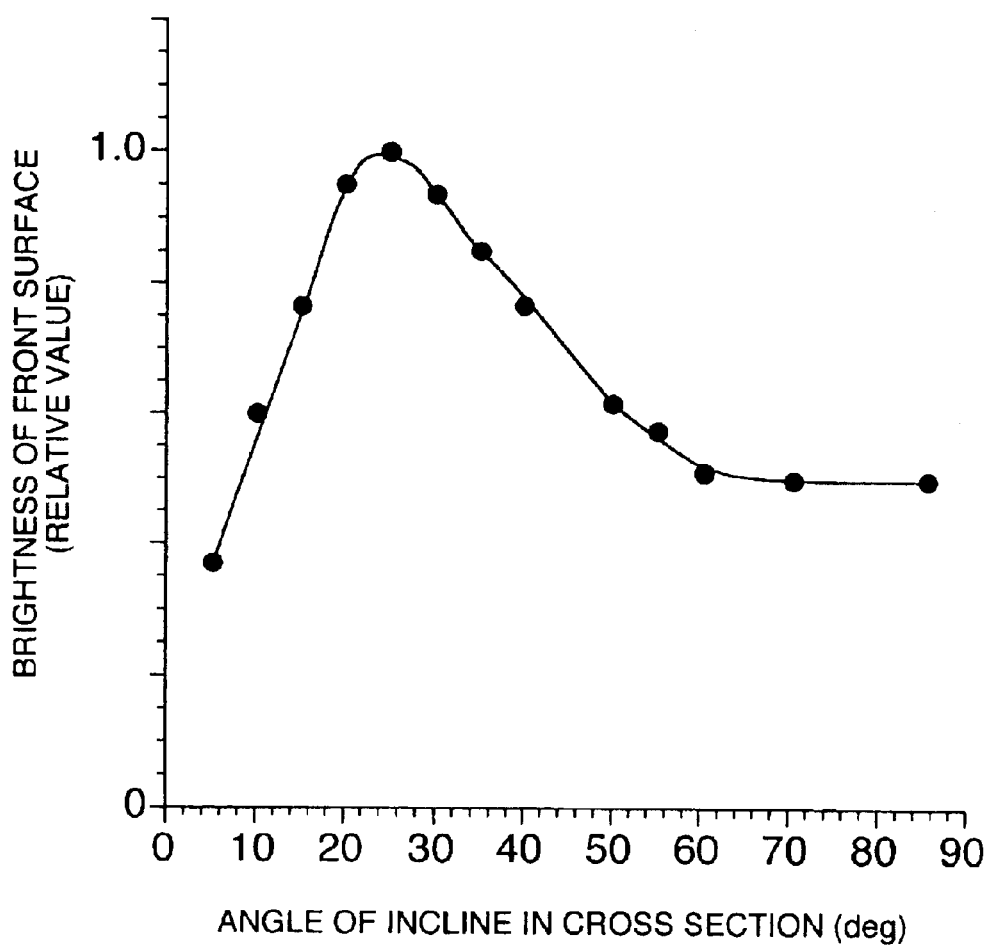
FIG. 38 is a view of a relation between an angle of incline of a cross section of the small projecting portion and a strength of the emitting light in accordance with the second embodiment of the present invention.

FIG. 37 is a view which shows a relation between the angle of incline of the dot of the small projecting portion and the distribution of the angles of the emitting lights from the light conductor plate. In this case, the outer shape of the light conductor plate is the same as that shown in FIG. 21(A), and the emitting angle in a graph corresponds to an emitting angle 25 illustrated in FIG. 21. FIG. 38 is a view which shows a relation between the angle of incline of the cross section and the brightness of the front surface in the case of placing the diffusion plate, the first light condensing plate and the second light condensing plate on the light conductor plate mentioned above. In measurement, a depth of the small recess portion is set to 3 $\mu$m in the case that the angle of incline of the cross section is 10 degrees or less, and 8 $\mu$m in the case that it is 20 degrees or more. Further, the dot density is optimized and measured so that the whole of the light conductor plate is uniformly lightened. Further, in the same manner as that of the first embodiment, the reflecting plate 4 is provided on the lower surface and the side surface of the light conductor plate.

FIGS. 37 and 38 show substantially the same result as the result of the light conductor plate in FIG. 21(A) in accordance with the first embodiment. This is because the surface on which the dot is reflected is different, however, the mechanism for emitting the light is substantially the same. Accordingly, the optimum angle of incline of the cross section is 7 to 85 degrees which is the same as that of the first embodiment. Particularly speaking, in the case of employing the diffusion plate and/or the light condensing plate, since the distribution of the angles of the emitting light from the light condensing plate is not important, the optimum angle of incline of the cross section is 7 to 43 degrees at which the brightness of the front surface becomes great. Further, in the case of not employing the light condensing plate, the optimum angle of incline of the cross section is equal to or more than 50 degrees at which the distribution of the angles of the emitting lights becomes small. Further, since the formation becomes hard when setting it to be equal to or more than 85 degrees, it is not preferable.

Next, a description will be given of various kinds of shapes of the small projecting portion of the light conductor plate in accordance with the present invention more particularly.

FIG. 35 is a view which shows a shape of a flat surface of a small projecting portion of a light conductor plate in accordance with a second embodiment of the present invention. In this embodiment, a shape of the flat surface of the small projecting portion is formed in a substantially rectangular shape. In this case, in the present embodiment, in addition to the substantially rectangular shape, a regular square (B), a circular shape (C), a substantially circular shape (D) (a shape obtained by partly deforming a circle), a regular polygonal shape (E), a trapezoidal shape (F) and a shape obtained by combining them (G) shown in FIG. 17 can be used. The substantially rectangular shape has a little confusion and is suitable for improving the brightness of the front surface, and since in the others, the confusion component is great, they are effective in preventing the shadow from generating from the light inputting surface. That is, it is possible to make the size of the dot in the shadow generating portion from the light inputting surface of the light conductor plate small and achieve the confusion effect so as to delete the shadow.

Figure 39A:
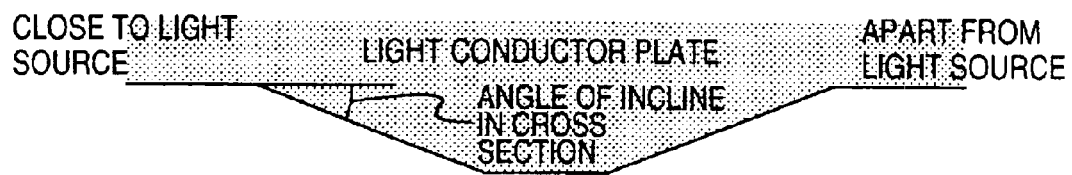
FIG. 39 is a view of a cross sectional shape of the small projecting portion in accordance with the present invention.
Figure 39B:
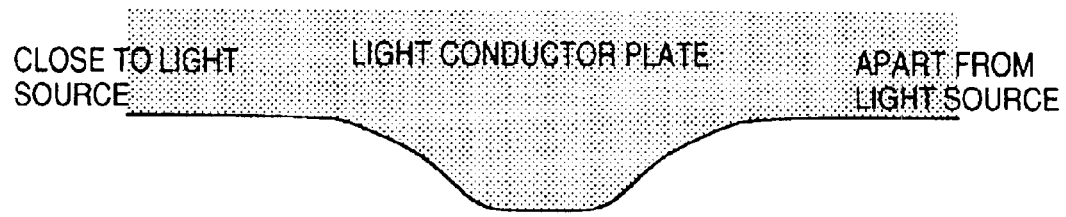
Figure 39C:
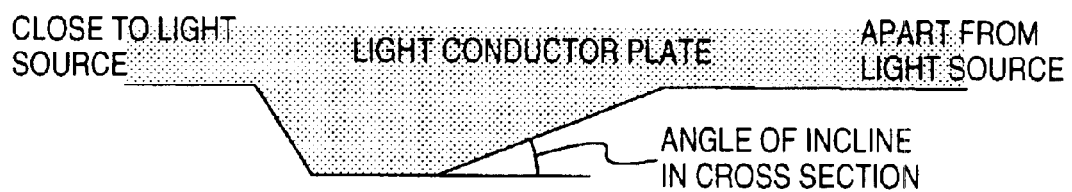

FIG. 39 explains a cross sectional shape of the small projecting portion in accordance with the present invention except FIGS. 7 to 16. FIG. 39(A) shows an example in which the cross sectional shape of the small projecting portion is trapezoidal. FIG. 39(B) shows one in which the cross sectional shape of the small projecting portion is substantially trapezoidal and an edge thereof is formed in a smooth R shape. This shape is effective in the case of taking into consideration dispersion of a manufacturing condition for actually forming the light conductor plate. Further, since the edge is formed in the smooth R shape, the confusion is hard to be generated and the effect can be obtained for improving the brightness. FIG. 39(C) shows an example in which the cross sectional shape of the small projecting portion is asymmetrical, and it has an advantage of increasing a density of the dot. In this case, the edge formed in the smooth R shape shown in FIG. 39(B) is not limited to be applied to the cross sectional shape of the trapezoidal shape, but can be applied to the other shapes.

Figure 40:
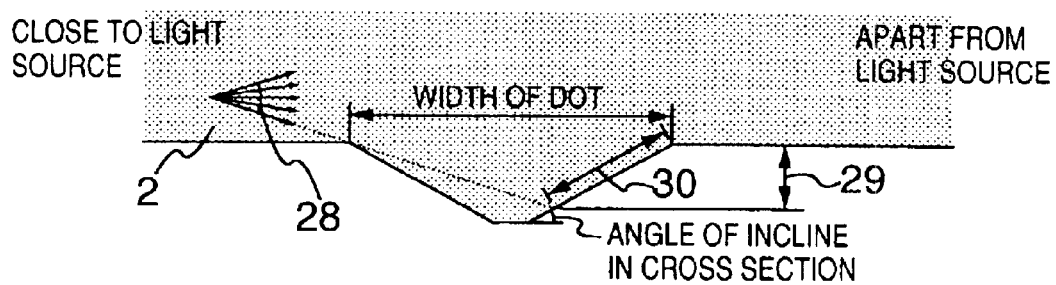
FIG. 40 is a view of a relation between a depth of the small projecting portion and a strength of the emitting light in accordance with the present invention.

Next, a description will be given of a height of the small projecting portion of the light conductor plate in accordance with the present invention more particularly. It is desirable that the height of the small projecting portion is set to be equal to or more than 2 $\mu$m (preferably 5 $\mu$m or more) and equal to or less than 100 $\mu$m (preferably 40 $\mu$m or less) for the same reason as that of the first embodiment. Further, in the present embodiment, by setting the height of the small projecting portion higher than a value 29 defined by a width of the dot, the angle of incline of the cross section and an expanding angle of the waveguide light within the light conductor plate 28 as shown in FIG. 40, a portion 30 which effectively functions as a reflecting surface is not changed, so that there is an advantage that it is possible to prevent unevenness of the brightness caused by the unevenness of the height of the dots.

A shape of the flat surface of the dot, a size of the small projecting portion, a distribution and a structure of the back light apparatus are the same as those of the first embodiment.

Next, a description will be given of a third embodiment in accordance with the present invention with reference to the accompanying drawings.

Figure 41:
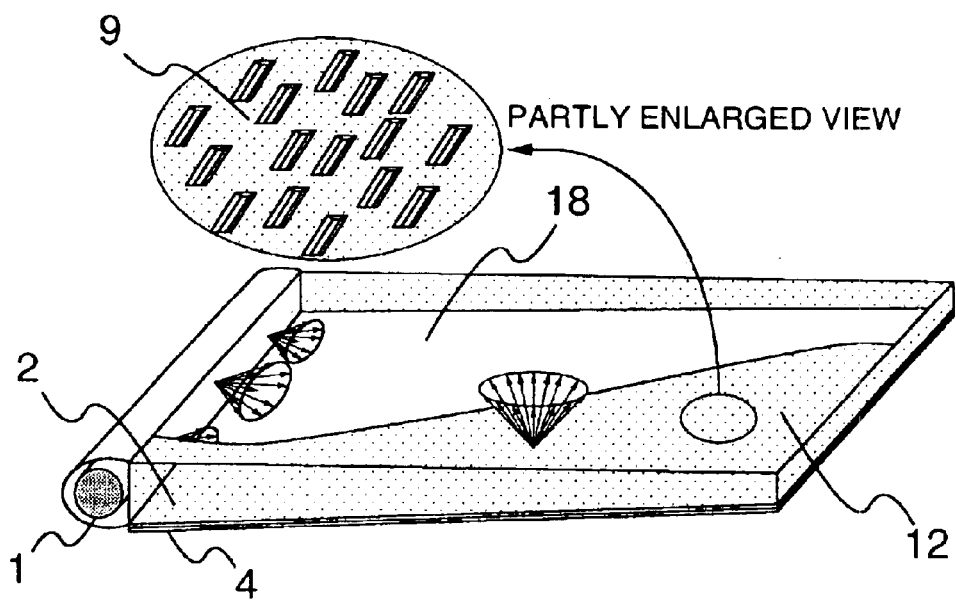
FIG. 41 is a perspective view of a back light apparatus portion in accordance with a third embodiment of a liquid crystal display apparatus of the present invention.
Figure 42:
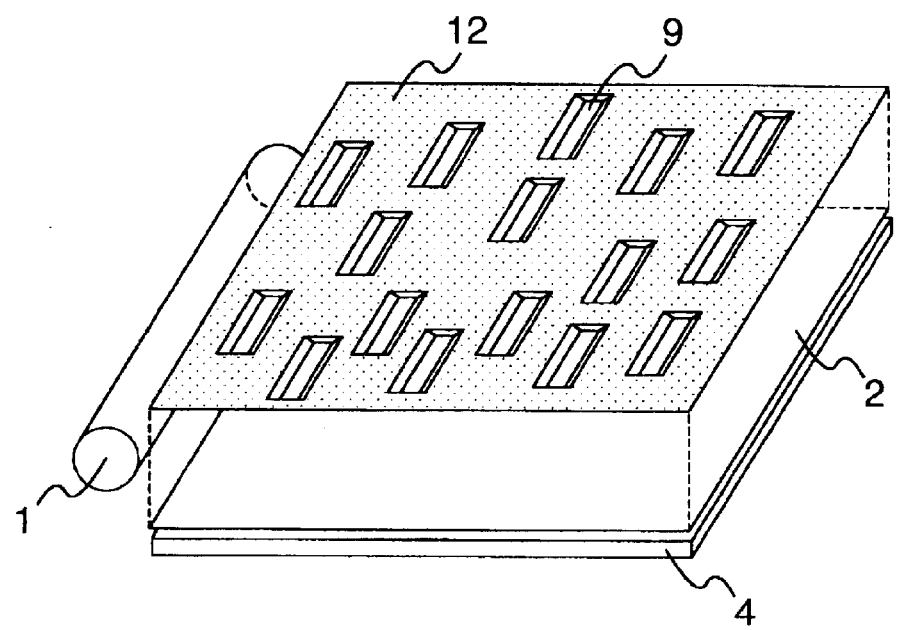
FIG. 42 is a perspective view which shows a small recess portion of the light conductor plate in accordance with the present invention.

FIG. 41 is a perspective view of a back light apparatus in accordance with the present invention, FIG. 42 is a perspective view which shows a dot 9 (a small recess portion) in accordance with the present embodiment, and FIG. 19 is a view which explains a shape of a dot in accordance with the present embodiment.

The back light apparatus has a light source 1, a light conductor plate 2 and a reflection plate 4 as minimum constituting elements, and a dot is formed on a light conductor plate lower surface 12 in the light conductor plate. Further, the dot is basically arranged at random.

Figure 43:
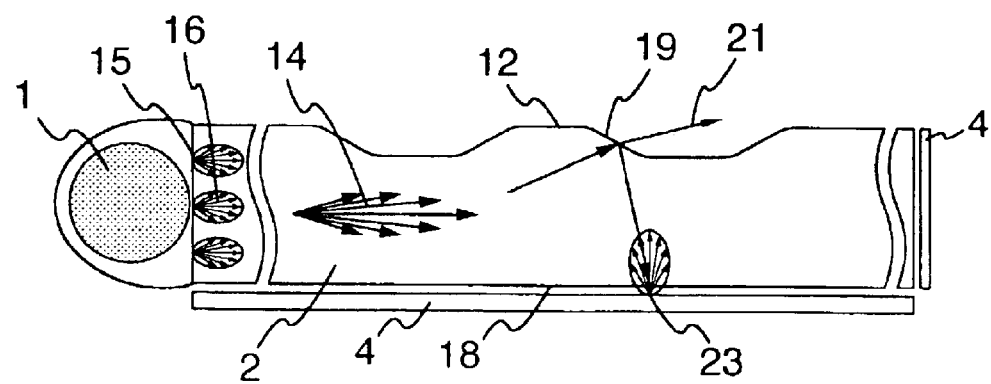
FIG. 43 is a view for explaining a locus of a light beam within the light conductor plate in accordance with the third embodiment of the present invention.

FIG. 43 shows a locus of a light beam of a light conductor plate waveguide light 14 which moves forward within the light conductor plate in accordance with the present invention. In FIG. 43, the emitting light from the light source 1 is input to the light conductor plate 2 at an end surface 15 of the light conductor plate in the side of the light source, as a light conductor plate incident light 16, becomes the light conductor plate waveguide light 14, and moves forward toward the other end surface while repeating a total reflection on the light conductor plate lower surface 18 and a light conductor plate light emitting surface 12. A part of the light beam input to a inclined surface 19 of the small recess portion among the waveguide lights is refracted and emitted from the light emitting surface as an emitting light beam 21. Then, the light components which are not refracted are reflected, emitted from the lower surface of the light conductor plate, reflected 23 on the reflecting plate, and again input to the light conductor plate, and a part thereof is emitted from the light emitting surface and the remainder become again the light conductor plate waveguide light. Accordingly, by suitably arranging the small recess portions, it is possible to gradually emit the waveguide light from the light conductor plate so as to light the liquid crystal display element.

Figure 44:
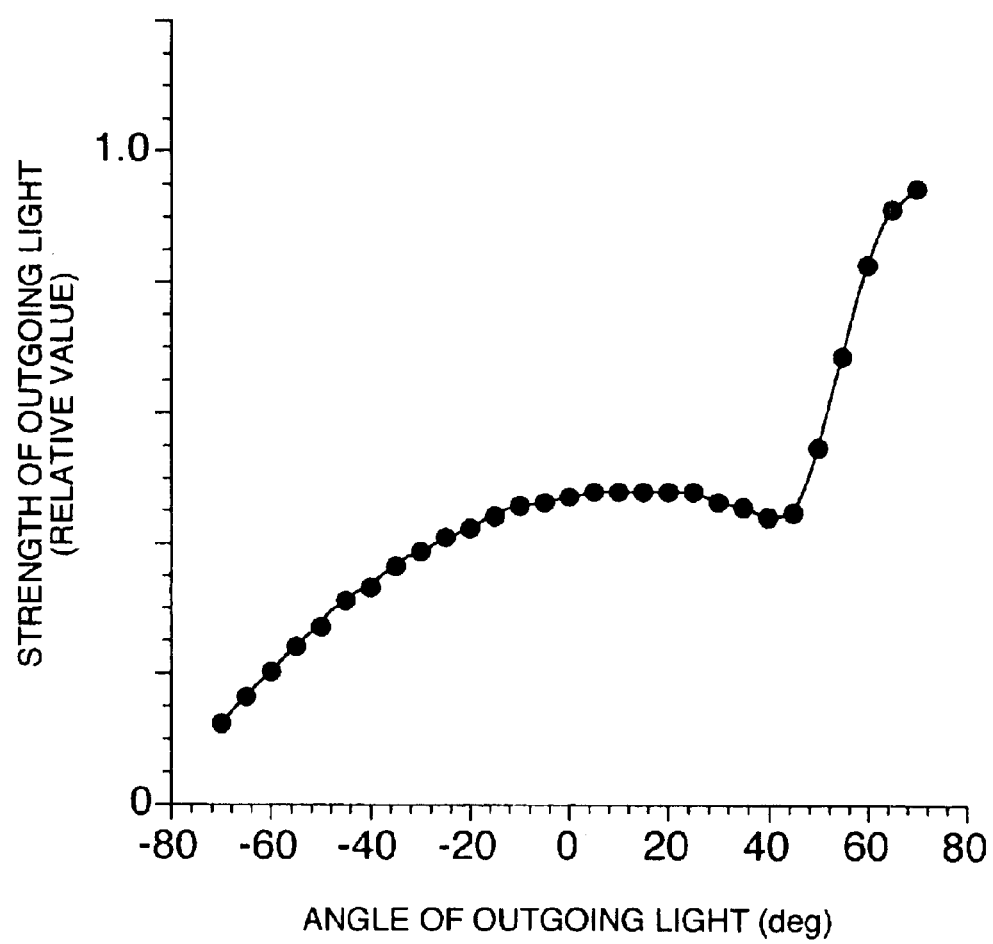
FIG. 44 is a schematic view of an angle distribution of the emitting light in accordance with the third embodiment of the present invention.
Figure 45:
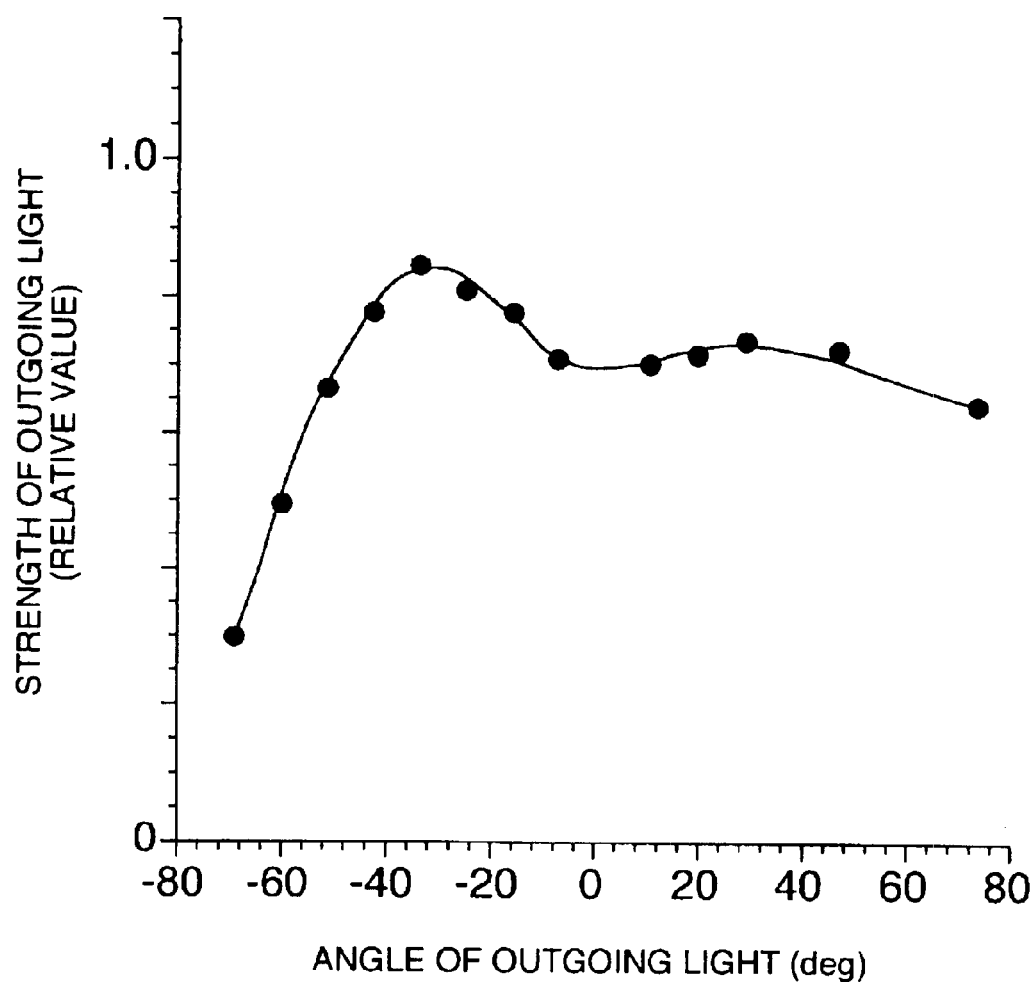
FIG. 45 is a view of a relation between an angle of incline of a cross section of the small recess portion and a strength of the emitting light in accordance with the third embodiment of the present invention.

FIG. 44 is a view which shows a distribution of the angles of the emitting lights from the light conductor plate in accordance with the third embodiment. In this case, the angle of incline of the cross section is 30 degrees, the outer shape of the light conductor plate is the same as that shown in FIG. 21(A), and the emitting angle in a graph corresponds to an emitting angle 25 illustrated in FIG. 21. FIG. 45 is a view which shows a relation between the angle of incline of the cross section and the brightness of the front surface in the case of placing the diffusion plate, the first light condensing plate and the second light condensing plate on the light conductor plate mentioned above. In measurement, a depth of the small recess portion is set to 3 $\mu$m in the case that the angle of incline of the cross section is 10 degrees or less, and 8 $\mu$m in the case that it is 20 degrees or more. Further, the dot density is optimized and measured so that the whole of the light conductor plate is uniformly lightened. Further, in the same manner as that of the first embodiment, the reflecting plate 4 is provided on the lower surface and the side surface of the light conductor plate.

FIG. 44 will be described. The distribution of the angles of the emitting lights has two peaks. A peak of the emitting angle 10 to 20 degrees corresponds to a peak of the light which is reflected on the inclined surface 19 of the small recess portion, emitted from the lower surface of the light conductor plate, reflected on the reflecting plate and generated by the emitted light, in FIG. 43. Further, a peak seen in 70 degrees or more is generated by the emitting light due to an existence of unevenness against the light transmitting through the inclined surface 19 of the small recess portion. In the third embodiment, in comparison with the first embodiment, the emitting angle of the emitting light tends to become great, so that it is hard to change and reduce the angle of incline of the cross section. Accordingly, it is desirable to commonly employ the diffusion plate and the light condensing plate. Accordingly, the optimum angle of incline of the cross section is 15 to 85 degrees at which the brightness of the front surface becomes greater than that in FIG. 45.

Next, with respect to the shape of the flat surface of the dot (the small recess portion) and the cross sectional shape of the small recess portion in the third embodiment, the same various kinds of shapes as those of the first embodiment can be used. Further, a height, a size and a distribution of the small recess portion and a structure of the back light apparatus in accordance with the present embodiment are the same as those of the first embodiment. Further, the same result can be obtained when setting the small recess portion of the present embodiment to the small projecting portion shown in FIG. 35. Further, when making the dot on both of the lower surface of the light conductor plate and the light emitting surface, an intermediate characteristic between the both can be obtained.

Next, a description will be given of a fourth embodiment in accordance with the present invention.

Figure 46:
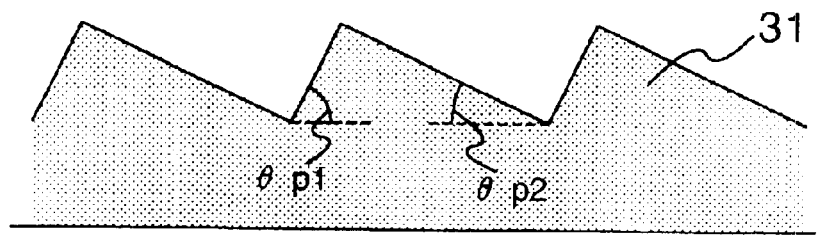
FIG. 46 is a view of a cross sectional shape of a light condensing plate used for the present invention.

FIG. 46 shows a cross sectional shape of a light condensing plate 31 (a prism sheet) which is effective by being combined with the light conductor plate in accordance with the present invention. FIG. 47 shows an arrangement in the case of combining the light conductor plate of the first embodiment with the light condensing plate in FIG. 46. Here, with respect to angles $\theta p1$ and $\theta p2$ of the light condensing plate, various kinds of optimum values exist in correspondence to the kind of the light conductor plate, however, ranges of 90<$\theta p1$<60 degrees and 25<$\theta p2$<55 degrees are preferable.

Figure 47A:
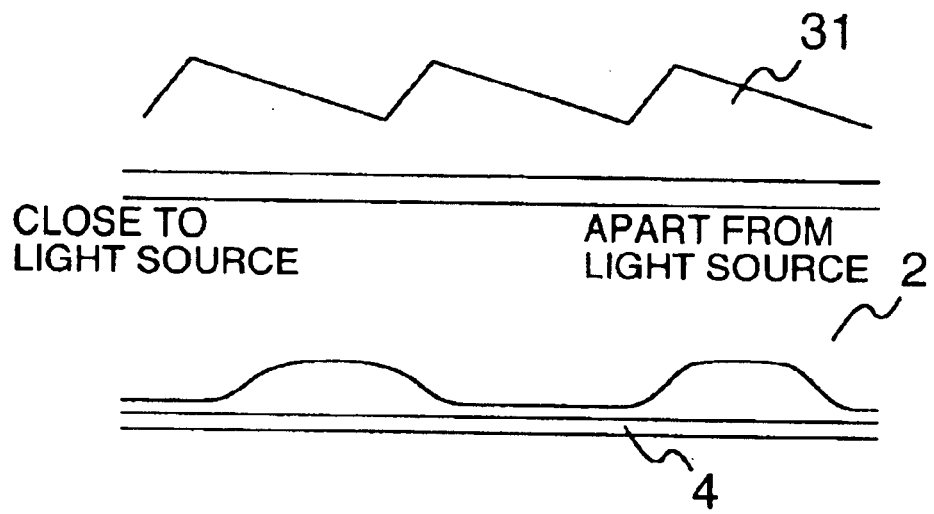
FIG. 47 is a view of a main portion of a fourth embodiment of a liquid crystal display apparatus in accordance with the present invention.
Figure 48:
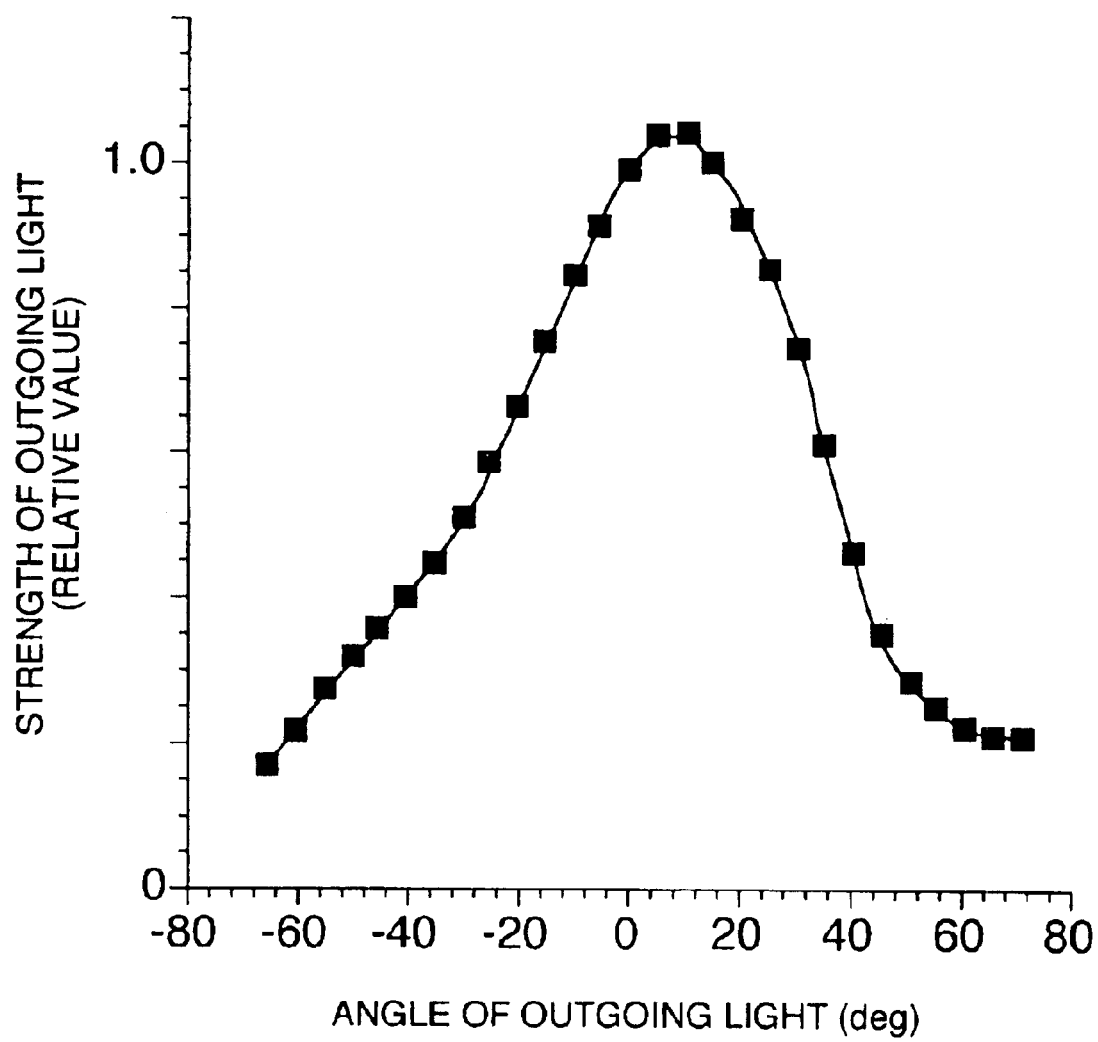
FIG. 48 is a first angle distribution of an emitting light of the fourth embodiment in accordance with the present invention.

FIG. 48 shows a distribution of the angles of the emitting lights in the case of setting $\theta p1$ to 85 degrees and $\theta p2$ to 35 degrees in an arrangement of FIG. 47(A). It is characterized that the brightness is high near the emitting angle of −40 degrees in addition to the front surface, so that it is possible to widely expand an angle of field while securing the brightness of the front surface. In the case of this type of combination, it is necessary to set $\theta p1$ to a value as large as possible. That is, 75 degrees or more is desirable. However, since 85 degrees or more is not desirable since it is hard to be manufacture. Further, when being smaller than 75 degrees, the brightness is reduced near the emitting angle of −40 degrees. $\theta p2$ is desirably set to 35±10 degrees. When setting to the other values, the emitting angle at which the brightness becomes maximum becomes out of the front surface.

Figure 47B:
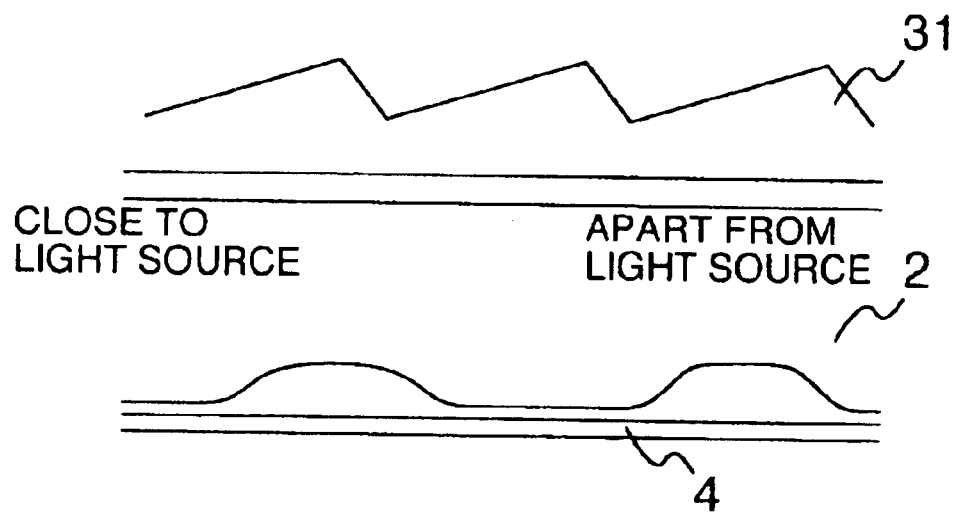
Figure 49:
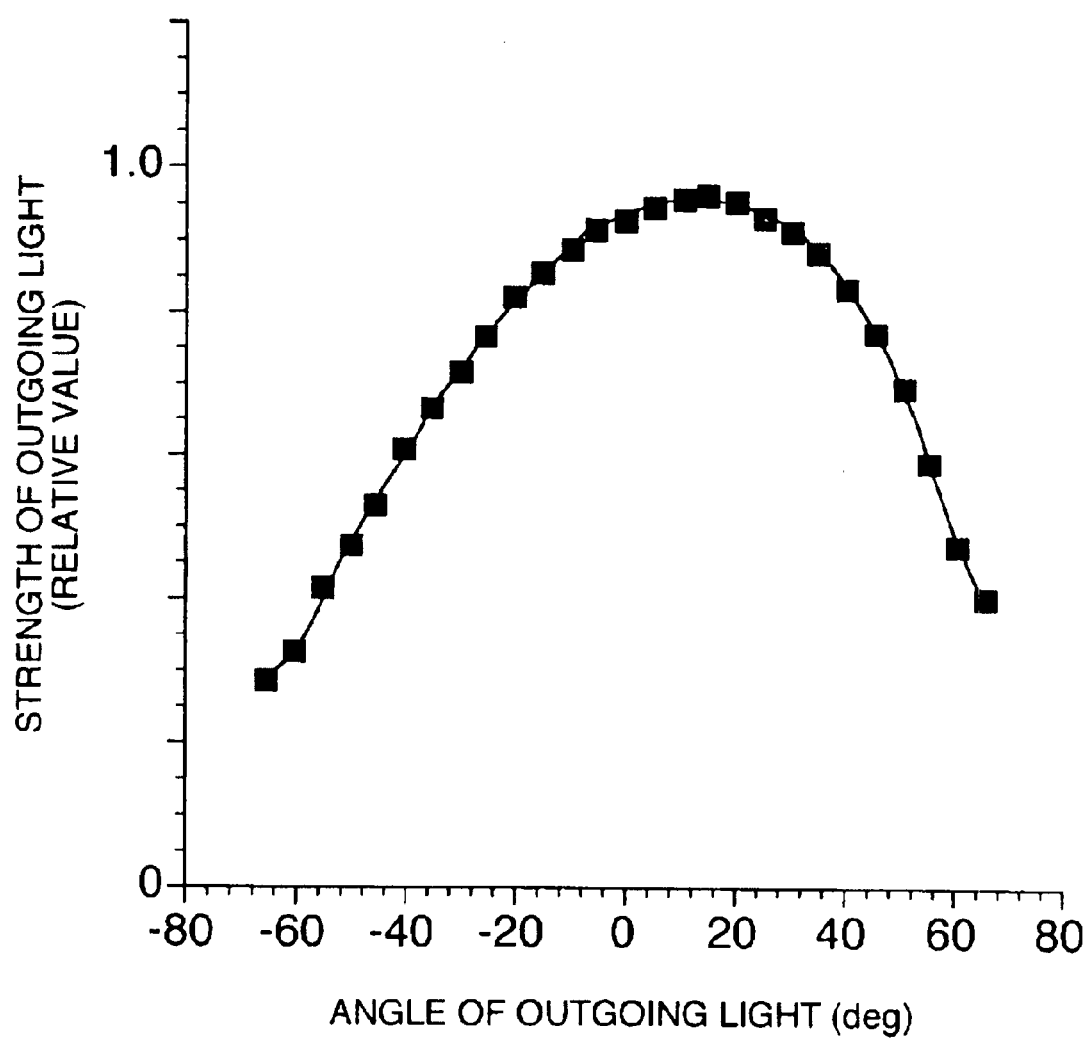
FIG. 49 is a second angle distribution of the emitting light of the fourth embodiment in accordance with the present invention.

FIG. 49 shows a distribution of the angles of the emitting lights in the case of setting $\theta p1$ to 70 degrees and $\theta p2$ to 45 degrees in an arrangement of FIG. 47(B). It is possible to obtain a uniform brightness at all the emitting angles and it is possible to widely expand an angle of field. In the case of this type of combination, $\theta p1$ is desirably set to 70±10 degrees. When setting to the other values, it is hard to obtain a uniform brightness at all the emitting angles. $\theta p2$ is desirably set to 45±10 degrees. When setting to the other values, it is hard to obtain a uniform brightness at all the emitting angles.

Figure 51:
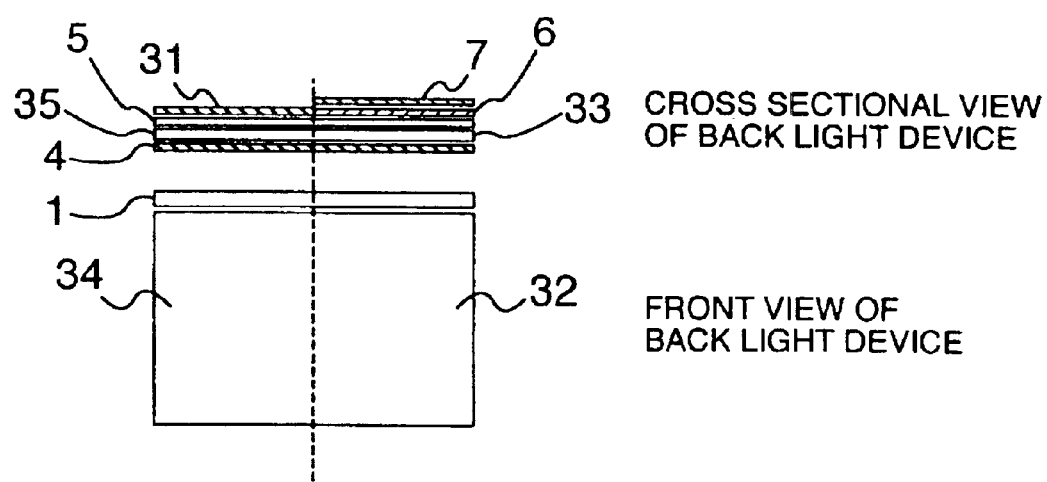
FIG. 51 is a schematic view of FIG. 50.

FIG. 50 is a view (photograph) which understandably shows an angle of field of the back light apparatus of the fourth embodiment. FIG. 51 is a view which explains a structure of a back light apparatus when photographing the view of FIG. 50. A conventional back light apparatus 32 employs a light conductor plate 33 using a printing dot and in which the reflecting plate 4 is placed on the lower surface of the light conductor plate, the diffusion plate 5, the first light condensing plate 6 and the second light condensing plate 7 are placed on the light emitting surface of the light conductor plate. The first light condensing plate and the second light condensing plate uses a prism sheet having a top angle of 90 degrees the back light apparatus 34 in accordance with the fourth embodiment employs the light conductor plate 35 of the first embodiment and is structured such that the reflecting plate 4 is placed on the lower surface of the light condensing plate and the diffusion plate 5 and the light condensing plate 31 in FIG. 46 are placed on the light emitting surface of the light conductor plate.

Next, a description will be given of a fifth embodiment in accordance with the present invention.

In the present invention, it is possible to control the distribution of the angles of the emitting lights from the light conductor plate by controlling the angle of incline of the cross section. Here, when making the angle of incline of the cross section uniform on all the surface of the light conductor plate, the distribution of the angles of the emitting lights is different between the position near the light source and the position apart from the light source, as shown in FIG. 52. In order to prevent this, it is effective to change the angle of incline of the cross section between the position near the light source and the position apart from the light source. A difference of the peak of the angle distribution of the emitting light between the position near the light source and the position apart from the light source is different in correspondence to the outer shape of the light conductor plate and the like, however, it takes a value about 1 to 15 degrees (8 degrees in the case of FIG. 52). FIG. 53 shows a distribution of the angles of the emitting lights in the case of changing the an average of the angles of incline in the cross section of the light conductor plate from the side of the light source toward the opposite side, whereby the angle thereof becomes small in the side of the light source. In the present embodiment, the angle of incline of the cross section is linearly changed so that it becomes 27 degrees at a point of 10 mm apart from the light source and 33 degrees at a point of 150 mm apart from the light source. An amount of changing the angle of incline of the cross section varies in accordance with the outer shape of the light conductor plate and the like, however, it is necessary to set it to 0.5 to 15 degrees.

Next, a description will be given of a sixth embodiment in accordance with the present invention.

Figure 54:
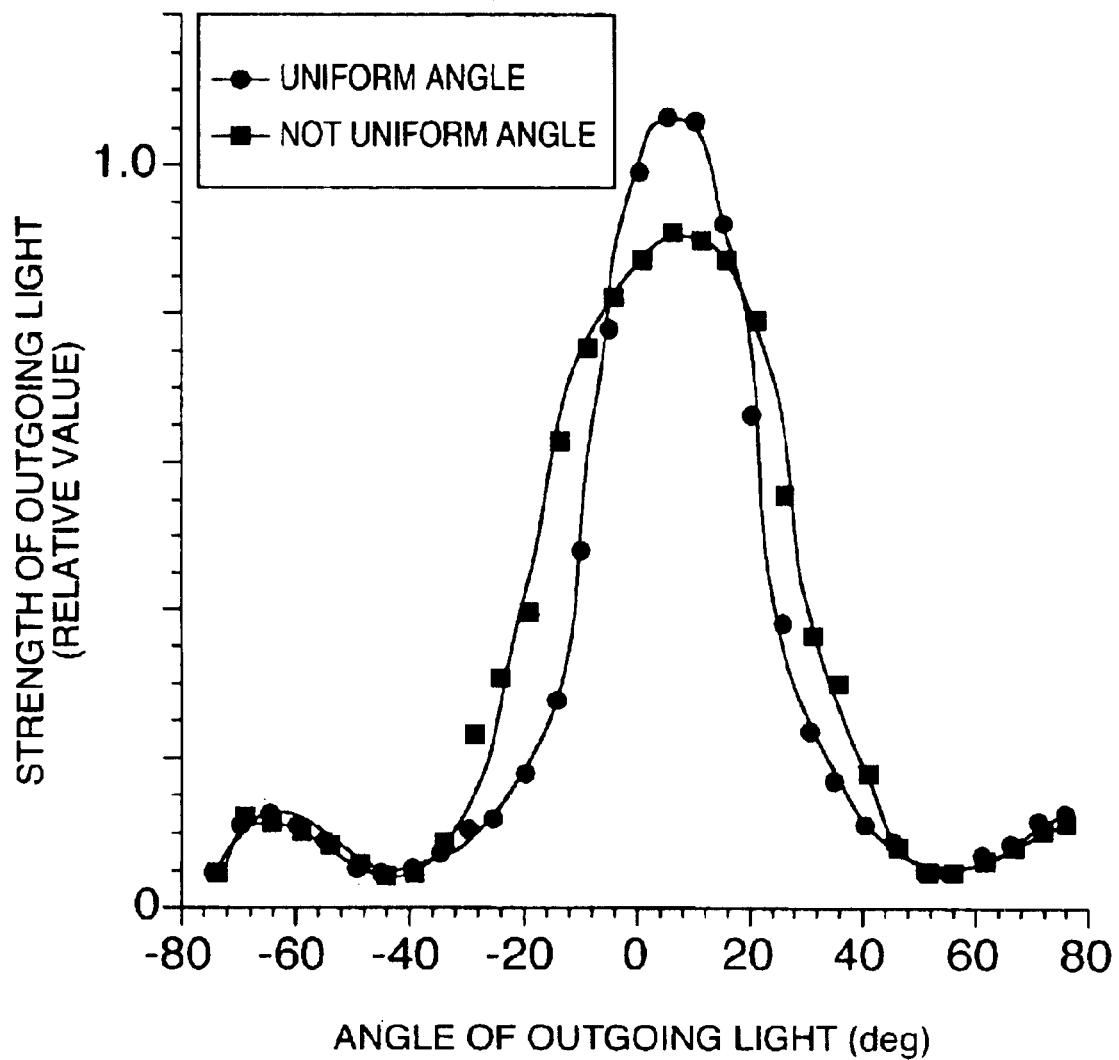
FIG. 54 is a view of an angle dependence of the emitting light in the case of locally changing an angle of incline of a cross section in accordance with the present invention.

In the present invention, it is possible to control the distribution of the angles of the emitting lights from the light conductor plate by controlling the angle of incline of the cross section. Here, when making the angle of incline of the cross section as viewing the light conductor plate at an area of 1 to 4 square cm uniform and using two light condensing plates for improving the brightness of the front surface, there can be obtained a back light apparatus having a sharp peak in the angle distribution of the emitting lights from the light conductor plate and having a narrow angle of field, as shown in an angle uniformity in FIG. 54. As a method of preventing this, there is a method which employs the diffusion plate, however, in the present invention, it is possible to control the angle of field by making the angle of incline of the cross section uneven when viewing the light conductor plate at an area of 1 to 4 square cm. An angle unevenness in FIG. 54 corresponds to a distribution of the angles of the emitting lights from the light conductor plate in the case of changing the angle of incline of the cross section at every dots or every parts of the dot within a range of ±10 degrees around the average thereof as viewing the light conductor plate at an area of 1 to 4 square cm. As mentioned above, it is possible to control the angle of field in accordance with the unevenness of the angle of incline of the cross section. Further, the changing range of the angle of incline of the cross section at this time is desirable to be ±2 to 15 degrees. In the case of ±2 degrees, there hardly exists an affect of expanding the angle of field. Further, when ±15 degrees or more is set, it is out of the range of capable of controlling the emitting angle by the angle of incline of the cross section, so that it is not preferable.

Next, a description will be given of a seventh embodiment in accordance with the present invention.

Figure 55:
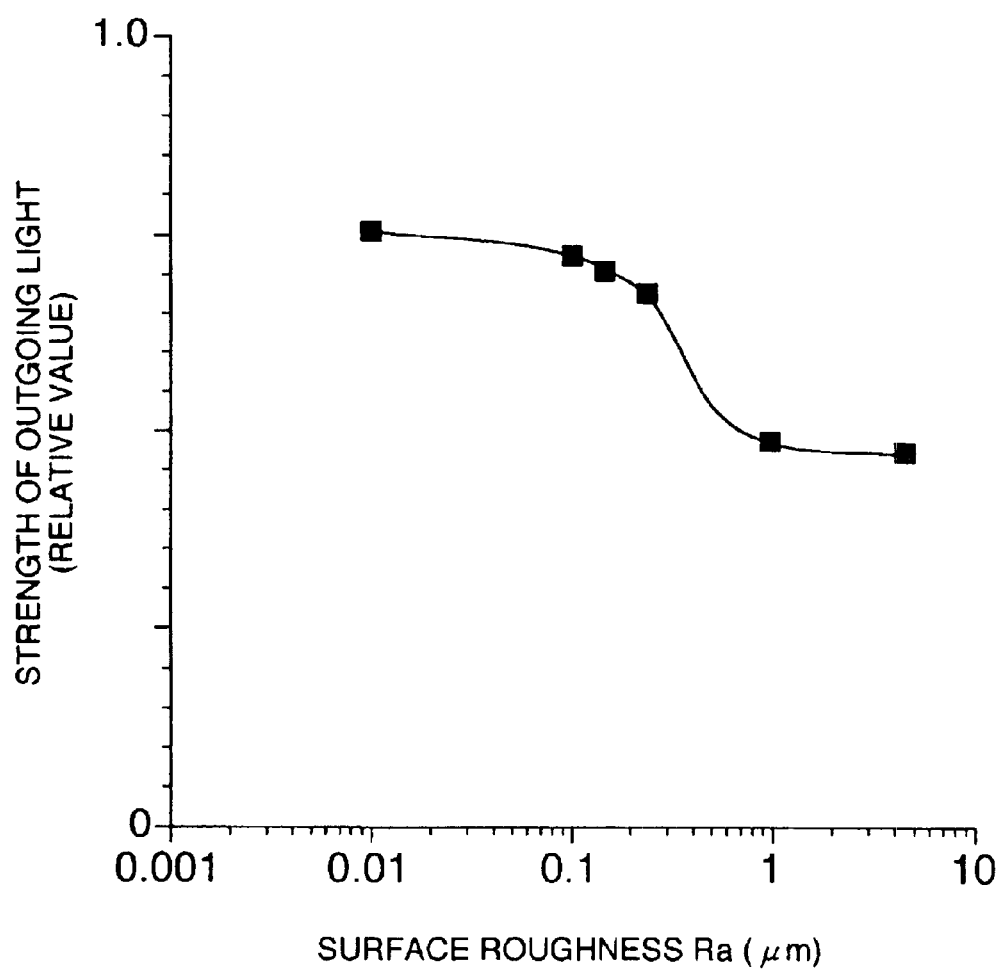
FIG. 55 is a view which shows a relation between a surface roughness and a brightness of a front surface in accordance with the present invention.

In the present invention, the structure is made such as to guide the light out of the light conductor plate in accordance with the reflection and the refraction by the inclined surface of the dot, and expand the light to corners within the light conductor plate with using a regular reflection at the other portions. Accordingly, by reducing a surface roughness of the light conductor plate, it is possible to reduce a loss at a time of reflection and refraction and improve the brightness. FIG. 55 is a view which shows a relation between Ra of a flat portion (having an angle formed with respect to the dot forming surface being equal to or less 5 degrees) on the dot forming surface of the light conductor plate, and the brightness of the front surface (using a diffusion plate and two light condensing plates). As shown in FIG. 55, Ra is desirably set to be equal to or less than 0.3 $\mu$m (preferably 0.05 $\mu$m). Further, in the first and second embodiments, it is effective to form a reflecting film along the dot in place of the reflecting plate 4.

Next, a description will be given of a manufacturing method of a light conductor plate for a liquid crystal display apparatus in accordance with the present invention.

A manufacturing method of the light conductor plate basically comprises a step of making a metal mold and a step of plastic molding. As the method of making the metal mold, various kinds of mechanical processing methods, for example, a drilling method, a cutting method, a grinding method and the like can be employed. Further, an electric spark method is also an effective means. However, the dot constituted by the small projecting portion or the small recess portion in accordance with the present invention is structured such that a number thereof is 200 to 20000 per square cm in a general design and a significantly large number is necessary for the whole of the light conductor plate, so that it is preferable to adopt a manufacturing method mentioned below.

Figure 56:
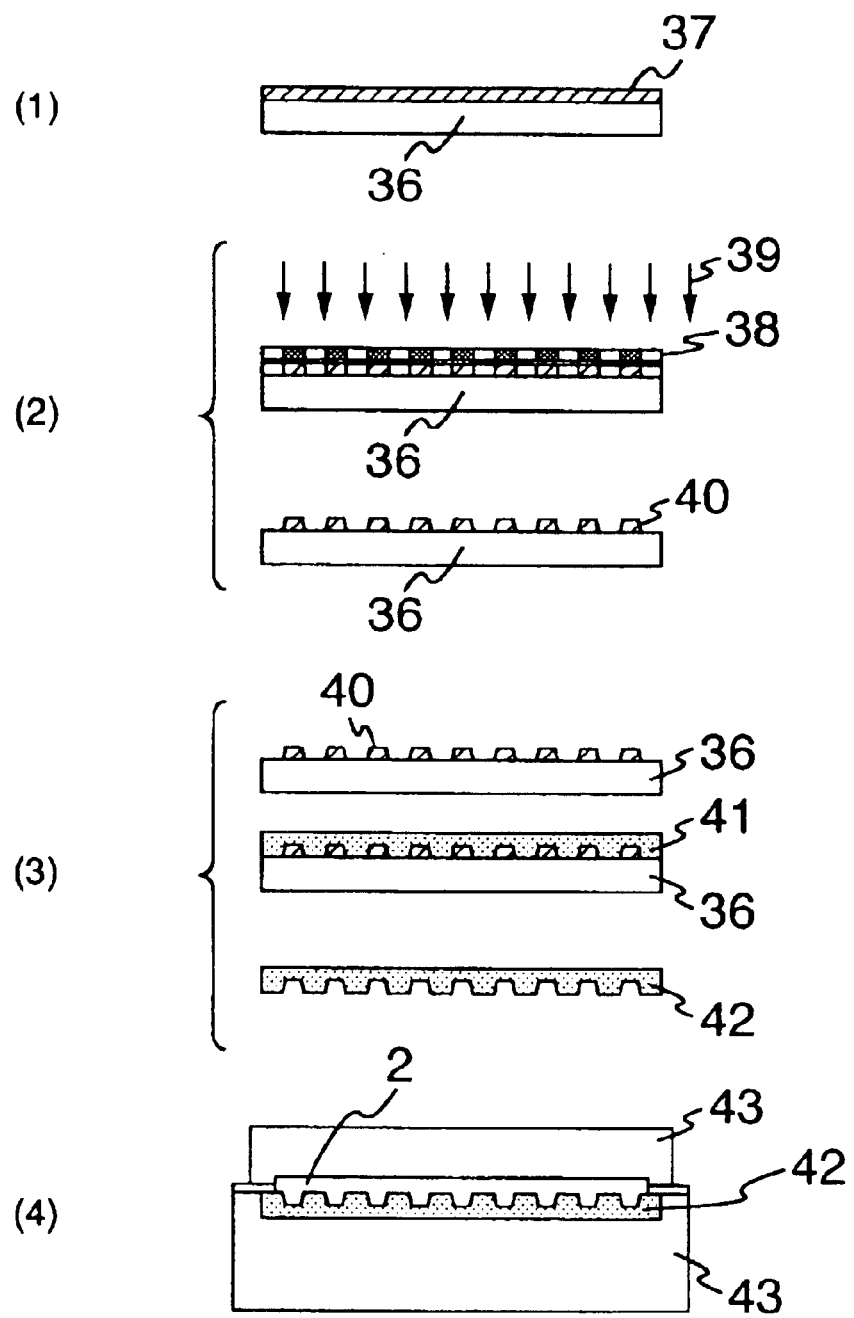
FIG. 56 is a first view of a process for manufacturing the light conductor plate used for the present invention.

FIG. 56 is a process diagram which shows a first embodiment of the manufacturing method. This manufacturing method has the following steps.

(1) a step of forming a photo resist 37 on a base plate 36;

(2) a step of arranging a photo mask 38 having a pattern of the dot on the base plate mentioned above and developing the photo resist after irradiating an ultraviolet ray 39 from an upper portion of the mask so as to form a pattern 40 of the dot on the base plate;

(3) a step of applying a metal plating on the pattern and forming a plastic molding stamper 42; and (4) a step of plastic molding with using the stamper.

Here, as the base plate, a glass plate which is mirror abraded at a thickness of about 2 to 10 mm or the like is employed. Before forming the photo resist, it is possible to previously apply a silane group adhesive property improving agent. As the photo resist material, a liquid or film-like positive type or negative type material can be employed. FIG. 56 shows a step in the case of using the positive type material. As the forming method, there are a spin coating method and a roll coating method. It is possible to change the height of the small projecting portion and the depth of the small recess portion by controlling the thickness of the photo resist. Further, it is possible to control the angle of incline of the cross section by adjusting the exposing and developing conditions. For the photo mask, various kinds of masks such as a chrome mask, a film mask, an emulsion mask and the like can be employed, which can be made by previously preparing data such as a size, a number, a distribution and the like of the designed dot and describing by an electronic beam, a laser beam and the like. When forming a conductive film before forming a plating layer, an unevenness of the plating step is lost, and an improved plating layer, that is, the stamper can be formed. As a material for the conductive layer and the plating layer, various kinds of metals can be used, Ni is an optimum material in view of an uniformity and a mechanical performance. The obtained plating layer can be easily peeled out from the base plate in a physical manner, and can be used as the stamper by abrasion finishing in accordance with necessity.

The obtained stamper is fixed, for example, to a base mold 43 of an injection molding machine by means of a magnet, a vacuum chuck and the like. FIG. 56 shows a method of manufacturing the light conductor plate 2 by the injection molding machine, however, in addition to the method, it is possible to form the light conductor plate by an extrusion molding, a compression molding, a vacuum molding and the like.

As the material constituting the light conductor plate, it is possible to use a general kind of transparent plastic material. For example, there are an acrylic plastic, a polycarbonate resin, a polyacetal resin, a polyurethane resin, an ultraviolet ray setting plastic material. Among them, the acrylic resin is excellent in view of a transparent property, a cost and a molding easiness and corresponds to a material suitable for the present invention.

Figure 57:
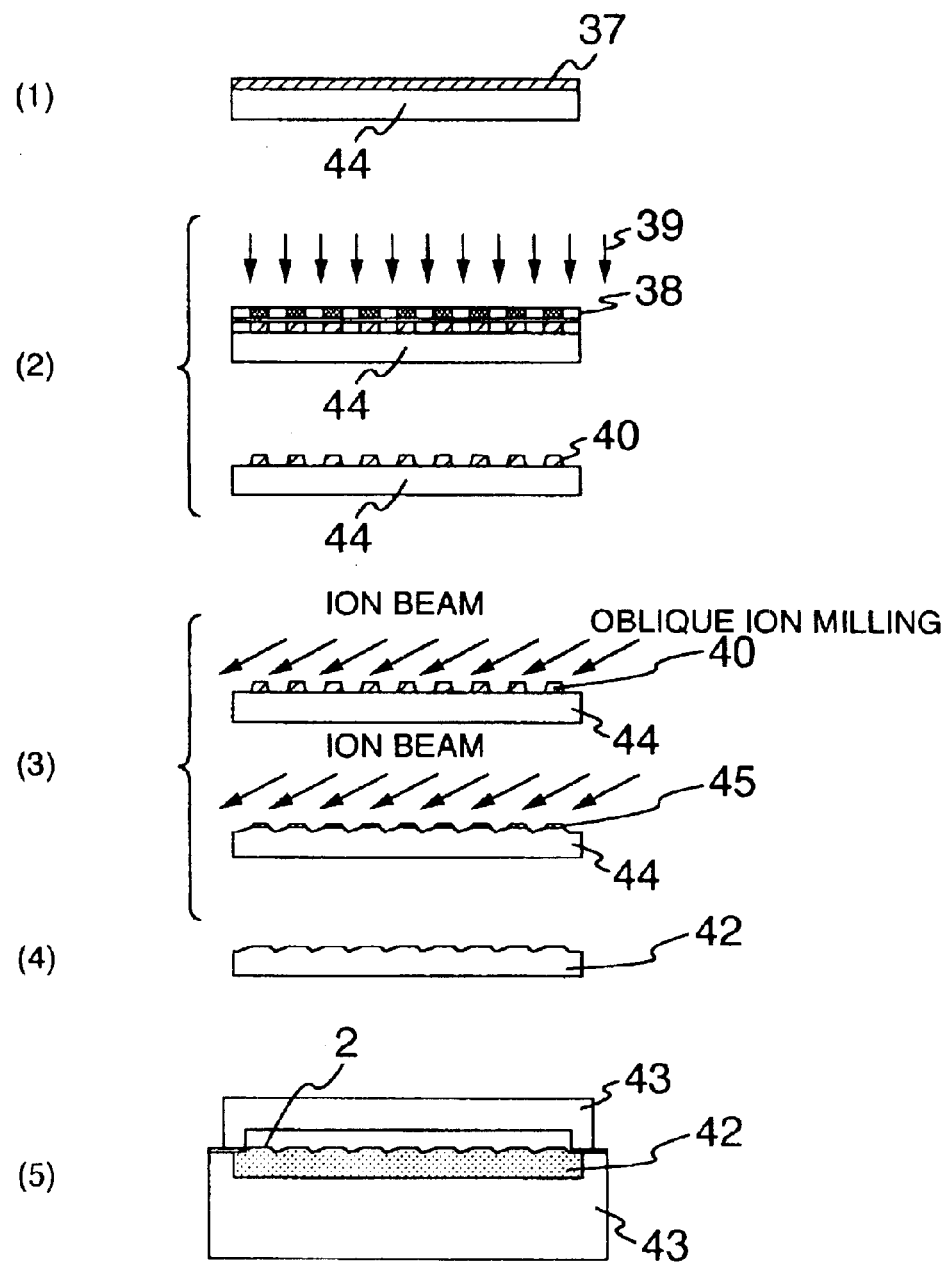
FIG. 57 is a second view of a process for manufacturing the light conductor plate used for the present invention.

FIG. 57 is a process diagram which shows a second embodiment of the manufacturing method in accordance with the present invention. This manufacturing method has the following steps.

(1) a step of forming a photo resist film 37 on a stamper original plate 44;

(2) a step of arranging a photo mask 38 having a pattern of the dot on the base plate mentioned above and developing after irradiating an ultraviolet ray 39 from an upper portion of the mask so as to form a pattern 40 of the dot on the stamper original plate;

(3) a step of making the pattern mentioned above in a mask and etching the stamper original plate 44 so as to form a stamper 42;

(4) a step of removing the remainder 45 of the photo resist mask; and (5) a step of plastic molding with using the stamper.

The present step does not employ the plating step, and is different from the step in FIG. 56 in view of processing a metal plate. Here, the stamper original plate is, for example, a metal plate obtained by mirror finishing Ni or the like. As a method of etching the stamper original plate with making the photo mask pattern in the mask, in addition to the wet etching, various kinds of dry etching methods can be employed. In particular, an ion milling method which can control the angle of incline of the cross section by inputting an ion beam from a predetermined angle corresponds to a method suitable thereto. In this case, it is possible to directly manufacture the metal mold in accordance with the manufacturing method mentioned above with using the metal mold material which is generally used in place of the stamper original plate.

Figure 58:
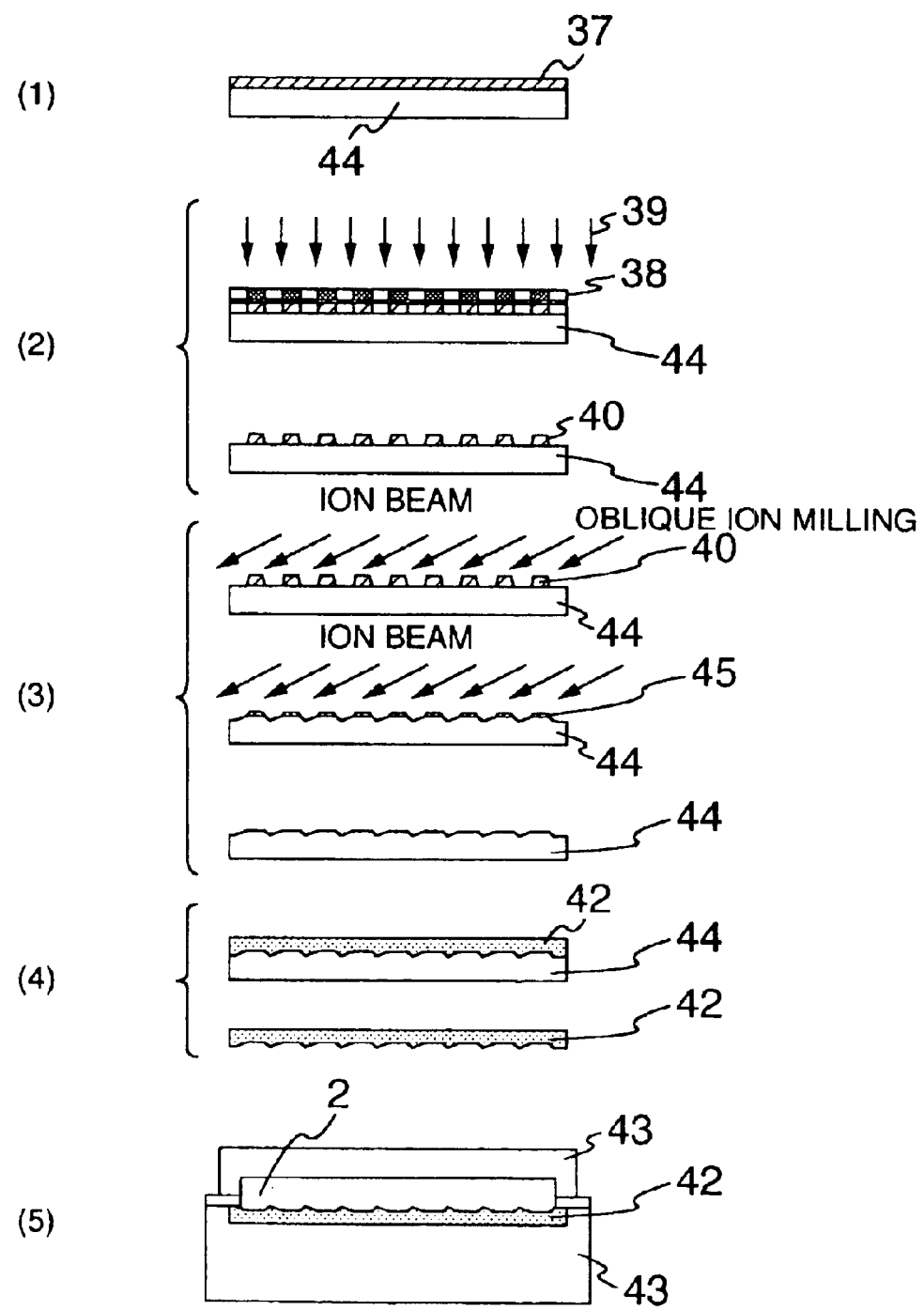
FIG. 58 is a third view of a process for manufacturing the light conductor plate used for the present invention.

FIG. 58 is a process diagram which shows a third embodiment of the manufacturing method in accordance with the present invention. This manufacturing method has the following steps.

(1) a step of forming a photo resist 37 on a base plate;

(2) a step of arranging a photo mask 38 having a pattern of the dot on the base plate mentioned above and developing after irradiating an ultraviolet ray 39 from an upper portion of the mask so as to form an original shape of a pattern of the dot on the base plate;

(3) a step of dry etching the pattern so as to form the pattern in a desired cross sectional shape;

(4) a step of applying a metal plating so as to form a plastic molding stamper; and (5) a step of plastic molding with using the stamper.

The process corresponds to a method of forming the stamper in accordance with the plating step after forming the photo mask pattern in accordance with the dry etching method to the predetermined shape, and is characterized by forming the original shape of the dot in the desired cross sectional shape by employing an iron milling or the like as the dry etching method.

Figure 59:
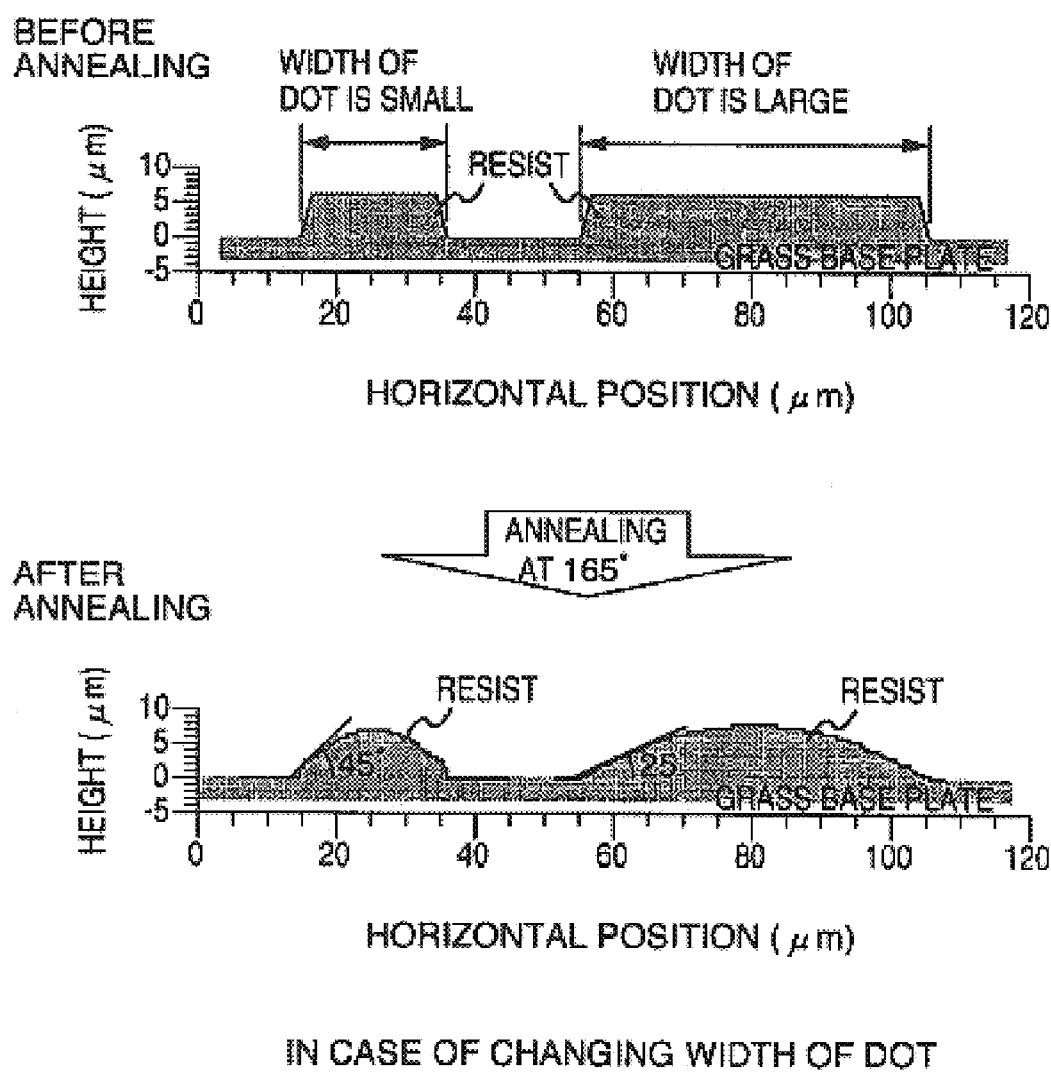
FIG. 59 is a schematic view of a relation between a dot width and an angle of incline of a cross section in accordance with the present invention.
Figure 61:
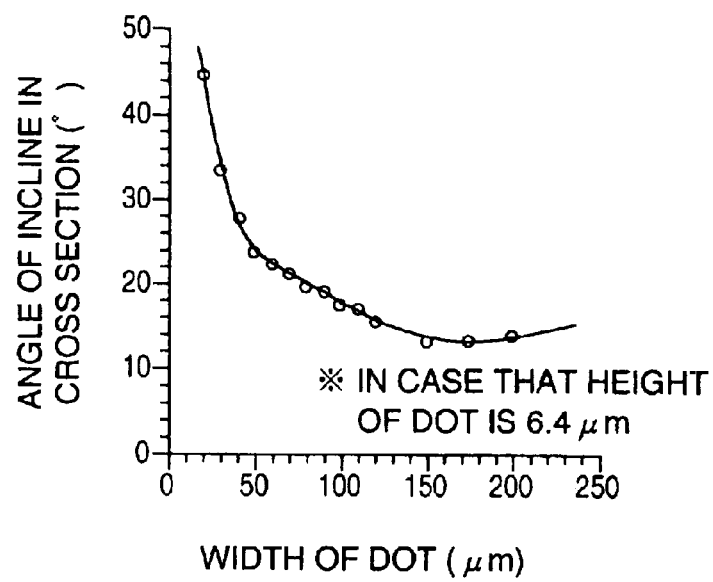
FIG. 61 is a schematic view of an example of a relation between a dot width and an angle of incline of a cross section in accordance with the present invention.

Next, a description will be given of an embodiment of a manufacturing method performed in combination with the first embodiment of the manufacturing method for realizing the fifth and sixth embodiments. In the first embodiment of the manufacturing method, in the case of adding an annealing step (155 to 200 degrees) after (2) the step of forming the pattern of the dot on the base plate, it is possible to control the angle of incline of the cross section by changing a dot width (a length in a direction perpendicular to the light source of the dot (refer to FIG. 35)) or an average distance between the dots (unit distance/(square root of dot density)). That is, as shown in FIG. 59, it is possible to control the angle of incline of the cross section in accordance with the dot width, and it is possible to control the angle of incline of the cross section even when employing the average distance between the dots as shown in FIG. 60. Here, FIG. 61 shows an example of a relation between the dot width and the angle of incline of the cross section. It is possible to increase the angle of incline of the cross section by making the dot width narrow. In this case, it is determined in accordance with the kind of the employed resist (2 types comprising a positive type or a negative type) and the kind of the mask (2 types comprising a type of shading the portion to be made the dot or a type of transmitting the light) whether the dot width or the average distance between the dots should be changed.

Next, a description will be given of a structure of a liquid crystal display apparatus.

Figure 62:
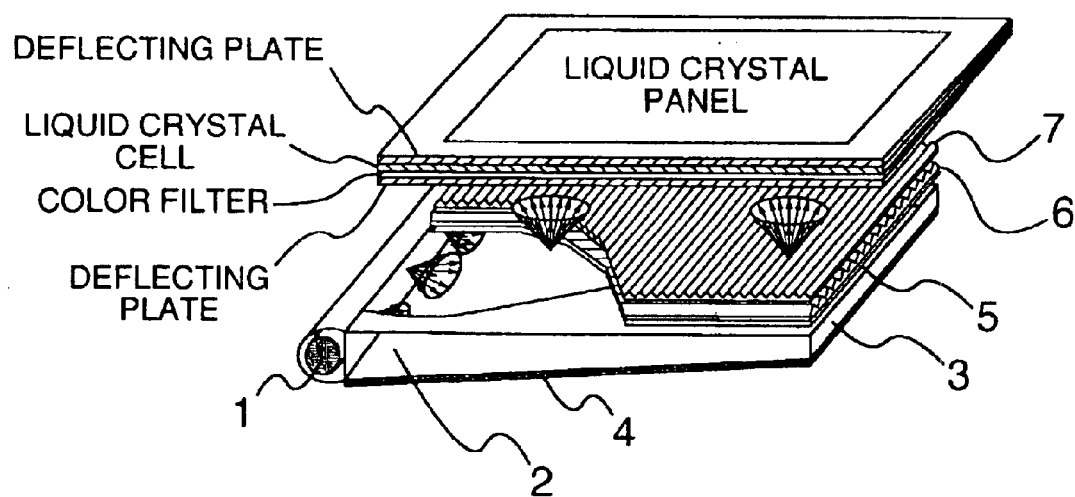
FIG. 62 is an exploded perspective view of a main portion of a liquid crystal display apparatus in accordance with the present invention.

FIG. 62 shows a liquid crystal display apparatus in accordance with the present invention. A deflecting plate, a TFT, a liquid crystal cell, a common electrode, a color filter and a polarizing plate are placed on an upper surface of the back light apparatus. This structure shows a popular embodiment of the liquid crystal apparatus, various kinds of structures including the back light apparatus can be considered in accordance with the usage of the display apparatus.

For example, a particular wide angle of field is required for a desk top type liquid crystal display apparatus in a personal computer or a television monitor, however, in this case, it is possible to arrange a diffusion plate which confuses the lightening beam and expands the angle of field, at a suitable position. Further, it is possible to arrange a sheet having a light diffusing effect for expanding the angle of field, after arranging the prism sheet so as to irradiate the lightening beam having a further higher directionality, or process the light emitting surface so as to give a light confusion function, thereby expanding the angle of field.

A particular embodiment of the light source, there can be exemplified a cold-cathode tube, a hot-cathode tube, a tungsten lamp, a xenon lamp, a metal halide lamp and the like. In general, a light source of a low temperature type such as the cold-cathode tube is desirable.

The liquid crystal element or the liquid crystal cell employed for the present invention is not particularly limited, and a well-known element and panel can be employed. As a general liquid crystal cell, there can be exemplified a twist nematic type, a super twist nematic type, a homogeneous type, a thin film transistor type, an active matrix drive type, a simple matrix drive type and the like.

In this case, a mask for making the brightness uniform (not shown) which is employed as occasion demands compensates the unevenness of the brightness due to the distance difference from the light source, is, for example, formed as a sheet obtained by changing a transmission of the light, and the mask for making the brightness uniform can be arranged at an optional position on the light conductor plate.

INDUSTRIAL APPLICABILITY

As mentioned above, by employing the light conductor plate having multi functions and high performance in accordance with the present invention for the liquid crystal display apparatus, it is possible to reduce the number of the constituent parts of the back light apparatus which is conventionally constituted by a lot of parts, that is, the light source, the light conductor plate, the diffusion sheet, the prism sheet, the reflecting sheet and the like. At the same time, it is possible to improve the brightness and reduce the cost of the constituent parts and the man-hour for assembling. Accordingly, it is possible to obtain the liquid crystal display apparatus which generates no unevenness of the brightness and has a stable property, and an industrial applicability is significantly great.

What is claimed is:

1. A liquid crystal display apparatus comprising:

a light conductor plate;

a light source arranged on a side surface of the light conductor plate so as to light a liquid crystal cell arranged on a front surface side of the light conductor plate from a back surface side thereof; and said light conductor plate having an incident surface for a light from the light source, a light emitting surface for emitting the input light to the liquid crystal cell, and a plurality of dots constituted by small projecting portions or small recess portions for changing a moving direction of the light from the incidence surface toward a direction of the light emitting surface, said dots being formed in the light emitting surface and a surface of the light conductor plate opposite to the light emitting surface with each of said dots having a height or depth within a range of 2 to 100 $\mu$m.

2. A liquid crystal display apparatus comprising:

a light conductor plate;

a light source arranged on a side surface of the light conductor plate so as to light a liquid crystal cell arranged on a front surface side of the light conductor plate from a back surface side thereof; and said light conductor plate having an incident surface for a light from the light source, a light emitting surface for emitting the input light to the liquid crystal cell, and a plurality of dots constituted by small projecting portions or small recess portions for changing a moving direction of the light from the incidence surface toward a direction of the light emitting surface, said dots being formed in a surface of the light conductor plate opposite to the light emitting surface with each of said dots having a height or depth within a range of 2 to 100 $\mu$m.

3. A liquid crystal display apparatus comprising:

a light conductor plate;

a light source arranged on a side surface of the light conductor plate so as to light a liquid crystal cell arranged on a front surface side of the light conductor plate from a back surface side thereof; and said light conductor plate having an incident surface for a light from the light source, a light emitting surface for emitting the input light to the liquid crystal cell, and a plurality of dots constituted by small projecting portions or small recess portions for changing a moving direction of the light from the incidence surface toward a direction of the light emitting surface, said dots being formed in the light emitting surface of the light conductor plate with each of said dots having a height or depth within a range of 2 to 100 $\mu$m.

4. The apparatus according to claim 1, wherein each of said dots has an area within a range of 0.2 to 0.000025 square mm, and an angle of inclination of a cross section of the dot is within a range of 7 to 43 degrees.

5. The apparatus according to claim 2, wherein each of said dots has an area within a range of 0.2 to 0.000025 square mm, and an angle of inclination of a cross section of the dot is within a range of 7 to 43 degrees.

6. The apparatus according to claim 3, wherein each of said dots has an area within a range of 0.2 to 0.000025 square mm, and an angle of inclination of a cross section of the dot is within a range of 7 to 43 degrees.

7. A liquid crystal display apparatus comprising:

a light conductor plate;

a light source arranged on a side surface of the light conductor plate so as to light a liquid crystal cell arranged on a front surface side of the light conductor plate from a back surface side thereof; and said light conductor plate having an incident surface for a light from the light source, a light emitting surface for emitting the input light to the liquid crystal cell, and a plurality of dots constituted by small projecting portions or small recess portions for changing a moving direction of the light from the incidence surface toward a direction of the light emitting surface, said dots being formed in at least one of the light emitting surface and a surface of the light conductor plate opposite to the light emitting surface, each of said dots having an area within a range of 0.2 to 0.000025 square mm, an angle of inclination of a cross section thereof within a range of 50 to 85 degrees and a height or depth within a range of 5 to 40 $\mu$m.

* * * * *